United States Patent
Friedlander

(10) Patent No.: US 12,307,331 B2
(45) Date of Patent: May 20, 2025

(54) METHOD FOR UTILIZING DIMENSIONAL MANIPULATION

(71) Applicant: Gregory M Friedlander, Mobile, AL (US)

(72) Inventor: Gregory M Friedlander, Mobile, AL (US)

( * ) Notice: Subject to any disclaimer, the term of this patent is extended or adjusted under 35 U.S.C. 154(b) by 328 days.

(21) Appl. No.: 17/291,632

(22) PCT Filed: Nov. 24, 2019

(86) PCT No.: PCT/US2019/062892
§ 371 (c)(1),
(2) Date: May 6, 2021

(87) PCT Pub. No.: WO2020/107032
PCT Pub. Date: May 28, 2020

(65) Prior Publication Data
US 2023/0245793 A1    Aug. 3, 2023

(51) Int. Cl.
*G99Z 99/00* (2006.01)
*G06N 10/70* (2022.01)
*G21B 3/00* (2006.01)

(52) U.S. Cl.
CPC ............. *G06N 10/70* (2022.01); *G99Z 99/00* (2019.05); *G21B 3/00* (2013.01)

(58) Field of Classification Search
CPC .......... G99Z 99/00; G06N 10/40; G21B 3/00; G21D 3/001; G21G 7/00; Y02E 30/00; Y02E 30/10; H05H 1/01

USPC .......................................................... 708/101
See application file for complete search history.

(56) References Cited

U.S. PATENT DOCUMENTS

| | | | |
|---|---|---|---|
| 2012/0071333 A1* | 3/2012 | Kauffman | G16C 20/60 706/3 |
| 2017/0104426 A1* | 4/2017 | Mills | H01L 31/0549 |

OTHER PUBLICATIONS

Feng et al, "Fractals in Quantum Information Process" Chin. Phys. Lett. vol. 30, No. 1 (2013) 010206. (Year: 2013).*
Agliari et al, "Quantum walk approach to search on fractal stuctures" Cornell University Library/Quantum Physics, Jul. 20, 2010. REtrieved from the Internet https:arxiv.org/abs/1002.1274. (Year: 2010).*

(Continued)

*Primary Examiner* — Tan V Mai

(57) ABSTRACT

A method for manipulating fractal forming information, also referred to as ct states, in a dimensional form of increasing and decreasing fractal compression roughly generated by the denominator of pi (fpix), n+1, and the formula $2f(x)^{\wedge}(2^{\wedge}x)$ including transitional steps between those stepwise increases and decreases by altering the compression of decompression targeting fractal states of the composite dimensional features (next lower dimensional features) or the resulting dimensional features (next higher dimensional features). Steps include identifying the ct states which are to be manipulated, select a compression or decompression ct state component to change the selected ct states, adding the compression or decompression components to yield the new ct states.

17 Claims, 21 Drawing Sheets

(56) References Cited

OTHER PUBLICATIONS

Sasaki et al., "Local State Transition of Feedback Controlled Quantum Systems with Imperfect Detector Efficiency: Part I: Differential Geometric Analys for Dynamical Systems with Matrix-Value States" SICE journalof Control, Measurement, and System Integratation, vol. 3, No. 6, pp. 409-416, Nov. 2010. (Year: 2010).*
Schaftenaar et al, "Molden: a pre- and post-processing program for molecular and electronic structures", Journal of Computer-Aided Molecular Design, 14 pp. 123-134, 2000. (Year: 2020).*

* cited by examiner

METHOD FOR UTILIZING DIMENSIONAL MANIPULATION

PRIORITY STATEMENT

Priority is hereby claimed based on the patents listed below.

Serial No Filed EFS ID
Serial No Filed Status
62771044 Nov. 24, 2018 (U.S. Provisional) expired
62787982 Jan. 3, 2019 (U.S. Provisional) expired
62798573 Jan. 30, 2019 (U.S. Provisional) expired
62851832 May 23, 2019 (U.S. Provisional) expired
62870352 Jul. 3, 2019 (U.S. Provisional) expired
U.S. Pat. No. 16,530,339 Aug. 2, 2019 (U.S. Pat.) abandoned
U.S. Pat. No. 16,552,481 Aug. 27, 2019 (U.S. Pat.) abandoned
62910889 Oct. 4, 2019 (U.S. Provisional) expired
16,670,029 Oct. 31, 2019 (U.S. Pat.) pending

1. BACKGROUND OF INVENTION

The universe has both dimensional and non-dimensional features and it operates with multiple base states interacting. Pre-time (pretime) and post-time features result.

These first 3 states and lower ct3-4 transitional states are space and dark matter. They build time and give the effect of energy in the form of the difference between pretime and post time change, unique to this model. The alignment required for compression indicates compression is rare explaining the predominant appearance of non-compressed and lesser compressed states. The illusion of self-determination is maintained by our inability to see beyond the photon.

The ability to take advantage of these inventive concepts is the subject of this patent.

FIELD OF INVENTION

The invention relates manipulation of time, force and matter using pre-dimensional features and manipulation based on maximizing the efficiency of interactions by focusing on the specific fractal dimensional features of each of the elements involved.

In October of 2019. MIT scientist reported a "completely unexpected" fractal quality to observed "quantum" features. Phys. org: Scientists discover fractal patterns in a quantum material. https://phys.org/news/2019-10-scientists-fractal-patterns-quantum-material.html SciTechDaily: "Completely Unexpected"-MIT Scientists Discover Fractal Patterns in Quantum Material. https://scitechdaily.com/completely-unexpected-mit-scientists-discover-fractal-patterns-in-quantum-material/

PRIOR ART

The standard model has a view of the universe which is time and dimension driven.

There are dozens of designs for fusion reactors, some patented, some not, in the prior art; but what they all lack is process. They all lack process because the prior models of quantum mechanics are inaccurate. AuT by having a better model of the interactions of compression states and a better understanding of energy and the appearance of dimensional features provides for the process and the simple claim, a fusion reaction according to the requirements of the fractal model of AuT is inclusive of all designs for fusion.

One example is the use of "plasma guns" firing ionized gas inward to compress and heat a central gas target. Like other designs, there is no attempt to control the reactants to create stable fractal interactions.

Other fusion experiments employ either magnetic confinement, which relies on powerful magnetic fields to contain a fusion plasma, or inertial confinement, which uses heat and compression to create the conditions for fusion. If there were, it would infringe on the claims of these patent.

Tokamaks use magnetized fuel plasma to help mitigate losses of particles and thermal energy.

In the one earthbound working fusion reaction, a heavy imploding shell (the plasma liner, often a foam) rapidly compresses and heats the fuel. They typically have a 6 percent yield.

The use of an array of lasers, what AuT would define as high pre-time information state generators, can be used, but because they are not used in a way to shape or stabilize the reactants, but only to compress them, the use is different and distinguishable and is unlikely to achieve even the 6% result found in fusion weapons.

Using magnetic field thermal insulation to keep plasmas hot enough to achieve thermonuclear fusion was first proposed by the Italian physicist Enrico Fermi in 1945. Magneto-inertial fusion uses an implosion of material surrounding magnetized plasma to compress it and thereby generate temperatures in excess of the 20 million degrees.

Attempted techniques involve pre-magnetized plasma by a magnetic field of 100,000 Gauss. This applies a force of 20 million Amperes over 100 nanoseconds to implode reactants, compressing the plasma and raising temperatures to 30 million degrees and a magnetic flux to 100 million Gauss to contain it.

The prior art notes "helical modes" potential within a near fusion system, but have no idea what they represent, whereas the AuT model shows them as representative of transitions between compression states which can be used to encourage or discourage fusion, both of which may be important since premature compression can ruin a reaction due to the lack of stabilizing features.

GENERAL DISCUSSION OF THE INVENTION

The present invention is a method utilizing pre-dimensional features and previously misunderstood dimensional features. Iterated equations yield fractals when they change from one solution to the next.

The exact nature of the fractals may require additional experimentation, but the equations appear to be fpix, n+1, and $2f(x)\hat{\ }(2\hat{\ }x)$; the two equations $2f(x)$ and $2\hat{\ }n$, both fractal equations. Fpix denominator of pi. It can be represented by this equation:

$$1\hat{\ }x+2x(-1)\hat{\ }(x-1)$$

Fpix produces Ct1 bits, the most solid thing in the universe, in the sense that there is nothing between quantum solutions because there is no room for anything to be between the solutions. Relative solution order is the only separation medium possible is multiple pre-time layers.

The numerator refers to the base number of dimensions changing together corresponding to the number of places being solved as Fibonacci sequential solutions with two aspects balancing it (2 of the 2(f(n)) and forms the base of the state (base 2, 4, 6, 10, 16, 32 . . . ) and higher states include the lesser states as the quantum elements for the next higher state. The multiple numbering systems (different base systems) creates interacting base information states.

There is no "collision" of particles, instead the matrix mixes of the various units combine, compressing and decompressing at the quantum level to yield the observed dimensional results, although base numbering states interact to get this result. There is fractal structure that prevents collapse. Fractal organization forces the separation of different features which the standard model refers to as Pauli Exclusion, but is the result of fractal dimensional stability.

Electrons don't so much repel each other as the elements spew each other apart. But this is a fractal consequence reflected in balanced spinning equilibrium at higher fractal states. Fractal structures of t12 exist and distorting these fractals by adding t12 is contraindicated, instead they must form bigger fractal shells, different fractal shells as the amount of more compressed information which they stabilize increase.

Quantum bits, fpix results, are super computers. They can memorize results over unimaginably large numbers. We can easily write $100^{\wedge}153$, but we cannot comprehend it the way that particles of space do.

Each element in the fractal model is capable of separate manipulation and such separate manipulation is helpful in material manipulation.

Time and change are different. All change is quantum change in response to a single variable leading to the universe existing as a series of quantum states or snapshots. Force and time are effects based on this quantum change between the ct3 and ct5 compression states. Time is not required for that underlying change nor does it affect that change.

Time gradually arises with the dimensional concentration so that "hidden variables" are ct1-ct3 and probably ct4 transitional states below ct4t6 states, five t6 states are probably incorporated into the photon for the same reason. Exchanges of information state (ct state) below the level of photons occur essentially independent of time. Time essentially ends with compression to neutrons when the type of information exchange viewed as time ends.

Speed is always zero at the quantum level.

Time can be replaced in reactions and recharacterized as a consequence of compression and largely the ratio of ct1-3 exchange (seen as light speed) to higher ct states which are inversely proportional to velocity; although it also involves lower ct4 transitional states, particularly those below the ct4t13 level where pre-time elements provide for both energy observations and probabilistic effects. Velocity below light speed may be viewed as the ratio of low ct4t states to those above ct4t6. This ratio appears in the Lorentz equation as $v^{\wedge}2/c^{\wedge}2$ where change of ct1-3 are invisible.

Net unwind (compression) varies with compression and fuse effects.

Particle Types:

AuT has no contact between particles. The closest thing to contact is solution order between quantum solutions, so the idea of something that is between quantum points in contraindicated.

Ct state refers to the numerator of pi for any state. So ct1 is 1/fpix for ct1, ct2 is 2/fpix. The numerator is also the value of x in fpix equations. Ct1 is the quantum non-dimensional basic building block of dimension.

A "vacuum" is composed of ct1-3 and possibly low compression ct4 transition states. CT1-3 and lower states match the concept of virtual particles, unobservable, but the idea of matched annihilating pairs is not valid.

Under AuT it is possible to solve Schrodinger's equation for relativistic speeds.

Previously the Heisenberg uncertainty principle held that you could not know both position and momentum. Schrodinger worked with a probability function in order to determine the energy and wave function of a particle whether it was time dependent or non-time dependent but did not overcome uncertainty.

AuT can solve for both position and momentum because in the early stages of information, the results for each quantum of information are certain as is their arrangement one to the other.

This allows us to better understand orbitals (changing fractal states in AuT).

All dimensions present (at least 6) exist together within the matrix of the universe and in any regional matrix, subgroups of these dimensions are present.

Waves. Photons. Electrons and protons are transitional states (ct3-ct4) between ct3 and neutrons ct4. Atoms (after hydrogen) and molecular states through neutron stars are transitional states between neutrons (ct4) and black holes (ct5).

Forces reflect this folding and is at the same relative scales.

Both the proton, electron, photon and neutron are built from ct3 states which align along the information arms of the ct4 state.

N=4 for ct4 neutrons so the full neutron has 16 folds of 10(2*f(4)) times the prior folded state (ct3). Neutrons can stack along ct5 compression arms, this is not the case for Hydrogen even though it is approximately the same dimensionally, it has not reached the compression state adequate for alignment of fractals being a base 6 and not a base 10 fractal base.

Each ct4 is surrounded by a cloud of transitional solutions, ct3 solutions and transitional ct3-ct4 solutions which, in turn, are surrounded by ct2 solutions and ct2-3 transitional solutions in turn surrounded by ct1 and ct1-2 transitional solutions, the transitional solutions being less dimensionally complex as the compression state is reduced.

Dimensionally, the ct4 neutron is smaller than the proton because it folds into another dimension and this dimensional change releases lower ct states otherwise a part of the proton cloud reflected by bundle. This dimensional change is a paradox of AuT.

Ct1 solution change drives the movement of the higher ct state movements via the charge change, compression mechanism. We see this ct1 like a string pulling a higher ct state "top" string. The movement of the planets, the elliptical orbits which define the constant falling around the planets represents the same feature on the larger fractal scale. Actual orbital movements are a faction of the elliptical movement about the unwinding axis of the universe.

In ct4, the surrounding ct3 and ct2 states thin to accommodate the increase exchange rate of ct1 external vs. ct1 internal to the ct4 state. Ct1 exchange is not a simple process since to get to the ct4 it must pass through and presumably make exchanges along the way. Since it is moving as the most compressed state, it has to "push" stuff around, although the pushing is an effect of the charge change rearrangement of the matrix of ct states.

Energy is ct3:ct4 ratio of dimensional change.

One area where the invention provides insight is the ability to manipulate atomic and molecular interior structures by manipulating exterior fractal structures.

Terms like "gamma rays" must be converted to ct state effects having varying amounts of pre-time change which are seen as high energy but which have specific, targetable quantum dimensional structures.

Neutrons, for example are ct4, electrons a collection of 5 ct4t12 states along with clouds of lower ct states. An electron appears like a fundamental particle only because the changes below the level of ct4t13 are largely pre-time changes so only the net structure is observed. The proton by weight is essentially a T-16 state (over 99% of the way there) but while the the proton is a ct3-ct4 base 6 transitional state; the neutron is a base 10 state and that transition is fundamental and appears to be inflection point driven; meaning there are not transition states, but instead consists of a single transition point.

Even building and exponential building of compression has been examined and exponential compression is more likely because of the hiding of lower exponential state structures and the better match with observed results.

There are $4.3 \times 10^8$ ct1 states per pre-photon.

There are $4.3 \times 10^{14}$ ct1 states per photon. The 0.4 of the 5.4 electrons is, according to polynomial approximation mostly T11 states but fractal stability suggests a large amount of photonic T-6 states.

Math changes consistent with experimentation will improve the model.

There are $5*4.3 \times 10^{20}$ ct1 states per electron.

There are $4.3 \times 10^{24}$ ct1 states per neutron and approximately the same per proton.

There are around $(16)*4.3 \times 10^{24}$ ct1 states for a minimal type of molecule having a wave form.

This allows us to have a quantity solution as well as separation solution.

$10^{10}$ is to $2 \times 10^{21}$ as $10^{24}$ is to $6.9 \times 10^{24}$

The electron is $5.4 \times 10^{12}$ ct3 and the analysis above uses pure spatial quantities.

One way of trying to deal with the electron is by weight which is to say it is 5 stable T-12 states plus up to 8 T-12 states in a destabilized ct4T13 form (the electron bundle) where pre-time transitions occur between the t-12 states that make it look energetic from the viewpoint of time.

The ratio 1844 of the neutron to the electron is approximately 1:1836 which is the best indication that T12 is the primary component (with other, lower ct states) of the electron. The "charge" of the electron is thought to be either the movement of t12 or the T6 shell around the electron interacting with the comparable shell around the T16 proton (t6 or t12 spew).

This is approximately the same as the proton to electron mass: 1:1836.11 which converted to T states yields:

$5.44628E+12.$

The $0.5 \times 10^{12}$ part of electrons can be seen as lower transitional states more directly tied to the electron than to other states in proximity.

Positrons, electrons, gamma rays, other radiation (high energy light, heat for example) and muons are examples of pre-AuT designations for informational states that can be added to or removed from a regional matrix. An example of the redesign is to treat muons as T14 base 6 states with the extra energy being an increase in lower ct4 compression states and possibly ct3 states.

Just as the mass of the arms around the core has a center of gravity, constantly shifting, so too do the arms of the electron cloud have a center of spew, constantly shifting. There is a net spew from this entire galaxy of arms which moves about near the speed of light, nearer than we do, not only because the entire spiral of ct4t12 arms do, but because the net spew shifts at pretime speeds for lower ct4 transitional states.

Time is a gradual dimensional feature which is best envisioned as a function of "stop frame animation" where the dimensional structures that are seen as pre-time are those below the level of the electron, generally. Reference is made to published papers (after the priority date) for a better understanding, but as dimensional information becomes more compressed (higher ct state) the "speed" of time slows and time is generally the compression between ct4t13 and ct4 although the ct4t12 components of the electron, at least in combination, have both time and pre-time elements which is why they can be used a qubits.

And when an electron is sent spinning away from its proton, it is this entire structure that moves and in moving it is an Aristotle's wheel and therefore wavelike from the perspective of time, albeit less wavelike than the photon which is less of a time generating particle. After the fashion of Aristotle's wheel, one dimensional state rolls against another.

We see pairing in the periodic table. First you have the paired electrons, protons and neutrons in the Helium atom. Next you gradually fill (though some very unstable intermediaries) to Neon which includes 4 pairs of two. These then pair to a similar 4 pair to get to Ar, two of these pair to get to KR, and the stacking continues, no longer pairs, but a triplet, to get to Xe. After this the next fractal state (two pairs of 16) create the next two pairings. This is significant because we can trace the multiple fractal pairings in the periodic table to determine where these would lie at the similarly modeled Pre-Atom level of the electron, proton pair along with the electron bundle comprised of lower ct transitional states.

Hydrogen is a ct3-4 T (transitional) state, we see 1/1; 6/12; 7/14 and 8/16 building which is very much an AuT result.

The instability of Li, B and Be are tied to their inability to form stable geometric forms, 1 to 3 sides of the four-sided fractal box for charge, uneven sides of the 5-unit box for compression, total mass.

Li: 3/4 (odd/even)

Be 4/9 (Odd/odd)

B 5/11 (odd/odd)

Carbon is 6/12 (even/even) which is more stable even though it fails to match the charge box and does not match a compression box. It does, however, match a 2+4 charge and more importantly it has a 1:2 charge to mass ratio allowing a greater alignment of the ct4 and ct5 compression states.

Nitrogen 7/14 (odd/even). This also has the 1:2 charge to mass which continues in the periodic table with increasing instability (intervening lower states) once you get past the 3rd row and introduce the next fractal state.

Oxygen at 8/16 has fractal stability like Hydrogen. Hydrogen supplies additional stability to mimic the next higher stable fractal state.

Folding and unfolding (compression and decompression) result in something referred to as absorption and spew. Absorption and Spew reflect the approximately balanced absorption of a lower state and spew of a higher state; or a balance of the same state that maintain higher ct states.

The Neutron experiences attraction of the proton as absorption of something spewed by the proton and spew of a state allowing movement of the molecular structure but with something less dense. Ct1 absorption may be enough in proximity to hold the protons in place relative to the neutrons which spew something which does not completely drive them away. The same can be present between two Neutrons. Since this spew and absorption is not seen as charge, it is presumably not ct4t12; but we do see ct4t12 absorption and spew between electrons and protons.

Spew exits and absorption enters in spirals causing spiral shapes of shells and galaxies. Because of nature of spiral unwinding and spiral winding this is a focus of claims taking advantage of or manipulating these relationships.

The proton suggests by its failure to combine with the electron that at close quarters, the spew of the proton is the same as the electron as the number of intervening states decrease or that fractals cannot merge because of difference in structure reflecting the lower fractal requirement of alignment to fold.

According to the rejected standard model, a neutron, in weak force terms, decays into a proton, neutrino and electron. The view of AuT is not dissimilar, except that the transition involves a solid ct4 state decaying into more cloud like dispersed ct3-4 transition states.

T12 electron spew would be exponentially (($10^4$) times less in terms of ct state) than a proton, but the charge features, theorized as T6, appear balanced. While a proton spew would not be exponentially less than a neutron, the dimensional inflection point change suggests that the type of spew would change.

The charge neutral electron like neutrino that is theorized is less easy to pinpoint, but given the relationship of charge to absorption, these are presumably not t6 absorption/spew states and not t12 states.

Whatever their makeup neutral states are not seen as charged only because we don't see their absorption and spew as charge just as the absorption of ct1 is seen as gravity and not charge.

Spew and absorption can be tapped for more fundamental power and the transition at the quantum level used for better conduction and for quantum computing.

Experimentation can provide primary and secondary spew and absorption results along the line of Ct/transition state: Primary absorption: Primary spew; rates: effects (e.g. force, compression, decompression, etc.). It will also show how spacing within the spirals is affected and how to control spew and it's results to get reactions.

Anti-matter appears to be the anti-spew form of matter where absorption and spew are reversed.

The model of absorption and spew suggests that for stability there must be a balance between the absorption of the states and their higher ct spew, not complete stability but enough to account for the universe as we experience it.

The concept of spew sharing suggests that the extra information lost as energy in the fusion reaction occurs as the two neutrons pull together squeezing the protons out of the way and freeing up other sources of information required to hold the atoms together without the neutron core.

There are different spew within a single compressed state, the electron cloud being a good example. Ct4 states could spew up to ct4T16 although that would require the neutron breaking down into a proton, so another way of looking at spew, is what can be given up without losing structural integrity of the spewing dimensional feature.

Radiation is a type of spew where a ct5T state spews other ct5 transition states, often in response to the interaction with ct4T states (T14 muons, being one example). Obviously, a ct4 state cannot spew a ct5 state, but it can spew or even break into multiple lower ct4 transitional states.

Wavelength The electron's wavelength is the approximate size of the atom suggesting that its fractional existence around the atom. This is supported by the mass and the center of gravity of the electron. As the center of gravity moves out, the wavelength changes as it takes longer for a complete circuit against the next higher dimensional state.

Instead of a "point electron" moving, the entire spiral shape of the fractal is shifted outward. The photon "energy" is preserved because the photon is literally attached to the chain of information forming the electron.

Collapse of the wave function suggests that along this value of x, the observation of the "particle" fixes its position by removing pretime changes in the form called energy. It is also possible that observation fixes the relative position at a location along the line of movement against the higher dimension.

The Origin of the Wave Function (104 ($z$)) from quantum elements is based on Frequency, a change in location of the electron over several values of x once represented along a defined vector.

An energizing photon can be seen coming into this system. Where exactly it goes is a question worth pondering.

Three options are: 1) The photon attaches to the outside of the fractal creating an "ionized" photon cloud, 2) the photon goes into an orbit with but not part of fractal and 3) the photon is trapped within the fractal. The last is the only one with obvious merit, but in some cases of high concentration electrons can be the spew and be absorbed.

In broad terms it would look something like this:

$$T12E = 5.4 \times 10^{12}$$

Add a T-6 photon and it becomes a $T12E=5.4 \times 10^{12}+1$ $10^6$ P. This photon has many pretime elements which can vary, varying the "energy" and the number of places within the fractal where the photon can expand the orbitals understanding the less compressed photon can occupy more space than its information content might suggest.

T3, 6, 9, 12 follow a ct3 state fractal model, because they are functions of 3, but the 3:3=6 and 6:6=12 allow for more stable structural similarities. The t16 proton is a 4:4:8:8 type of fractal alignment which is not indicated but can reflect the underlying 2:2 ct2 fractal alignment. The next compression is the 5:5 compression of the neutron and ct5 state.

$10^4$ is the separation of the electron from the proton but they match each other in charge because the proton shares charge spew with the electron.

There are a couple of ways of looking at this. One is a type of taylor approximation (which can be an exact solution in AuT) where the addition of the photon adds another approximating solution taking a state that much closer or further away from the more stable state without changing it. The other has to do with the application of special limits to transitional states.

To determine the effect of what I suspect is a T-6 photon and the probable solution is the conversion of the electron from an electron to what is the equivalent of a destabilized proton from a neutron.

Gamma rays and photons (light spectrum) involve different compression states and amounts of pre-time change relative and the resulting change in "dimensional" footprint to the next higher compression states.

$10^{10}$m=electron "wavelength" which is the size of an atom which reflects the fractal shell of ct4t12 states around line of rotation.

$10^{36}$m=molecule size wavelength reflects the rotation of the molecule about a large line of rotation for the entire atom or molecule being rotated within a fractal matrix.

AuT suggests that wavelength is a function of the "size" from the ct4-5 centerline (COC) to the orbital average length around a line of rotation.

Applying Fractal requirements to the quantum computing you see above that when a photon is "added" to the system (shown here as six sided as a T-6 ct3-4 transition state) it is literally added. It is not "absorbed" so much as it becomes a part of the Fractal.

One place where quantum theory shows the interaction of ct3-4 T wave states and ct3-4 T-Fractal states is with the ultraviolet wave interaction with certain atom-molecule metals to "eject" electrons upon applying sufficient kinetic energy (kmax) in the form of ultraviolet vs. for example, infrared light.

The equation for this is: (kmax=hf-phi) where h and f are defined as plank's constant and frequency and phi is the work function which is the amount of work necessary for a given material to eject electrons.

Phi is ignored as too small to affect the transition where the process of absorption of light is reversed to the emission of light. Photons and T6 states with varying pre-time fuse states and "secondary" fuse states which are the natural building of fractals.

Pre-AuT math says that the electron has insufficient energy to change position and that the energy of the light is absorbed by the electron. In AuT the T6 states merge with the electron cloud.

E=hf is the result yielding the energy of a photon. Plank's constant is a function of ct3-4 compression and frequency is a function of fuse lengths within the matrix and changes in x and is a function of that same ct3-ct4 transition scale that defines energy and above which is seen as time and below which is pre-time change.

The broad process can be defined as 1) Targeting fractal states (their effects and relationships) in order to manipulate dimensional states and 2) basing this manipulation on time and pre-time elements.

The method can be described as manipulation through the steps of targeting one or more fractal features and based on their pretime and post time features.

This includes determining the fractal features of the components needed, the end resulting structure and any intermediary structures and using the pre-time and post-time structures in order to get the result fractals desired.

Determining reactants; catalysts; and materials for equipment containing the reaction. Reactants are not the pre-AuT reactants because they include the pre-time underlying structural states and the fractal structures of the reactants which means it includes quantum states of energy, part of the frozen 'fractal matrix' of the operative fractal elements at each step of the reaction.

This includes determining what spews and absorptions apply to each element at each stage of the reaction; the best ways to use steps 1 and 2 to collect elements and bring them together; what stabilizes each fractal structure in the process or what destabilizes them in the way to get fractals for the next step; optimizing the fractals through the shape and information mix for each fractal matrix or average fractal matrix.

This process is a way of modeling the features chosen using the AuT fractal model for energy generation, material manipulation or prediction since all features of any dimensional matrix including time features and energy features can be treated as fractals with this process.

An important step in modeling is substituting ct states, including transitional states, for reactants is a way of manipulating reactants according to this method.

This can be used for medicine. The process is mimicked in cells which take in complex materials and spew out other materials, trees show how a large system of compression can have branches die while the larger structure is maintained.

Treatments can be centered around fixing or disrupting structures in accordance with the structures and spew defined by this model.

The invention is a method of manipulating dimensional features comprising the step of treating all features, including compression state, energy, force and time, as dimension changes between ct states. This primarily involves solving for features comprised of at least two fractal states derived from at least two iterated equations. Force and time can be treated as results of the application of two fractal equations for a use from the group selected from, comparing, compressing, computing, folding, and unfolding, targeting relationship between ct states.

Targeting comprises manipulating interior structures by manipulating exterior information or manipulating the exterior structures by manipulating interior information. Targeting can comprise reacting the most compressed states (heads) together, reacting less compressed states (tails) or both with each other based on the structure to be obtained. Fractal analysis indicates stable atomic and molecular structures are head oriented reactions with creating stable tails being a necessary following structure in the process.

Manipulation is broadly considered, and can come from the idea of targeting fractal relationship in the reaction or fundamental change of the universe, which term targeting is a way to include, inter alia, the group comprising: treating energy as information change between pre-time and post time effects at different dimensional levels; manipulating alternatively trapped states, transitional states, hinge states and compression states, treating space as non-dimensional and black holes as 4 dimensional and the intervening states as dimensional compression states between the black hole state and the non-dimensional space state; treating dimensional features as fractals defined by the fractal iterated equations giving rise to the dimensional states; comparing one or more fractals, targeting relationships between the two fractals; targeting fractal changes for the group comprised of energy generation, quantum computing, transportation, material manipulation or a combination of those; changing information states (ct states) by changing a feature of at least one fractal component ct state (including transitional states in almost all cases); compressing states and decompressing states; including the step of creating a regional change using one or the other of two opposite states to change the other; changing regional concentration of one of two opposite states; changing opposite states so that desired features are maximized in a resulting regional state; stabilizing or destabilizing dimensional states by adding or removing lower ct states from a higher compression (virtual) information arm; viewing changes over x and comparing those to a view of changes over time of information arm loading; targeting hinge or compression arm states to effect dimensional changes; affecting one ct state to change another ct state; treating wavelengths as the expression of pre-time quantum dimensional change; balancing time and non-time elements for maximum efficiency, manipulating Quantum change done at least partially in pre-time ct states; changing the interface of curvature and fractals; catching pre-time quantum errors using a post-time frame, especially for quantum computing; identifying errors introduced from lower ct states, especially for quantum computing; capturing spot of transition from net compression to net decompression for a ct state and transitioning between the two adding or removing lower ct states transitioning at a different level, especially for quantum computing; filling, breaking or emptying fractals within fractals; sharing at least one outer compression states of each of two regional states to react the two regional states; treating electrical energy as net spew position of material from the electron to the proton in terms of pre-time states, using dimensional changes including at least one feature from the group comprised of: charge, change in space, compression, decompression, hinge and trapped states to create and manipulate energy, matter and other dimensional features; averaging to get results; change compression state vs. decompression state; stripping compressed states from non-compressed states or non-compressed states from compressed states in order to create quantum changes for computing and the like; manipulating features that are not 3 dimensional as non-3-dimensional features; manipulating features that are not 3 dimensional as a single entangled strand and; treating force and time as effects of an underlying dimensional change and where dimensions refer to different base states; changing selectively dimensional features as odd and even exponential features: changing a fractal, dimension, ct state feature, component, or regional change, using one or the other coexisting opposite ct states, defining energy in terms of pre-time changes in the location of different spew states; creating velocity from the unfolding of space comprising the steps of; Identifying a first mass comprised of at least one ct3-ct4 transition state and a second mass comprised of at least one first intervening ct2 or higher state and a least one second state where intervening refers to the folded order of location between the two states; converting the intervening at least one ct1 state, folding within another lower or higher ct state; storing energy based on pre-time and post time features of the material involved; maximizing dimensional efficiencies comprising the steps of: minimizing transitional vibrational features conflicting with the desired transitions and maximizing results based on the AuT features of the affected dimensional states; utilizing elements of time independent change; folding or unfolding; location of folding and unfolding; or combinations of those such as fission and fusion as higher-level changes; creating movement changes comprises the steps of fixing the distance between the groups; increasing the distance; preventing intervening ct1 states from crossing into folds between the differentiated states; generating either a winding or unwinding of space converting, as a result, matter to space and we "see" the conversion via the intermediary states of waves and photons as velocity; folding or unfolding photons, or other transitional features to get fusion or fission or to enhance those reactions in an order consistent with the reactions as defined herein and refined with experimentation; compressing space or releasing the trapped non-dimensional space to manipulate gravity; manipulating at least one of the ct1,2,3,4 or 5 forces; compressing or decompressing wave energy into mass: manipulating entropy for the system in question; tearing apart compressed space; generating energy from selectively targeting compression or hinge states; generating energy storage around force being dimensional changes: separating states by affecting the hinge states in particular to break it up; developing AI (artificial intelligence) or other variable results based on the net, hinge, transitional and compression features inherent in AuT mathematical processes; inserting variation into intellectual development, problem solving and exponentially more complex problem solving as by creating random number generation; taking the base model of the staged process for generating results in AuT and applying these features with substitutions or shortcuts in the exact formula for artificially creating the same to improve human intelligence; quantum computing using quantum correction for changes of the various compression states for generating quantum result, correcting quantum results; providing for the changes in based on expected compression or decompression solutions in one or more of the quantum states in question; putting change within a system or matrix using scaled changes in the manner of AuT and adding randomness by periodic changes within the changing sub-matrix and/or count and using the quantum features of compression, hinge, free state and variable limits of the type shown in AuT; treating all dimensions as increasing in compression, not expansion despite this being counter-intuitive.

There are other matters where this idea of targeting fractal relationship applies, as with predicting the future or past comprising the steps of (1) determining the arrangement of ct states of a desired range at a given value of x in terms of at least one of the following, spatial position, organization, visible, sound or other spectrum: separating forces from the underlying predestination and driving forces that give rise to cause and effect by limiting time to the ct3-4-5 interface discussed below and change which occurs at all levels in the universe including those which are pre-dimensional; tapping spew or absorption states for energy; utilizing pre or post time change to deal with dimensional features for desired reactions; controlling absorption and spew states to control compression and decompression of associated dimensional states; treating time only as an effect replaced in all manipulative equations; or controlling time by controlling ct state substitution.

The invention can include at least one reaction place and including sending ct1 states in groups or individually sequentially or in groups where they can react there. It can also include the process of taking the resulting matrix and reacting the matrix in another location.

Fusion

To make fusion stable or work you need to destabilize the neutrons involved, open them like the protons and electron shells; but you must stabilize resulting states. In the case of ct3-ct4 fusion where a proton turns into a neutron, you can line up neutron short materials, those requiring more neutrons for stability to enhance fusion by providing a location for stabilizing loose neutrons. This can be conceptually used for any fractals.

The process to get a compression reaction is encouraged by having at least one neutron with its own shell in the form of at least one proton and at least one electron which allow for the net result to be stabilized by having both the proton and electron shells necessary to maintain absorption and spew balance.

Disrupting and recombining these provides an environment where sequentially elements can be prepared and then put into proximity with the correct balance and length of energy relative to one element to another so that they can combine and stabilize.

A key to this process is to keep the elements together long enough for them to react. Swirling is in different dimensional states and the forces vary with the compression state of each structure, reactant or resulting fractal.

Just as bringing two galaxies together to form one might require exposing the galactic cores, this process requires controlling the momentum, at least in terms of average of the particles to get them to connect. Swirling them together and providing an environment allowing them to combine while encouraging the desired fractal compression states internally and externally to the core will enhance the reaction.

Spirals and stable fractals, often appearing as circles or spheres, which reflects whether the compression states are more complete, and this relationship can be targeted.

This mixture of compression means, isolating means and energizing means can be thought of as a means for maintaining the parts in proximity with minimal relative movement with the appropriate stabilizing spew at least on average for a sufficient time for stable more circular or at least more fractally balanced structures to form a combination of expanding, contracting and destabilizing and slowing and stabilizing features to allow the constituent parts to combine and then form stable intermediary states.

By focusing on ct state and fractal and changes in x relative to change instead of energy, better control of any dimensional feature, material or reaction will result.

An argument can be made that the T16 (proton) to ct4 (neutron) compression reaction has more in common with changes in wavelength than with other fusion reactions: because neutron to neutron fusion is the beginning of ct5 compression and the other is the end of ct4 compression. This is reflected in both the energies of the reactions and the energy particles generated, noting that the energy particles are approximations of true ct4 transitional states and their relative amounts of pre-time change.

There are several different reactions that are called fusion, specific examples are given below: 1) where a proton collapses into a neutron. This is referred to as pre-atomic fusion since ct4 transitional state to ct4 neutron fusion results, a ct3-4 reaction: 2) where neutrons are stabilized within a shell which has two basic types. 2a) taking one unstable neutron (e.g. from deuterium or tritium and combining it with a collapsing proton; which is a ct3-4 reaction followed by a ct4-5 reaction: 2(b) where two unstable neutrons are brought together. This is a ct4-5 type reaction with heavy aspects of ct3 stabilization.

A modified proton shell (a ct4-5 reaction) and a modified electron shell, a ct3-4 reaction, stabilizes. All of these result in a ct5t1 type reaction if there are less than 16 neutrons in the resulting atom, otherwise it is a ct5t2 type reaction. Fission can be viewed as the opposite, although almost all Fission reactions in energy generation begin with ct5t2 destabilization to other ct5t2 states with possible ct5t1 reactants being a part of the lower resulting state.

The "energy" generated is the release of lower ct4 transitional states, many being below the t12-t13 electron state whose pre-time features are reflected as heat and light and the creation of lower ct4 transitional states from decompressing ct4.

The goal of the reactor changes depending on the type of reaction. In the case of any reaction involving an existing neutron, one goal is to partially separate the neutrons to be combined from the supporting matrix. They may then combine.

Hydrogen marks an unusual place where ct4 compression has been interrupted or broken down leaving a partially formed but charged electron/proton pair instead of a neutron. The collapse requires that the entire shell be closed around the proton. In concept, to make this collapse stable you need to bring in another proton to form the shell around the newly formed neutron. Alternatively you have to bring two of these collapsing protons together with two stabilizing protons and the resulting matrix has to combine in a stable two neutron, two proton matrix although it is possible to have less stable deuterium and unstable tritium usually found in the presence of water which provides neutrons with shells partially opened to the outside by their being pulled towards the oxygen proton core shaped by the neutron core, the theorized reason for allow a stable deuterium matrix.

One process is enhancing this water, proton exposing state to enhance the availability of exposed fractals to obtain intermediary stability for the combination. Any molecule which provides the same effect will work and the claim of creating of fusion reaction by targeting the reactants to expose the most compressed states to each other (a proton to a neutron core) and to stabilize the resulting compression is new since the existence of these required fractals was unknown before this model was developed. The process is targeting the dimensional features as suggested by AuT allow for more effective manipulation of these two different reactions.

| Reaction | Energy | Particles |
|---|---|---|
| H2 to N (ct3-ct4) | 1.44 MEV | Positron, electron |
| H + D to He(ion3) (ct3-ct5) | 5.49 MeV | Gamma rays |
| He(i3) + He(13)toHe(14) plus 2H (ct5) | 12.86 MeV | Light spectrum |

The transitions in this case can be reconsidered using the new model. The transition between molecular and nuclear reactions involves removing more lower states between the higher compression states.

The positron/electron pair is two electrons with absorption/spew characteristics have been altered so one is in "entropy" mode and the other "anti-entropy" mode. In such a case the "freed" information comes from the electron shells and not the protons. Five times as much information is released by the second example (hydrogen and deuterium), but it is still on the scale of electrons being freed. The same is true regarding the final reaction in the list. One can look at these as two electron shells released, then 10, then 24 in rough terms.

When one looks at the "particles." the first reaction maintains the "purity" of the released states. The second two reflect a break-down of the electrons into their component states as t12 and t6 states along with the related intervening transitional states, the greater break down reflecting the greater compression stability of the resulting reactants compared to the initial reactants.

Using a fractal analysis. He (i3) has an extra proton which is destabilized and requires a highly distorted electron fractal shell to exist for any length of time. During the reaction, the Protons are released and form stable electron shells with t12 states of the distorted fractal or from the surrounding matrix. The unstable shell of He (i3) collapses to the more stable fractal shell balanced in the same way that figures of spiral galaxies appear balanced. Because you have this large t12 shell breaking apart it naturally gives rise to light as electron/positron fractals include photon fractals.

The intermediate reaction begins with a relatively stable H2 matrix and combines a unstable Deuterium where a neutron is able to exist as a "bastard" ½ Helium because the water has exposed two protons by pulling their electron shells open so that the core of the bastard is exposed to the core of the two protons so they can share absorption and spew. The Helium in such as case only has a bastard shell from the exposed protons which may involve multiple water atoms. In the reaction, two bastards are combined, stripping away two protons and their electron shells to form a stable atom. Hydrogens combine using existing shells also. The energy comes from whatever information is freed from the numerous resulting reactions which can include O2 forming from water. H2 forming from water or water plus free Hydrogen and He forming from the combination of loose neutrons along with proton and electron shells. In every case the tendency is towards forming stable fractals and by targeting this result, the reactions can be practiced or more efficiently practiced.

The energy relates to information "trapped" with time-based states being released in the form of pre-time states free from the time state fractals. Information trapped within two oxygen matrix ends outside of that matrix and outside of the resulting helium and being less than an electron, it appears as energy or time independent information.

Hydrogen has three isotopes. The dominant one contains one electron and one proton. It is so stable that it requires more than 20 million degrees F. to break it apart as plasma and these energies are involved in the creation of a fusion reaction with hydrogen. This reflects ct3-4 loading just short of that seen where neutrons are formed, and it collapses to the next dimensional state in AuT. There is a common fractal that binds the two and while the best theoretical modes are shown, additional experimentation will refine these.

The Pre-AuT necessary temperature for fusion is a temperature of about 20 million degrees F. then hydrogen can stabilize as Helium. It is not temperature that is the focus in AuT since there are not operative thermodynamics at the quantum level, but instead is a focused fractal reactant and fractal resultant method.

Dimensional extremes (such as those involving pressure and vacuum) have to be imagined in terms of fractal intermediaries and results. The fractals are formed together by sharing (one example being t6) spew from electrons and absorption by the protons matrix and the cycle of information back again binds the proton and electron as well as stabilizing them, the stability of one fractal is tied to the presence of a cooperating fractal and shared information between "complete compressed states." e.g. neutrons, allows them to stabilize each other, to remove or thin the outer clouds in Hydrogen, remove or thin the outer clouds from a neutron source (heavy hydrogen or heavy water being two likely candidates): place the neutrons within the hydrogen protons or wrap the hydrogen protons around the neutrons; and finally reintroduce stabilizing structure of lower compression states, particularly if not primarily electrons.

Fusion general steps start with (i) determining the reactants to be used.

One example of reactants are Hydrogen and a neutron donor. Heavy water (Deuterium or D) and any neutron source can be reactants. Once the reactants are chosen, the process involves (ii) changing the ct state structure by adding or removing different ct states or transitional states of the hydrogen and H2 with information bundles which here include electron components, and/or positron components to (III) expose the nucleus protons and (IV) expose the neutron 30 of the H2 nucleus.

Moving states apart is typically done by increasing the energy levels by shining radiation, adding charge (inserting ct4t6-ct4t12 range compression, for example) at absorbed wavelengths or particulate amounts to increase operationally the amount of ct1-2 type states or or breaking them loose from surrounding states which can involve adding heat (increasing pre-time unfolding and folding) and these can be moderated as to any of the involved states to maximize the results focusing on the core fractals or information arm fractals to be destabilized and expanded, sequentially if necessary. The use of compression (pressure) and vacuum can work with this process since that varies ct1-3 information within the reaction chamber. Since vacuum is not really nothing, having a high compression medium for the reactants chosen, can improve putting everything together.

Fusion can be described as (1) expansion of outer, lower information states. (2) bringing in equivalent information states enough to create a stable core. (3) surrounding the core with a stable fractal from lower compression states.

It is not enough to have neutrons. The neutrons must be brought close enough, so they share information. They also need a shell of protons (2 neutrons need two protons in helium) to have enough information to remain stable just as the two protons needed the complete shell of electrons and so on as things get smaller. The key to a fusion reaction of this type (one where you are not making neutrons, but merely building helium for existing neutrons) requires you get everything proximate enough in the right order for it to stabilize.

Fission can also be practiced with this method more efficiently described as expanding of outer, lower information states. (2) bringing out a stable core. (3) surrounding the two resulting cores with a stable fractal matrix of lower compression states.

The process of exposing the cores of atomic and molecular matrix can come in several forms: (1) increasing the ratio of lower transitional states around them. (2) removing transitional states around them or (3) changing the nature of absorption and spew of the different matrix of reactants; and (4) it is particularly a goal to target the center of charge for this purpose to lift back the outer shells around the more compressed cores, so that the additional steps can be carried out.

Having prepared the reactants, the most complex step in fusion is bringing exposed neutron cores together and creating a new proton shell around the exposed neutrons. In prior art fusion, this process is randomized, heat is used to break up the reactant shells and the hope is that the elements will somehow combine to create fusion. For this reason, even where fission reactions are used to trigger stripping and combination results, only a 6% yield is expected using prior art fusion bomb techniques.

The mixer and expander means can serve a couple of purposes. One is to push together the neutrons, but it can also push apart protons and bring them back together to create a compression pounding effect like a pile driver.

Another way is to mix the elements, for example using ionized hydrogen (to give charge) cycled through the neutrons, perhaps with cycled electrons and even magnetic fields to allow near collisions of neutrons to occur in a mix that is stabilizing once they begin sharing information.

A more intact proton shell, perhaps expanded with lower information states to provide room for the neutrons to be contained, can enhance the result. Neutrons need to be mixed or pounded into proximity so they can enter the proton shell but without disrupting the stabilizing fractals or subsequently stabilizing the resulting fractals.

Fission type reactions can be enhanced by separating the neutrons and their proton shells at the proper fractal connections to encourage formation of separate stable isotopes and shaping the reaction to match those resulting shapes can enhance the transition.

This process recognizes the importance of stabilizing the new nucleus by adding information bundles including ct4t12 states with accompanying shells of lower ct states to allow the formation of stable bundles to encourage fusion formation by adding the type and quantity of information necessary for stabilizing the new neutron core according to the fractal model taught herein.

The change in the number of photons not only the changes mass but the center of gravity of the electron forming the higher state of energy. Instead of the electron moving, the entire spiral shape of the fractal is shifted, outward where photons are added. The photon "energy" is preserved because the photon is attached to the chain of information forming the electron just as the electron is connected to the protons by absorption and spew. The fractal nature of the math ensures that the energy states will tend towards set jumps from one fractal to the next, not "in energy." but in terms of pre-time information states compression altering the fractals, which are in the standard model attributed to spin and orbital energies, orbital energies being the equivalent of fractal stable increases in size.

This process can be viewed in terms of "beams of neutrons" being added to an expanded ct4 neutron core and then bathing the resulting combination in the type of ct states which would stabilize by providing the necessary absorption and spew to allow the fusion to take hold. The process if controlled would then slowly remove the fused result. Helium from Hydrogen in the simplest example and keep the reactant mix balanced or rebalanced to continue the process.

Inserting excited photons (photons with short fuses) into a portion of the bundle change the structure depending on the overall matrix of the fractal in question.

Fusion, Energy Generation

The cores can come in several forms: (1) increasing the amount of lower transitional states around them, removing transitional states around them or around one side of them and it is particularly a goal to target the center of charge (spew) or areas offset from the center of charge of any reactant for this purpose.

A method of practicing fusion for proton and electron shells comprising the steps of (1) lifting back the electron and proton outer shells around the neutron cores of two protons to be fused, (2) lifting back the electron shells around at least two proton cores; (3) separating the two protons, (3) bringing the two neutron cores together; (4) putting the neutron cores between the separated protons to form a new neutron core and (5) closing the proton and electron outer shells around the new neutron core (with the amounts of the information states necessary to stabilize the new core) according to the fractal model taught herein.

One aspect of this might be keeping the speeds of the movements down to levels allowing them to stay together or draining off the excess momentum.

The method can include the steps of treating the proton and electron as base 3 or base 6 fractal shells, treating energy as "essentially" pre-time change features of sub-fractals primarily within the ct3-4 transition, using energy generators defined and deciding which energies need to be applied and when.

Multiple reaction locations or serial reaction locations allow for continuous reactions to be practiced with this stepwise method.

A trigger for the reaction could be a plasma stream or a radioactive source delivering neutrons as a reactant, but AuT suggests the more important features are targeted changes in the informational matrix around the primary reactants including the structure and combination of lesser compression states.

The number of chambers and the shape of "dimensional features" may vary to get different effects of fractal manipulation. A larger fractal chamber, such as a five-sided cube would encourage a 5:5 type alignment as the larger fractal encouraged the smaller just as the smaller dense fractals shape the outer orbitals. While the sequence would be subject to experimentation a 5:5 chamber made of walls energy (photonic or wave) or any combination of ct states for ct4 alignment, transforming through moving the reactants or reshaping the chamber to a 6:6 type ratio when the stabilizing protons were added would be a natural progression.

In fusion, maintaining all the reactants as a plasma is contraindicated. Manipulating the reactants would be complicated by such a process. The plasma portion of the reaction can be carried out by introducing the reactants from the mixing chamber to one or more reaction chambers designed to give fractal structure to the different compression states surrounding the finished fractal, e.g. Helium. The changing structure of the reaction chamber(s) is an important aspect of this invention.

It is possible to sequentially control the reaction including fission and fusion reactions using features from the group defined by dimension specific, ct transitional state specific, fractal features, dimensional change specific features, absorption features, spew features, and targeting intermediary transitional features of these types between dimensional features.

Controlling the interaction of neutrons with containment is more likely using the same methods for dealing with the intervening spaces as the type of ct states they are and through their interaction.

Having items within the flow but outside of the plasma require cooling since few large fractal composites (fractals within fractals) can withstand the heat of the plasma. You can lower the heat required by the reaction by treating the reactants and making them more prone to fusion in the absence of plasma, by caring on the reaction adjacent to the plasma or by allowing the plasma to cool as the sequencing occurs.

Method: Fusion-Reactants

The simplest fusion reactant is deuterium. Tritium composites are also common reactants. Other reactants are 1) hydrogen, a pre-atomic state under fractal geometry and 2) a neutron donor state which might be deuterium or heavy water, by way of example.

The deuterium and Tritium example: there are three dimensional and at least transitional 4-dimensional features and there is the application of different transitional states which include (theoretically) T14 muons and could easily involve comparable transitional states in the transitional 4-dimensional features.

Since space is ct1-3 plus very low ct4 transitional states, the anti-matter may be used to manipulate information breaking down ct2-4 or removing it to increase the compression to bring the neutrons together or create the proper sharing mix of absorption and spew states to enhance a fusion reaction.

An example of material manipulation would be to slow the degradation of the containment vessels in fission reactors by targeting the fractal features of the reactor core: to introduce post reaction amelioration of the degrading ct states or to alter the containment materials to reduce the effect of the degrading ct states. It might be possible to make the degrading states into states that were of a spew type to strengthen the containment vessel using this method.

Focusing on the various fractal features involved allows quantum state position and charge features to be used for computing functions which increase the speed and accuracy. These change according to lower ct states changes. One step in such a process would be to use groups of these so that those changing due to localized ct1,2 and 3 changes could be dealt with statistically but based on hard math and not probabilities for quantum computing.

A method is described of quantum computing comprising the steps of creating quantum state electronics based on AuT dimensional characteristics of dimensional features.

The method of creating is selected from the group consisting of: creating Qubits by treating time as bubbles of information as partially durable partially changing dimensional arrangements of compression states; using at least one tie of lower state strands of information between at least two higher state of lower states to create information transfers; tracing a quantum state, such as a photon in its pre or post time positions: tracing using a net valuation but opening the possibility of a pre-time calculation of results; working with the location of quantum states or portions of quantum states as they move along a line or as they move back and forth between a group selected from compression or decompression; positive and negative net results, or folded or unfolded results; tracing particles states being traded back and forth between two places or between two higher state particles; computing using at least one of the 3 iterated functions defining the compression of the qubits; using the different ways of folding alignment, linear solution order alignment or other Lines of quantum entanglement and tracing vibrational changes for the chains of lower ct states connecting higher ct states together; using one or more of the elements making up a ct state or transitional state such as one or more of the 5 t12 elements making up an electron; cutting out shorter transitional elements that might more quickly shift the charge or including those shifting more quickly for the purpose of manipulating or computing; increasing or decreasing the lower ct features being manipulated as by using more of the lower ct features in elements of quantum change which have less time involvement to increase by relative speed from a time based perspective; minimizing or increasing lower ct changes to minimize or maximize errors resulting from change; using the difference of gravity because it does not have pressure of feeding off of a lower compression state which in turn supports a higher state as with all other states: exerting a pressure or using this exerted pressure for the higher than ct2 state compression and generally using the analysis for AuT fractal compression and decompression to use pre-time change to compute faster relative to the post time environment.

Chemistry up to this point in time has largely been like working with a jigsaw puzzle without knowing what the edges of the pieces look like. To some extent it has been working with a puzzle where the actual appearance is hazy. By way of example, electrons as standing waves have no appearance, and orbitals in order to give them energy levels. AuT provides a fractal model that explains the electron and its bundle in terms of discrete quantum results, at least within parameters defining the stability of the fractal in question and over a specific group of values of x.

The "prephoton laser" is a design to target specific fractal structures of quantum dimensional states. Such a device as a prephoton laser would apply laser concepts to ct state features.

Among the most intriguing features is the common source (fractal semi-stable states) for the different compression states and transitional states which are also the dimensional features of the universe and the source of force characteristics in the universe.

At this exponentially more quantum state, computing would be exponentially faster if the information could be read by such a laser operating with pre-photon reflection.

The model indicates that the various stable fractal states, neutrons and black holes being the most visible examples although planets fill a transitional place, absorb ct1 and spew exponentially higher compression states, e.g. neutrons absorb ct1 and spew ct2 as do planets: black holes absorb ct1 and spew ct3. This is not a fixed relationship but reflects net results and polynomial approximate net state solutions (ie. black holes might spew ct1 and ct2, but in amounts so much less than ct3 in quantity as to be less significant). Presumably these states absorb ct1 and spew ct1. We know this partially to be true under the model because there is a net absorption of ct1 by higher compression states on the earth, otherwise we would experience dark energy: gravitational attraction being the net result of ct2 absorption vs spew.

If you could upset this ct2 balance with a prephoton laser, you could generate antigravity (dark energy and anti-gravity are logically and necessarily the same thing) locally. The process would be no more complicated than minimizing gravity vs dark energy to float an object regionally relative to a mass or propel it away from a mass although any regional change may be affected the same way to the same effect; moving by concentration of one of two opposite states or manipulating opposite states so that the features may be maximized in a regional state.

The most significant types of changes would be making variations changing x but changing spatial components and simplifying the variables from exponentially compressive to less compressive or decompressive will provide for manipulation for better than other methods.

A pre-photon laser would operate more specifically and with smaller fractals.

The method is outlined fairly well at this point in time, and the name "pre-photon laser" is just a name for a process as opposed to something you'd point at atoms to create fusion just as a laser is a process that generates a beam of focused radiation within a given wavelength.

The difference in the prephoton laser is that there is no radiation as such, radiation being a function of pretime elements of ct3-4 transition states.

No one has ever attempted to design such a device because there was never a sufficient understanding of how these features worked to look for one.

For pre-AuT lasers you have Line width-purity of radiation frequency compared to purity of compression state.

Coherence reflects where all of a limited group of ct state fractals are polarized in one direction and in phase, synchronization allows for energies to be focused and thereby increased; all these things can be simulated in lower fractal states and in higher ones.

AuT can improve existing lasers in the same way. AuT focuses on several places where absorption occurs, at the electron, the proton or the neutron. However, it can also focus in theory at the photon and any other sufficiently stable transitional states, typically seen as invisible or non-existent by pre-AuT physics.

It should be possible to increase the amount of ct2-3 transitional states relative to any other pre-photon structure. Indeed, the opposite side of the equation, changing the structure of transitional ct4-5 structures relative to the black hole must happen constantly with returns to stability all around us or compression would be functioning differently.

Moreover, understanding that additional transitionally stable states exist, it should be possible to have new forms of ct3-4 laser absorption/emission.

Since radiation required at the ct3-4 state are very narrow to get just the right result of excitement to a partially stable state of excitement (compared to too little information to maintain the destabilized state for a period of time or so much that the structure is broken down, as by ejecting an electron), it is likely that we do not see these as they occur in nature because the energies are either too rarely in that wavelength/frequency range or (more likely) because they are hidden by polynomial approximation from our view if we do not look closely for them and are also hidden by time considerations where we only see net results, as with gravity.

Spontaneous emission: When the energy is raised in a system this can be viewed as "spew" increases where lower state to higher state ratios are upset. Absorption is the opposite effect. This process occurs at all levels including with stable transitional elements and this includes at the pre-photon level although the spew in such a case is ct2 stable transitional states.

This is the same process as in absorption but in reverse. Again, in AuT the light is never annihilated nor created, but merely changes the matrix. Vacuum energy also does not exist but is replaced with ct1-ct2-ct3 and possibly low ct3-4 transitional state interactions which are the source of the Vacuum energy misunderstanding.

Stimulated emission is accomplished by having a photon interact with the excited electron to get it to fall back. This is where the pre-photon laser comes into play. In AuT, the idea is that a beam of T4 or T8 states pushes enough of the wave states out to allow destabilization of the ct transitional state under examination.

Instead of focusing on T12 composite electrons, the focus would be on, for example, the T12-T8 or T12-T4 state to get a more specific result.

Compression/decompression into a stable matrix mirrors the reason why Hydrogen, a ct3-ct4 transition state exists in pairs and why Helium involves paired protons and Neutrons. There has to be high enough information sharing to create a stable matrix or the unit reverts back to the next lower information stable state. This is, in fact, why the electron can be held in an excited state, the same type of pair is forced on the system.

Antimatter may be produced by building antimatter generators generating antimatter based on the differentiation of charge described herein. Using antimatter based on the understanding of its role in breaking down certain ct states into lower ct states can also be undertaken.

The math of AuT describes method of working with block chains utilizing the math model of AuT of generating data and then using it to form subsequent solutions to mark or otherwise maintain a blockchain as inviolate.

The algorithm such, as at least one hinge type, compression type, free state type or combination taught may be given to unlock the chain in the form of all or a part of the hash or contents of one or more blocks.

The results are limited regionally or by the number of decimal points or the specific compression level to be utilized based on a compression state tied to the number of decimal points.

It can be improved or at least changed by separating by partial solutions comparable to the whole or sub solutions on scales comparable to planetary, solar, galactic or universal regions to create a divisible bit coin or account separating similar or different types of information, such as billing and medical data allowing the access of one or the other selectively given the information available concerning the starting point number, the feature (e.g. compression, hinge or free state), the compression state (e.g. ct1, 2, 3, etc) and the like and since you cannot change a value of x without changing all of the aspects of the result and because of the complexity capable of generation with this exemplary model, the safety of the data can be maintained.

Life takes advantage of recycling information regionally and the cause and effect question seem even more important here, but the same answer applies. At the quantum level, quantum predestination rules, at the molecular level, forms mimic the recycling in cells and in the sloughing off dead material.

It is possible to have a method to block, break up or otherwise change, interfere with or build specific fractal to treat conditions like old age and cancer or other illnesses or improve functions or decrease functions of higher or lower fractals within a system, matrix, region or body by targeting specific fractals for desired change or inserting fractals within a system with an emphasis on changing the fractal makeup. Treating medical conditions by controlling pre-time changes within the human body is possible and a method of treating a medical condition can be seen as blocking, breaking-up or otherwise changing the interface with or the structure of a fractal to treat a condition by lowering or improving the function of a higher or lower fractal with a system, matrix, region or body.

Life has figured a way to tap the pre-time states as energy to control the way that information is arranged. For this reason, thoughts can be transferred as by taking a time bubble of information from one brain and inserting it within a comparable matrix in another brain. But since quantum time is controlled by lower et states which are not controlled: any changes made would be confined within the limits of those lower ct state definitions forcing things to repeat within the fractal framework defined by time which allows for dimensional states to be forecast and controlled based on this underlying consistent change.

LiH3 gas to be pressurized and accelerated against proton plasma; then mixture allowed to stabilize down the way in an electron bath. Alternative accelerate plasma into lih3.

It is currently being applied in modeling of fusion reactors, quantum computing, and in materials science.

Gravitational features suggest that a spiraling together neutrons (and/or other lesser compression states) is conducive to fusion. Both the sun and the earth generated fusion models of AuT suggest that pressure is at least as important and that pressures at the interface of the crust and mantle of the earth are adequate for that purpose. The fusion bomb model suggests that higher pressures are required, but there are reasons to opine that this can be dealt with because in any equation under AuT, all elements are the same. The pressure equation can be significantly altered, and this brings into play the potential for using spiral compression along with dimensional variants in pre-time space.

The pressure equation (pv-nrt) can be broken down. NR can be eliminated for purposes of the discussion as constants in each volume. Pressure being the effect in question is a function of temperature and volume. Volume in turn can be broken down as ct1-ct3 along with early ct4 transitional states at or below ct4t12. Temperature reflects the pretime changes in this volume reflected in time which is the energy portion of the temperature. Pressure then is a function of pre-time change of the volume divided by the volume or, effectively, pretime change divided by total amount of information subject to change.

In the case of fusion, the primary elements are neutrons and the spew states that separate them, the ct1-ct3 and ct4 up through ct4t12 plus the higher ct4 transitional states that have to be moved out of the way. By figuring out what states are relatively ineffective in separating them neutrons and removing those, the pressure in the system may be increased outside of the neutrons and reduced between the neutrons and, in part, this can be done by putting protons around the neutron core of two or more neutrons and then bringing them together. It can be further enhanced by putting electrons around the protons and doing the same with them.

Since separating particles at this level is difficult, the idea is to have an unstable core of neutrons, an unstable core of protons around it and an unstable core of electrons outside of the protons and then to bring them together by eliminating non-absorbed states including those which emanate as spew, to some extent this can be encouraged by having the neutron core require more absorption to be balanced than spew and the same for the protons and electrons.

Knowing what absorptions and spews are involved in the compression and the environment can manipulated with other spewing and absorbing combinations to get the reaction to occur. Moving by concentration of one of two opposite states or manipulating opposite states so that the features may be maximized in a regional state.

One method is determining spew characteristics desired (e.g. absorbing ct1 and spewing, for example ct2) which might bring together greater than absorbing ct1 and spewing ct3. These features can be changed as the reactants move.

2. BRIEF DESCRIPTION OF DRAWINGS

For a further understanding of the nature and objects of the present invention, reference should be made to the following detailed description taken in conjunction with the accompanying drawings in which like parts are given like reference numerals and wherein:

FIG. 1 shows a diagram of the preferred embodiment of a fusion reactor constructed according to the teachings of this patent.

FIG. 1A is a detail view of the items 73d and 73e through the 1a-1a axis of FIG. 1.

DETAILED DESCRIPTION OF THE PREFERRED EXEMPLARY EMBODIMENTS

Figure 1:
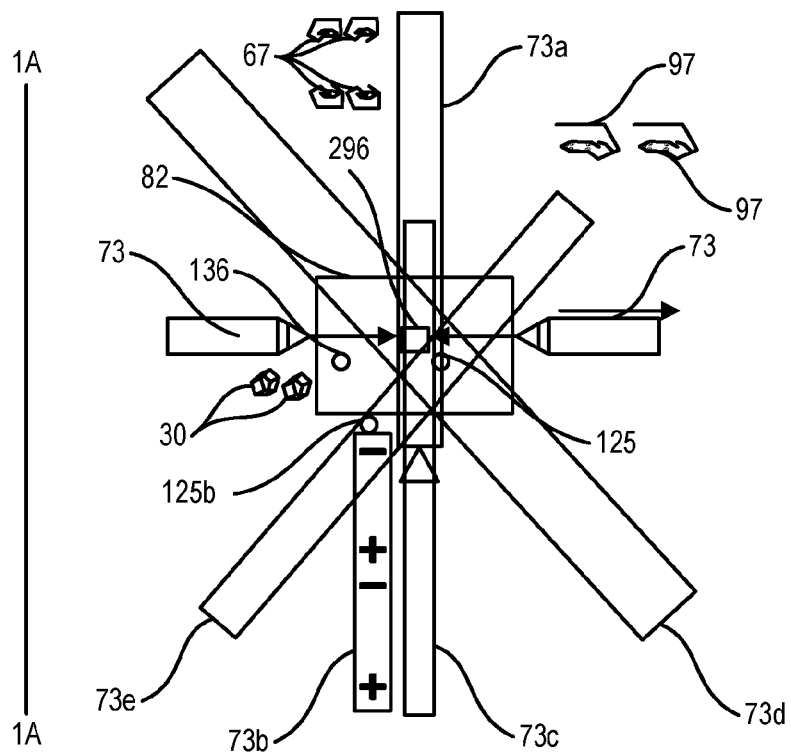
FIG. 1B is a detail view of items 97, 67 and 30 from FIG. 1.
FIG. 1C shows a concentrator means in one embodiment from FIG. 1.
FIG. 1D shows a side view of item 307 from FIG. 1C
FIG. 1E shows a spiraling means.
FIG. 1F shows an alternate to FIG. 1E.
FIG. 1G shows how fractals interact at the electron level.
FIG. 1H shows the change in FIG. 1G.
FIG. 1I shows Helium fusion.
FIG. 1J shows an alternative to FIG. 1.
FIG. 1K shows an alternative to FIG. 1J.

FIG. 1 shows how a reactor according to the model could be constructed using techniques of the prior art as modified by this invention. Neutrons 30, protons 67 and electron shells 97 are treated separately and according to the presence as collections of lower ct states and their stabilizing effect. Also shown in FIG. 1 is concentrator means 296 for holding and compressing reactants, particularly as a substrate.

It is helpful to provide examples of how the fractal approach differs. A new feature would be to affect the stability of a proton by affecting the individual transitional ct4t12 states of the electron. An example of a traditional manipulation would be using plasma temperatures and magnetic containment for separating protons and electrons. Another new feature is the reacting of the most compressed feature of any reactant through the elimination of interfering lower transitional states and the addition of shared low compression states as absorption and spew within a matrix. This can be compared to the old idea of "generating a vacuum" which is an inaccurate view of the collection of possible reactant states within a pre-time matrix where a reaction is held.

Designations like electrons, protons and neutrons are used for convenience and, respectively this might be better described as collections of ct4t12 172 states stabilized with ct4T16 176 states and ct4 4 states because the terminology of the standard model is only useful for approximating the structures defined.

In order to create a fusion reaction, it is necessary that ct1.2 and 3 states be removed from between the neutrons 30 to the extent they are not shared. While ct1 was designated as "space." it is better referred to as ct1 since "space" according the standard model is ct1, ct2 and ct3 along with some lower transitional states of ct4. While often referred to as ct1, ct2 and ct3; the lower transitional states of ct4 along with unobservable higher transitional ct states can make up what is called "space" in the prior art.

After desired amounts of ct1, ct2 and ct3 and other aspects of space are modified to allow direct sharing of spew and absorption between two neutrons in ct5t1 fusion and to bring ct4 transitional states together into ct4 base 10 states in ct3-ct4 fusion, it is necessary that a stabilizing shell of protons and electrons be constructed around the combined neutrons in ct5t1 fusion and to bring an additional neutron 4 and a stabilizing shell to create stable neutrons in ct4-5 fusion. The newly stabilized atom allows for the release of enough information from post time states to create the beneficial or destructive "energy" effects.

Here, neutrons 30 are fed from a neutron source, here reaction driver means 73 for supplying neutrons, into the reaction chamber 82. Protons 67 are then accelerated by top driver means 73a and bottom driver means 73b towards the reaction chamber 82 to compress the neutrons 30 between the streams of protons 67. To increase the compression and help to create stable shells about the neutrons a stream of electrons 97 is driven through the same top driver means 73a for accelerating charged particles or bottom driver means 73b for accelerating charged particles although separate drivers can be used for the electrons and protons.

The various driver means can both insert and remove information sequentially and reinsert information where pulsing is required to mix or compress or decompress the information mix defining the different forms of information within the reaction chamber. One type of information may be used to push another out, such as using energy to push neutrons together and remove pre-time information states between the neutrons, but also the ensure that shared information states between neutrons and stabilizing information states around combined neutrons are present.

In this case top driver means 73a and bottom driver means 73b are magnetic coils. As will be understood, it may be helpful for ct1-ct3 states (not shown) to be drawn out of the reaction chamber through vacuum line means 136 which can be identified as a means for preferentially changing the mix of ct1, 2 and 3 and low compression ct3-4 transition states within the reaction chamber 82 sequentially or otherwise. These are not traditional vacuum lines since traditional vacuums do not exist in AuT, but that is the closest designation available and they may otherwise be thought of as ct1, ct2 and ct3 state removal systems.

A fourth driver means 73c for accelerating compression, such as a stream of photons, typically by lasers, may be used to further accelerate one or more of the reactants.

One way to practice the invention to to use a stream of charged atoms to achieve compression by bringing them into continuous contact with the reactants. This could include streams of protons via a plasma, but it could also include ionic hydrogen, electron streams and beams of lower ct states, like lasers coming in sequentially to compress at least some of the reactants.

Figure 1A:
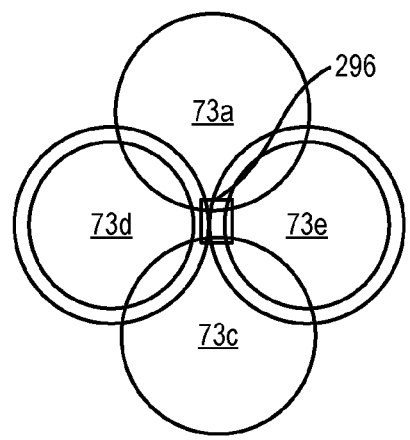

FIG. 1A shows a side view through the 1A-1A axis of FIG. 1 of items 73d and 73c.

Fifth driver means 73d and sixth driver means 73e can be provided for additional dimensional addition of information continuously as they are looped as shown in FIG. 1A. They can, for example, be provided to accelerate the electrons and the driver 73b may only accelerate the protons. Driver means 73d goes beside the concentrator means 296. Driver means 73e is shown going through the concentrator 296. These are continuous delivery systems as opposed to loading reactants, at least for the sequence of time to which their carried reactants apply.

To remove helium or other contaminants (anything which is counter to the reaction) from the chamber there is at least one reactant recycling line means 125 can pull off reactants. At least one second reactant recycling means 125a is shown outside of the chamber 82 or at least outside of the concentrator means 296.

Figure 1B:
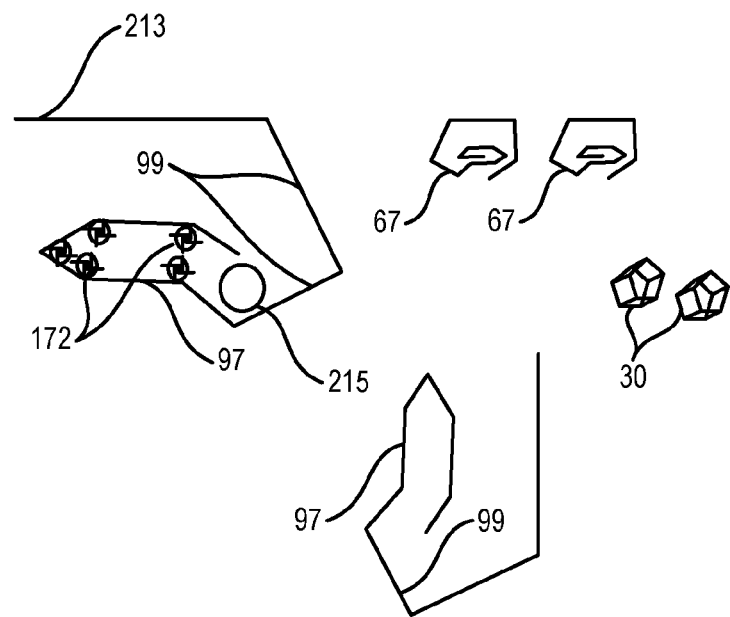

FIG. 1B shows the electron 97 viewed as an approximately six sided ct3-4 transitional fractal, with 5 ct4T12 172 states forming the primary elements of the shell 97 of the transitional fractal. There is an opening 215 in the shell and a bundle 99 of information extending from the five ct4t12 172 states to the end of the bundle 99 at leg 213. This looks like and is like galactic spiral arms, although with a lower dimensional footprint and for the same reasons, one being the fractal equivalent of the other. The 'subtle' difference between the bundle 99 and shell 97 is based on the fractal nature of the shell and the surrounding nature of the bundle 99. The two designations necessarily overlap but can be distinguished by the effect of the t12 states on the surrounding cloud of information which forms shell 97.

The open spiral form is due in part to the spew and by extension absorption of the higher compression states since the lower information states must, using spiraling outward (spew) or inward (absorption) get to the center of compression in bulk to stabilize the structures. Knowing these structures, they can be targeted in order to manipulate dimensional results.

The proton 67 has a similar spiral shape, although it tends more towards the 10 sided fractal shape of the neutrons. The neutrons 30 are not open to higher states, although they are not entirely closed as they absorb lower ct states from the surrounding matrix to pull other neutrons and other lower ct states within their orbits. The sizes are shown as they are expected according to the model, but are not to scale, scales being impossible to show because of the exponential compression. The idea is to pick a fractal having sufficient pretime elements to do quantum computing experiments. Rather than having a complex supercooled isolation of an electron; the shell designated as 99 in the drawing; the more complex fractal model would be used. The shell is used as a fractal with minimal pre-time elements changing compared to the person although both are scaled similarly.

Figure 1C:
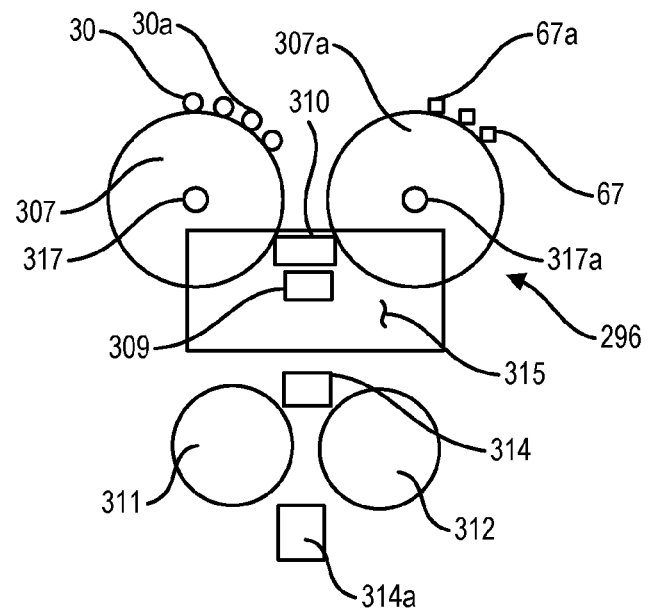

FIG. 1c describes the operation of a Catalyst for the reaction in a non-thermodynamic environment, concentrator means 296 is shown in one embodiment in FIG. 1C.

This model uses the new science to select reactants, particularly for fusion. In addition, dimensional states may be used for holding protons or neutrons to bring them closer together or separate them into another concentration medium.

The concentrator means 296 detailed in FIG. 1C has a first substrate means 307 for holding neutrons 30. Neutrons 30 are delivered to the concentrator means 296 as taught relative to FIG. 1 and become attached neutrons 30a. A second reactant, here protons 67 become attached protons 67a to a second substrate means 307a. The means 307 and 307a are determinable materials from the prior art including catalysts.

Both means 307 and 307a may be mounted and rotational about first spindle means 317 and second spindle means 317a respectively which allows them to be rotated closer to the reaction chamber means 315 which provides a location for the reaction to the extent not handled on the means 307 and 307a. To get the reactants free at least one first scraper means 309 can provided which can engage by moving operatively to location 310 to mechanically, electronically or chemically separate the reactants on means 307, 307a or both. The scraper means can be eliminated by having means 307 and 307a brought together into physical or, more accurately, reactional contact.

A third substrate means 311 and a fourth substrate means 312 may be provided with a second scraper means 314 to sequentially provide other reactants, such as electrons or photons into means 315.

The scraper means 309 and 314 may be physical or electronic, changing the charge or fields of the substrate means 307 and 307a. The scraper means 309 and 314 is a means for releasing a reactant and might be nothing more complex than releasing or reversing a static charge on the substrate means to which the reactant is attached.

Figure 1D:
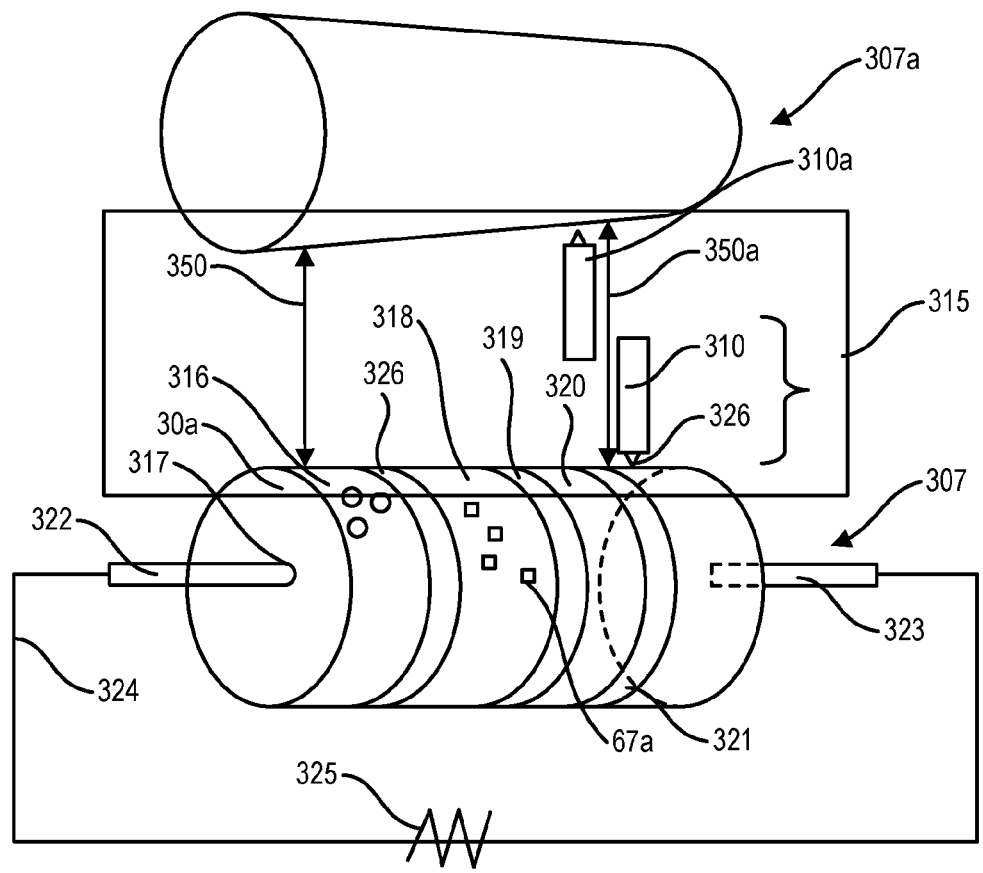

FIG. 1d shows a side perspective view of one embodiment of item 307 and 307a from FIG. 1c. In this view you can see the scraper having varying amounts of contact where the extended point of contact 326 can be retracted within the scraper means 309. The number and amount of staged contacts (whether energy related, chemical or mechanical) can be varied within the disclosure set forth herein to control the type and amount of information present both within first substrate means 307 which can be drawn out and around means 307 in reaction chamber 315 to get different stages of reactions. Here, the first scraper means 309 moves along item 307 so that the at least one scraper means 309 can vary the release of the reactants. More than one scraper means 309 may be present and these may act in concert to free reactants together or sequentially as shown in more detail in other figures.

There is an information delivery means 324 for bringing or delivering information, for example charge toward or away from a resistor means 325 for accepting or delivery of charge to the first substrate means 307 by way of a first spindle arm 322 and second spindle arm 323. In this case you have first insulator means 326 separating first catalyst means 316 from a second catalyst means 318 separated by a second insulator means 319 from a third catalyst means 320 separated in this case by a third insulator means 326 from the second spindle arm 323.

One or more reactant, here items 30a and 67a can be present on a single substrate means, here first substrate means 307 having two different reactants.

One purpose is to put reactants in proximity along with a proximate stabilizing matrix of lower compression states in the order required for the reaction.

Above the first substrate means 307 is the second substrate means 307a which would be similar in design and have a second scraper means 314 functioning like the first scraper means 309. It can also be seen that the second substrate means 307a is cone shaped in this embodiment which changes the shape of the reaction chamber 315 to the extent it is defined by the changing separation from a wide separation 350 to a narrow separation 350a due to the taper of the second substrate means 307a which is a way to have the reactants, in this example only items 30a and 67a are specifically identified, flow toward the wide separation 350 or narrow separation 350a as the pressure increases or decreases for the reactants sensitive to the dimensional features of the fractal surfaces of the means 307 and 307a change in the reaction chamber 315. The change in reactants due to the action of the first scraper means 309 and second scraper means 314 necessarily results in a different matrix of reactants within the reaction chamber 315 at different locations within the reaction chamber 315 in this embodiment.

Figure 2:
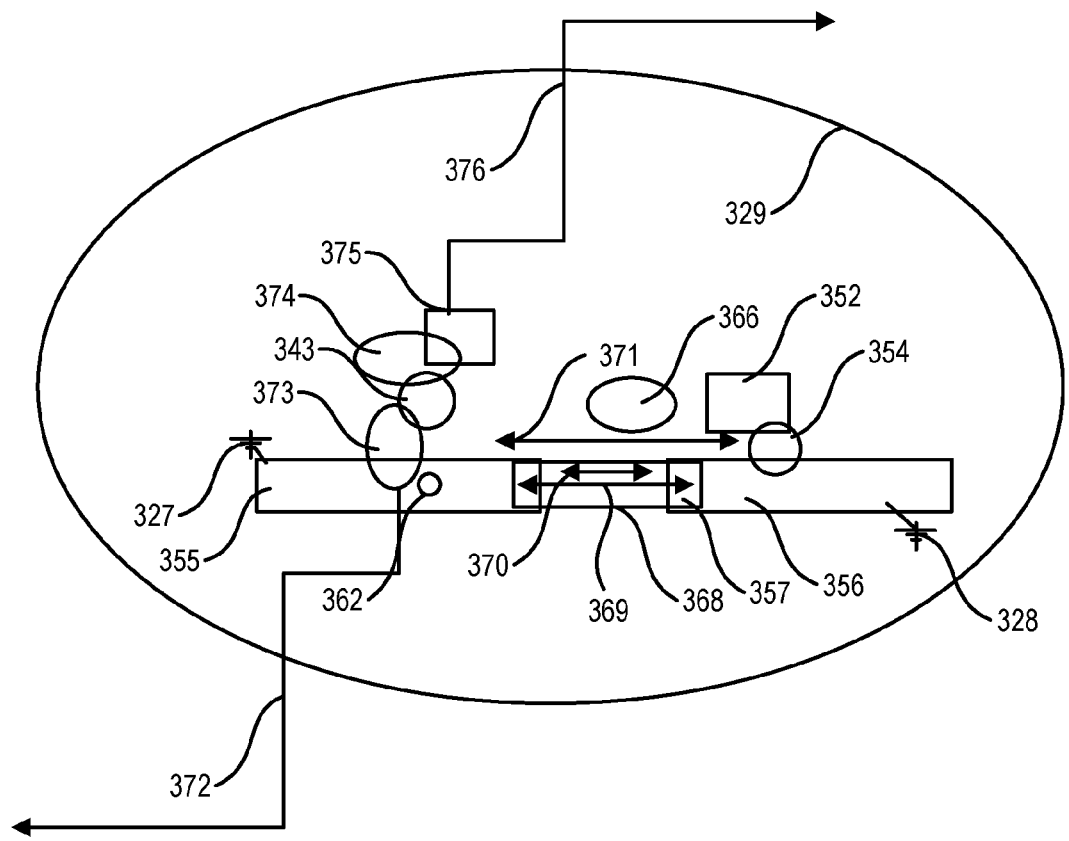
FIG. 2 shows a catalyst and should be viewed in conjunction with FIGS. 2A-2B.

As shown in FIG. 2, some of the added information, added information 362 (possibly T12 or T6 ct4 transition states) may come from the catalyst arm 355 or go into the catalyst 355 to enhance the reactant in this case core 375. The suggested operation of a catalyst is as follows: Information 362 within the catalyst 355 is operational to move separation within the catalyst between the first separation 369 and second separation 370 to bring the reactants 351 and 352 close enough to react, to share a fractal structure reflecting the sharing of information, squeezing out non-reactive states from shared reactants information 366.

If items 374 and 352 are joined 366 because part of the shared information 353.

Information 362 may go to item 366 or the core 343 or both in the operation of the catalyst to attract and hold the reactants and bring them together. The movement of information 362 may be reversed with information 362 going back into and re-expanding the catalyst to its longer form to separate the reactants once the reaction is completed.

Once brought together the cores 351 and 352 share absorption and spew. This loosens the hold of the catalyst arm 355.

A current source means 327 for providing a stream of the type of information, theorized as t12, which can be pulled from the catalyst matrix 329 which is the ambient environment around the reaction which may be enriched with free t12 states or loose t12 states as is envisioned in, for example, a dissolved salt (NaCl) water solution and drawn out of the catalyst at a catalyst resistor 328 to generate electrical energy or other informational energy more directly.

This structurally creates energy by taking some of the shared information 343 into the catalyst and then pulling it out as with using current by having an current heavy environment around the catalyst and pulling it through the shared information into the catalyst arm 355 and then pulling it to a resistor 325. The exact shared information necessarily varies.

The operation of bonding in general is sharing information in the fashion generally shown for two protons in the H2 case. In a catalyst, information goes from the catalyst to the shared information, the catalyst then moves the location of the reactants relative to one another, and the shared information is returned to the catalyst without or without information in the form of heat or energy to enhance these features.

Information may be added externally to stabilize the two neutrons in the manner taught in the invention disclosed herein.

The catalyst process for fusion can be described with these steps: 1) generate neutrons. 2) secure the neutrons to a first substrate. 3) alter the information of the substrate to bring the neutrons closer together to generate compressed neutrons. 4) supply protons, possibly from a second substrate to stabilize the compressed neutrons: 5) add such other information as is necessary to stabilize the reactants. 6) take the excess information in the form of energy to utilize as power.

In a broader sense, the idea is to mechanically, electronically, chemically concentrate neutrons with other reactants on a substrate. The substrates or catalysts and/or effective interaction of arm 355 may have varying and alternating bands and mechanical, chemical, electromagnetic and/or photonic assistance to change the features of reactants or bring reactants together or even separate them.

This would enhance feeding together (push neutrons closer while connected or immediately after disconnecting them from the substrate and presumably would include adding stabilizing information features of the type taught in this There may be in this process Neutron holding. Proton holding and Electron holding along with a means to pull everything together. Also shown are ways of staggering material and mechanisms to hold them together or separate them.

The fusion process may be described according to these steps: 1) separating out neutrons from their associated shells to the extent possible within a matrix of ct1-ct3 states; 2) utilizing the compression of ct states between ct1 and ct4 to crowd out lower ct states until the neutrons are sufficiently close to allow the sparing of spew between the neutrons and 3) utilizing ct3-4 transition states in order to provide a stable shell to allow for the absorption and spew of the neutrons to be maintained. While these terms require additional definition, that definition is provided in this specification.

Figure 1E:
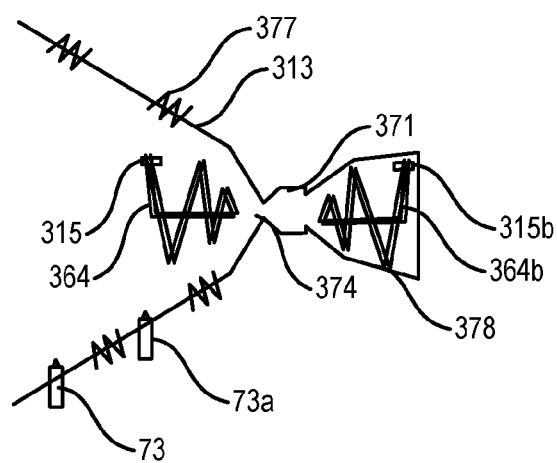

FIG. 1E shows the most mechanical way to bring things together in a spiraling fashion, by providing a track means 364 shown here as an actual F-series spiral for carrying reaction chamber means 315 either within or on the means 364. A compression means 313 (shown as a reduction in diameter) increases the pressure while heater means 377 adds heat to get to a stripper means 374 (here shown as a narrow diameter opening) to minimize the reactants that come into the expansion means 371 here shown as an expanded opening for allowing the reactants to stabilize. An anti-spiral means 346$b$ is shown for allowing compression along an expanding spiral for carrying an altered reaction chamber means 315$b$ to enhance or continue the action of the expansion means 371 within depressurization means 378 here shown as an expanding chamber of increasing diameter as it moves from the expansion means 371. The material of each of these chambers may vary in order to encourage the effects desired as taught herein.

Figure 1F:
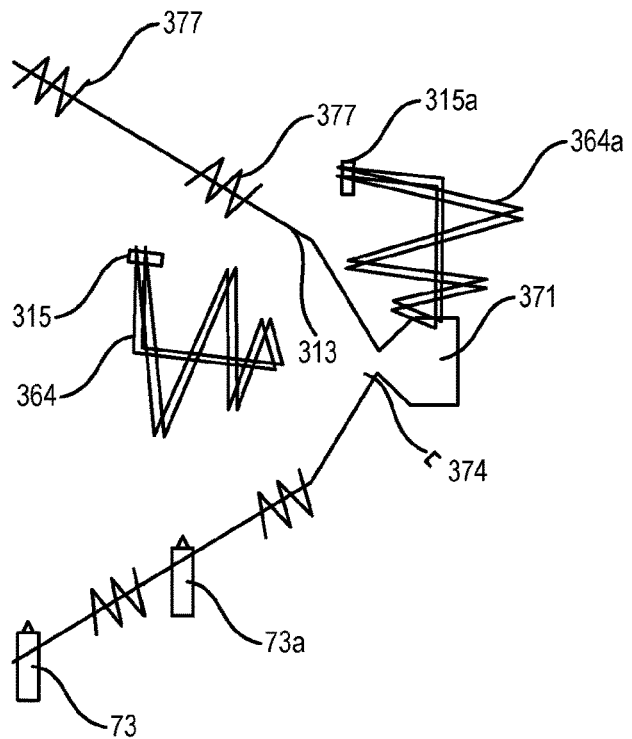

FIG. 1F shows a second reaction chamber means 315$a$ can be collided along a separate spiral track means 346$a$ shown here outside of the compression means 313 (although it could be beside the means 346 in the compression means 313) and here entering the means 371 without a stripper means 374 although one could be included in the fashion shown in FIG. 1E.

Figure 1G:
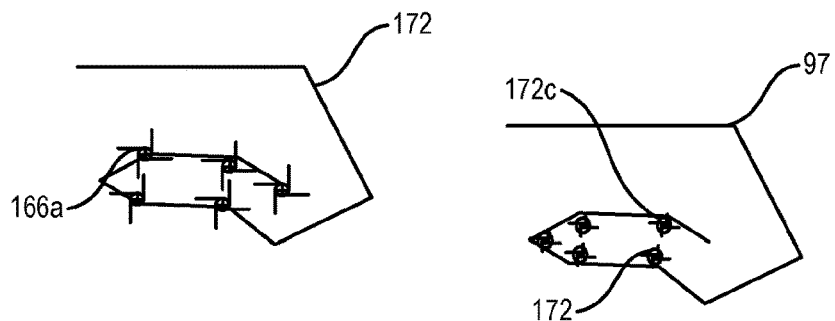

FIG. 1G shows how fractals interact at the electron level, here showing an electron shell 97 primarily built from ct4t12 states 172 with one ct4t12 state 172$c$ being separately identified. The rest of the shell 97 is defined by lower ct states. Also shown in the corresponding ct412 state also shown as a base 6 shell and made of a lower state, here theorized as 5 ct4t6 states, one of which is shown identified as 166$a$.

Figure 1H:
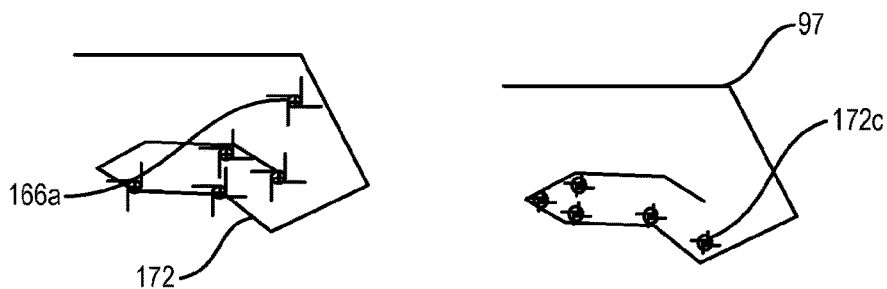

FIG. 1H shows the change in FIG. 1G in the pre-time elements of 172$c$ and the even greater pre-time element 166$a$ having moved within the items 97 and 172 while the basic structures have not changed otherwise. Given the number of elements changing net charge both in pre-time and conglomerate post time frames, one can see that the system is dynamic.

Figure 1I:
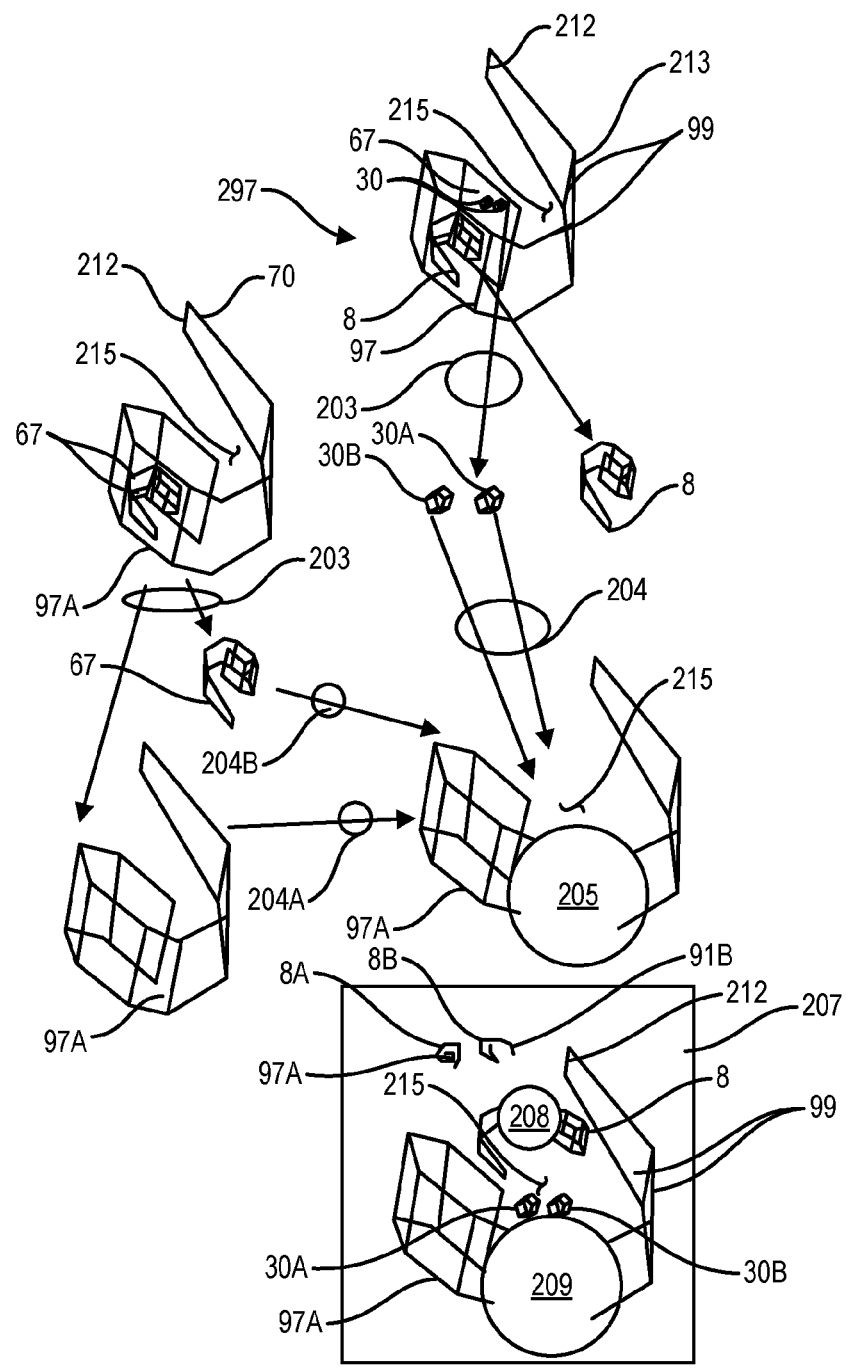

FIG. 1I takes the construction generally shown in FIG. 1 through FIG. 1H and shows Helium fusion. For clarity, the proton shells 8 are drawn as matching spirals to the electron shells 97.

The first step in the process is to add such information energies 203 as are necessary in order to separate protons 67 from neutrons 30. The energies are ct states of a desired compression with desired post and pre-time elements.

A second set of information energies 204 push the freed neutrons towards a proton shell 97A which has been opened with third energies 205.

Here the new shell 97$a$ is created from hydrogen atom 70 which have their fractal structures opened with third energies 205.

Once combined, information energies 207 must be applied to hold the constituent parts together so they can react. To encourage reaction, reaction energies 208 are envisioned. While the term energies suggests that it is the addition of information, it can be the withdrawing of energy, as by having closing energy 209 to close the new electron shell 97A about the neutrons 30A and 30B while forming a proton shell from proper alignment of the proton centers of charge 91A and 91B. There is a closed neutron 30A and a partially open neutron 30B shown to indicate that by destabilizing the lower ct state protons, the neutrons within them can be destabilized to allow reaction. Just creating a plasma to give this destabilizing effect is only part of obtaining a fusion reaction which requires re-stabilizing the molecule produced from the atoms.

Figure 1J:
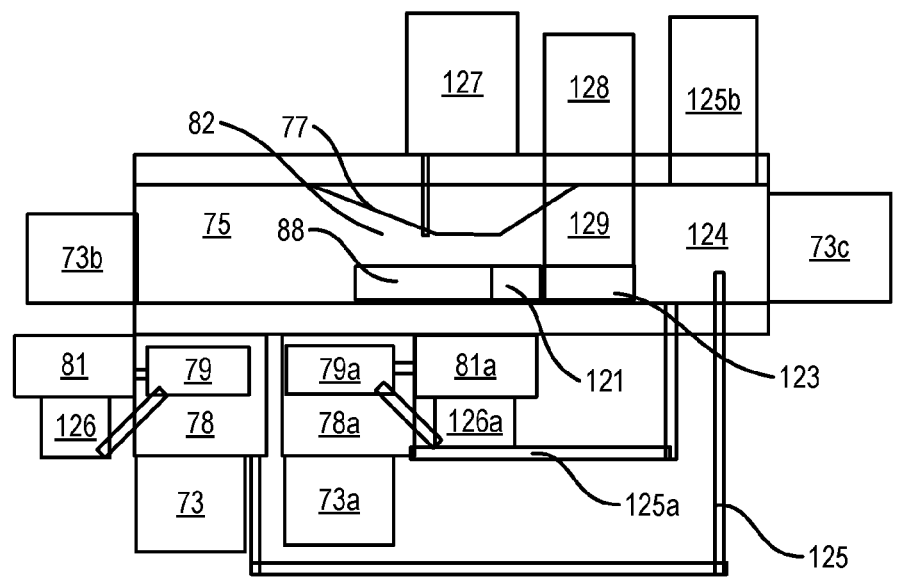

FIG. 1J shows a reactor having a mixing chamber 75 receiving a first reactant (hydrogen) 78 pushed by a first source driver 73, moving the first reactant into a first strip chamber 79 where the outer shell (step II) of the first reactant is modified by a shell stripper means 81 for reducing the compression of a reactant shell before it is introduced into chamber 75.

This process is mirrored for the second reactant 78$b$, second source driver 73$a$, second strip chamber 79$a$ which feeds into the same chamber 75 once the second reactant is modified (step III) by second shell stripper means 81$a$.

The reaction driver means 73$b$ pushes the reactants from the mixing chamber 75 to the reaction chamber 82 which may include concentration as by ramps 77 reducing the chamber size, a plasma generator 121 and a heat sink 123 which may be used to increase and reduce the heat of the reaction respectively. A trigger means 88 is shown. This could be a plasma stream or a radioactive source delivering neutrons as a reactant (as opposed to coming from a driver source 73) or energies of the type involved in a reaction like this. The suggestion is that alpha (helium) particles might not be a trigger, but they could act as a catalyst. Neutrons are a reactant, but there are also the gamma rays and other ct state effects seen as high energy which can come from a radioactive source. A more direct potential is that radioactivity includes the transition of protons and neutrons and this involves the opening and closing of the ct4 state which can open the proton shell and compressing the proton-electron interface to create a neutron.

The number of chambers of any type may vary to get different effects of fractal manipulation.

The plasma trigger means 88 can be used to open protons. The use of different reactants means that at different points you can have different purity of plasma and reactants.

The ramps 77 could be replaced with other dimension reducing features, such as accelerating the reactants together with magnetic fields, lasers and/or pistons.

The heat sink 123 may draw off heat to use the reaction for power generation in the manner taught by the prior art or may be replaced with a new process of the type taught herein, namely taking states which were previously thought of as energy (e.g. changes in the Center of Charge 93 over values of x) and migrating those changes directly to a generator means 108 for generating power from the reaction.

Part of the reaction is stabilizing and a stabilizing chamber 129 communicating with the reaction chamber is provided for this purpose with a stabilizer means 128 for providing stabilizing elements required (step V). A separation chamber 124 is envisioned with a separation driver means 73c which removes helium to the helium tank 125b, and returns unused reactants through reactant recycling means 125 and 125a.

The mixer and expander means 127 can serve a couple of functions. One is to push together the neutrons 30, but it can also push apart protons and electrons and bring them back together, mixing the reactants.

Waste products relative to any stage may be removed by waste means 128 and 128a for drawing off information states which are produced during the various stages of the reaction.

The compression from Hydrogen to a Neutron involves not only the compression of the Hydrogen, but also the stability of the resulting transitional states. It is envisioned that energy for the rest of the reaction could utilize this lower energy reaction in the mixing chamber 75 and/or reacting chamber 82 shown for a reactor shown in FIG. 35.

In concept Plasma stability can be achieved by creating a desired spew pattern, resulting fusion including a solid object of high neutron content within the plasma to provide neutrons to stabilize fused states.

The sun is a molecular fractal state with a core spew largely hidden by the high spew rates on the surface which may supplement, mask or even diffuse the core spew. Ct1 absorption followed by a higher state spew and increasing higher compression states internally. At the surface of the molten layer of the lesser earthly fractal state a similar result is possible.

For fusion, one idea is to create a plasma may be stabilized by recreating the "solar spew" effect on a small scale with the center or perhaps even at the edges of a plasma field at plasma generator 121 which is kept at a high energy and compression state for this purpose.

Figure 1K:
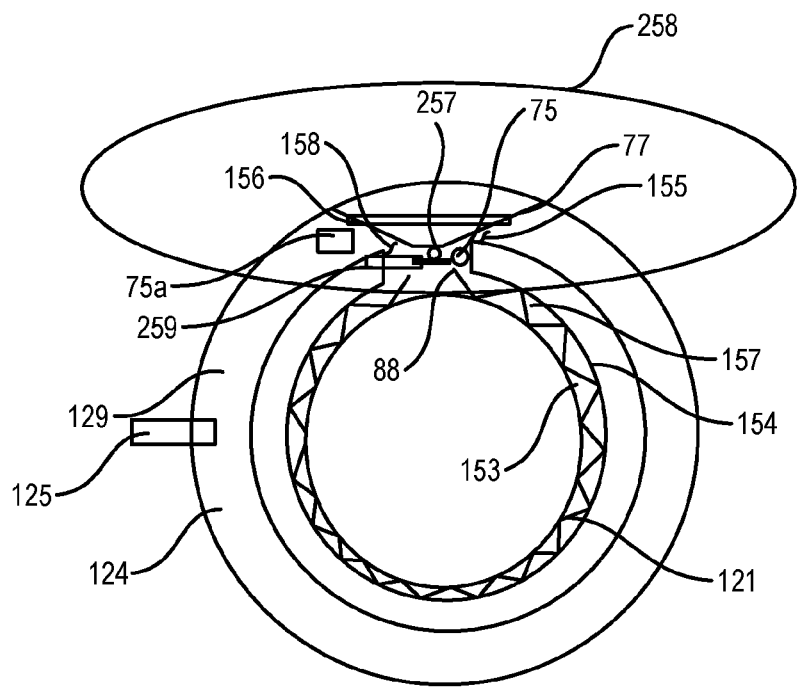

FIG. 1K shows an alternative arrangement where a torus type design is utilized. The same method of introducing reactants into the mixing chamber 75 is used. Other reactants may be added as at 75a. Here a plasma generator means 122 generates plasma in plasma generator 121 which is shown here as a plasma torus 157.

Maintaining all the reactants as a plasma is contraindicated only because manipulating the reactants would be complicated by such a process. Instead the plasma portion of the reaction, separated from the other processes, can be carried out by introducing the stripped proton and neutron reactants from the mixing chamber to one or more reaction chambers 82, here through a plasma inlet 155 (bypass means 156 can control the flow) where it contacts plasma in the plasma generator 121 defined by plasma torus 157 maintained by a plasma generator 122 within the torus 157 by inner magnet means 153 and outer magnet means 154 which together form a reactor 258. The use of the bypass means 156 for allowing material to pass through guide means, here ramp 77, allows for some material to be channeled away from the trigger means, here the opening 88 to the plasma in the plasma generator 121. The ramp 77 and bypass means 156, along with inlet 155, allow the proper concentration and structure of the reactants to be directed to trigger 88 timing the reaction to be controlled by this combination as a flow control means 259 overlapping with or being part of the reactor 258 to ensure that the reaction is done when the reactants are at the optimum state for various stages of the reaction and the torus design means that a plurality of these flow control means can be used around the torus 157 with various reactors 258 although only one is shown in only one place. In this drawing injectors 257 and 258 can be seen where the reactants are fed into the chamber 75 before being acted on by the various reactors 59 and mixing chambers 75 and 75a.

This corrects the mistaken belief that plasma is necessary to maintain the reaction. This allows the plasma to be brought to a reaction temperature only to allow separation of protons from their electron shell as it approaches item 155. The protons separated by the plasma torus 157 can then be brought into contact with neutrons through item 257a and then brought further into compression and stabilized by electrons through item 257 with possible additional mixing and settling in second mixing chamber 75a using the process taught in FIGS. 1, 2 and 3.

The lasers, magnetic fields and reactant sources are informational altering means for generating and delivery different forms of information in the form of pre-time structured energies or post time dimensional states at the appropriate value of x and place to get the function of the reaction desired according to the fractal design taught herein.

Sustainable fusion from plasma alone is inefficient if not impossible, because the reactants have to be brought together and allowed to reform to release the information in sufficient pre-time forms to be exothermic.

The method taught is varying the nature of the plasma to deliver modified ct states to the reaction chambers to encourage fusion before stabilizing states are added.

Figure 2A:
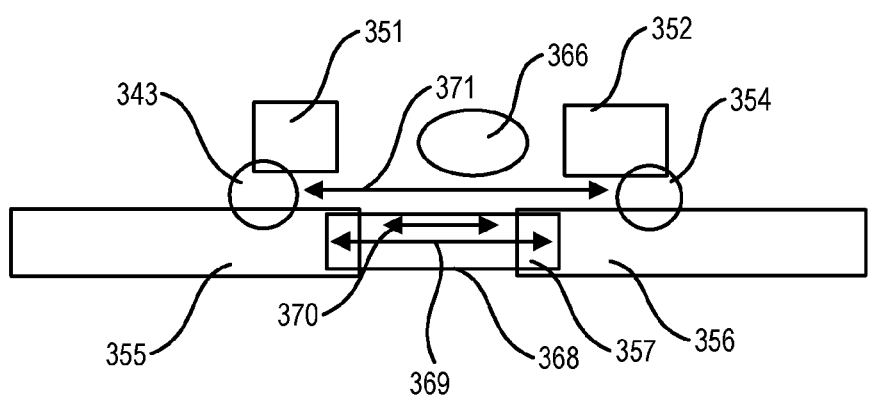
FIG. 2A shows the view of a catalyst of FIG. 2 with the elements reduced.

FIGS. 2 and 2A shows how catalysts, e.g. item 316 from FIG. 1D, operate and can be used in order to act to increase compression for fusion or other material manipulation processes. We will address a compression catalyst. A decompression catalyst works in the opposite fashion. (See FIGS. 2, 2A and 2B).

Reference will be made to the type of feature, which is consolidated in different cases, using both ct4 and ct4 T-designations which are more accurate than the less accurate neutron, proton and electron designations with the idea that the exact nature of the AuT features involved will involve additional experimentation.

In this case the affected particles are a first reactant (e.g. a neutron) 351 and a second reactant (e.g. another neutron or Proton) 352. The first reactant shares shared information 353 with a first catalyst arm 355 of the first catalyst 316.

The second reactant which can be different is a second neutron 352 held by second shared information 354 to second catalyst arm 356. At this point in time, the two reactants (here first reactant 352 and second reactant 351) have reactant information 366 between them, but this does not necessarily encourage reaction.

The interaction between information 366 and information 362 allows for reactants (in the form of information 366 and 362) to be added and the ability to control the spacing between first spacing 369 and second spacing 370 allows this information exchange to be increased and decreased creating the potential for a catalyst pump.

There may be an enhanced draw of T12 states from item 343 into items 355 and 356 which can be drawn out as energy.

Between the first catalyst arm 355 and the second catalyst arm 356 is a first catalyst bond 357 which is information which can change from first separation 358 to second separation 359 bringing the two reactants (first reactant 351 and second reactant 352) together. In a true catalyst these arm separations 357 and 358 and shared information 343 work together with the squeezing together by putting out information into the shared information 343 and/or 366 from which it is effectively recycled back to 343 and/or 366 when the reaction is completed.

The nature of shared reactant information 366 allows for the reactants to interact and as taught herein information 366 and 343 can be enhanced to encourage the sharing of spew and absorption between reactants 351 and 352.

Figure 2B:
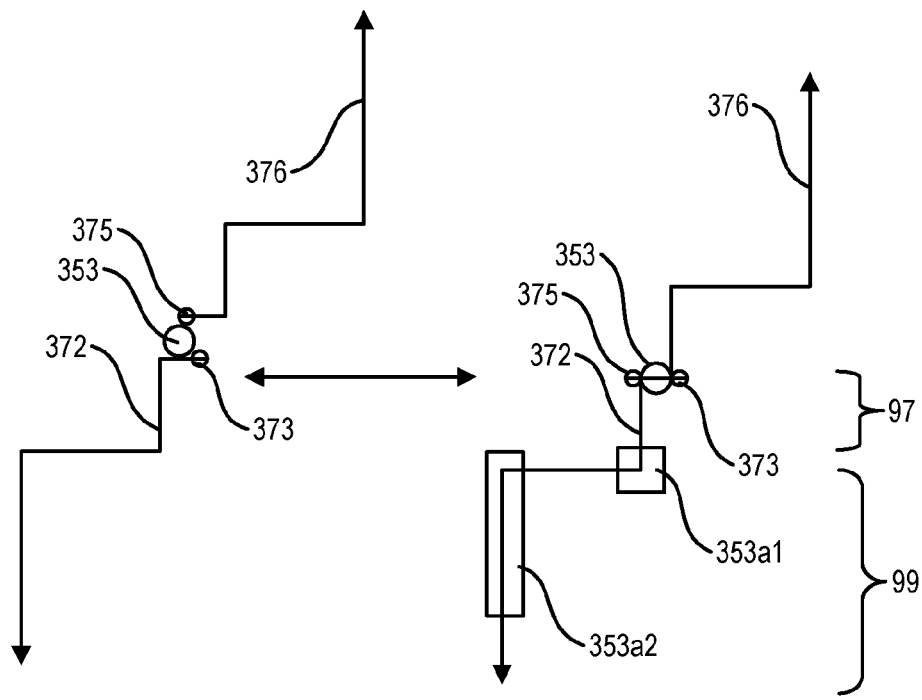
FIG. 2B shows how particles interact, focusing on one fractal example at the proton level.

In a decompression reaction, the shared information breaks up the two reactants. FIG. 2B is a detail of a molecular reaction or H2 reaction. It shows a "perfect" overlap. ½ of the length of the two arms, forms a specific grouping, a central compression circle with two half circles (½ the length of the two arms in diameter) form on either side.

FIG. 2B allows a better understanding of how the reactants are brought together with a catalyst. In this case, the representation is of two hydrogens each having a proton core 373 and core 375 and an electron represented by a first offset spiral 375 and second offset spiral 372 to stabilize each of the protons. There is shared information 353 which when the two hydrogens are bound represents the overlap of information shown in FIG. 2B. This appears to be rotationally balanced where this rotational symmetry is reflective of the stability of balanced information between the more compressed protons and the less compressed electrons and is part of the reason black holes are believed to exist in spiral galaxies in minimums of pairs.

In this way the momentum reflects the stability of lower compression states.

It is possible to target the Fibonacci form in going from one state to the other, e.g. swirling it to smaller area according to this formula or a bigger one to enhance the potential to fuse the neutrons, to bring them together within a reaction chamber 315.

When the conceptual "specific fractal jumps" are viewed, it can be seen how specific "excitement energy states" of a hydrogen necessarily fit within the structures which are in place to create a fractal (compare to the larger fractal spiral galaxy) and staged (see the different stable states of each fractal understanding there are sub-fractals which are more pronounced as compression increases which can be seen by the t1-t16 CT4 transitional states and the very complex galactic models between ct4 and ct5 seen through telescopes) set of energy levels observed.

This fractal pattern can be seen in larger cases. This can seen in the overlay of this fractal pattern with the Vitruvian Man of Marcus Vitruvius by Davinci which can be seen in US trademark Ser. No. 88/331,468.

One can combine FIG. 2B with FIG. 2A to get FIG. 2 which shows the steps in the catalyst arm 355 securing the proton core 375 via shared information 353 between items 375 and 372 which cores 373 and 375 are secured to balancing electrons represented by the spirals 372 and 376 which are part of the catalyst arm 355, the proton core 373 of the catalyst portion coming out of the catalyst to shared information 343 to secure core 375. Similar, but different ct compression states can be used to secure whatever reactants, including neutrons desired in a catalyst.

FIG. 2B is an idealized view of the layout and hence bundle 99 and electron shell 97 are shown as they generally would appear to draw an analogy with One embodiment is a pre-fusion energy reactor using a current carrying layer within or below the first catalyst are 355 to carry current to a chosen location.

The broad view of the process is using the framework of fractal organization and information exchange as absorption and spew to predict reactions and interactions and to encourage or discourage reactions and interactions of different dimensional states as defined herein.

For example, exciting an electron might take the information shown as $353a1$ and expand and excite it to the information shown as $353a2$. While these would remain parts of bundle 99, they would be pushed out physically. Unless the arms 375 and 372 were balanced, the addition of information would be destabilized and would, in any event, destabilize the shared information 353.

Energy is not just a function of compression state, it is also a function of the number of changes in x between positive and negative changes of any fractal, a function of underlying fuse states and the fractal equivalent under increased compression. Sorting information states to increase the energy can be accomplished from this model.

"Integer" separated wave lengths (attributed to taking a circle and breaking it into equally separated wave states: 1, 3, 4, etc) are assigned to "circular" orbits separating the perceived circle into equal parts correspond to fractal changes. Hence, the added information shown as either $353a1$ or $353a2$ would give a greater size and therefore a greater wavelength to the atom with the common shared information 353 at its core.

Beyond Hydrogen

Figure 3:
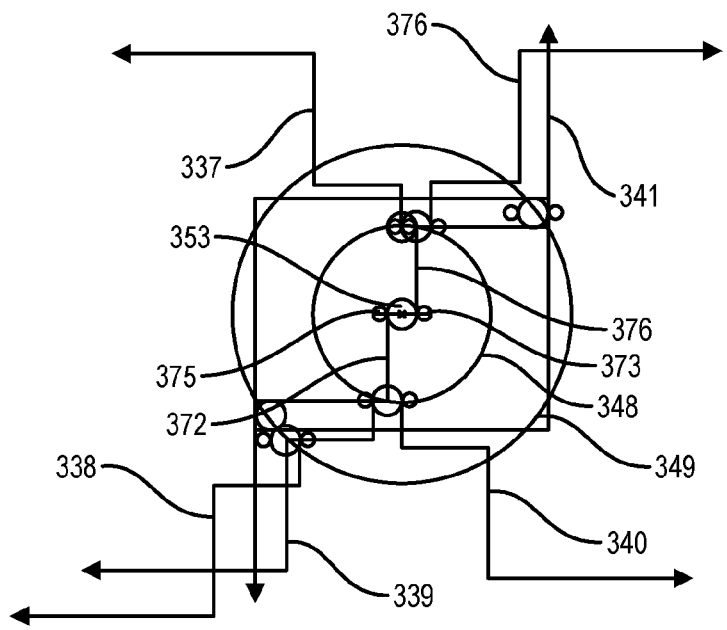
FIG. 3 shows conceptually how the type of balanced information building shown in FIG. 2 can be applied to a more complex balanced fractal than hydrogen.
Figure 3A:
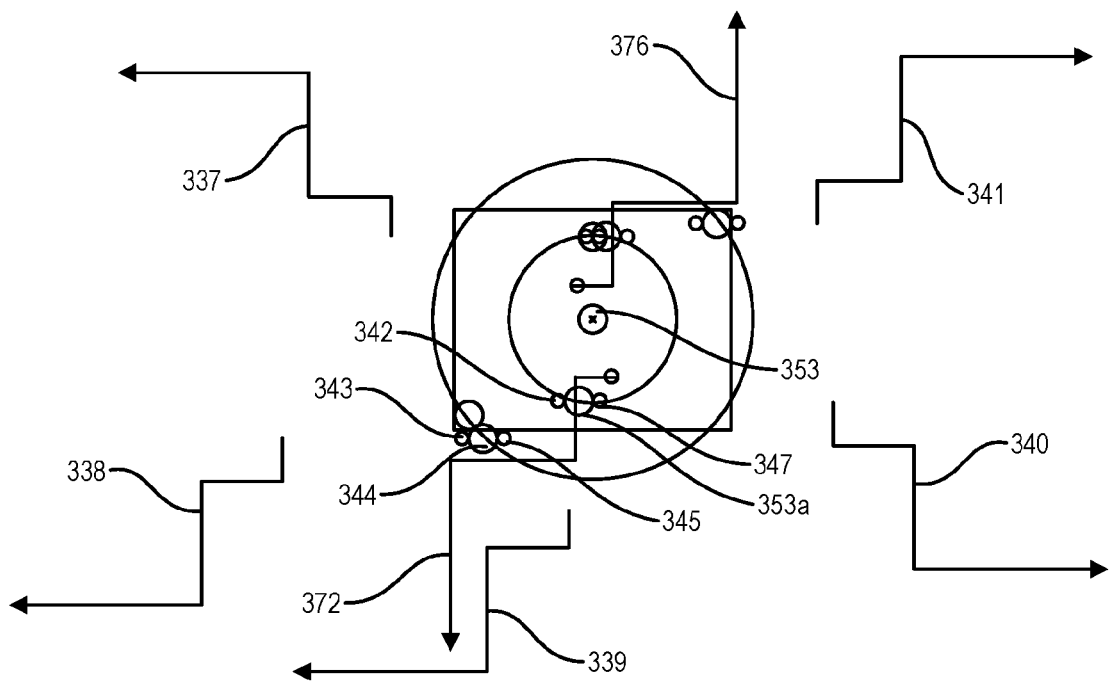
FIG. 3A is an exploded view of FIG. 3.

FIGS. 3 and 3A take the model and show how it varies with higher compression states within the framework. This model could represent where 2 neutrons form Helium. Unlike where H2 is formed as shown in FIG. 2B. The two cores of hydrogen 373 and 375 are on either side of shared information 353 in this case includes two neutrons (not shown individually) to form helium. If the shared information 353 increase to hold additional neutrons, a second orbital 348 forms which extends outside of the second Fibonacci turn of the first hydrogen electron shells 372 and 376.

FIG. 3a shows the core of FIG. 3 exploded outward to allow a clearer exploded view of the various parts, but they are of the same basic structure.

Based on a pure fractal analysis and subject to increased compression, the ct4-5 compression should largely reflect the view of a galaxy. Following this suggested arrangement, the higher concentrations of information are closer to the core and include other, more compressed ct4-5 compression states which at the galactic level would be black holes and associated neutron stars. Here, only the neutron (or proton) arrangement is shown for clarity, but as is described in more detail in priority patent applications and covered generally herein the surrounding proton and electron shells are largely pulled toward the same fractal relationship from their base 6-10 naturally occurring structure to the base 10-16 structure by the required information sharing that gives these structures their rotational symmetry.

Based on observations, the additional compression states collapse within the core of shared information 353, but probably begin by building onto the extended orbitals represented here by second orbital 348 and third orbital 349 where the buildup of information is represented by spiral arms 337, 338, 339, 340 and 341. New cores 343 345, around third shared information 344 and 342 and 347 around second shared information $353a$ are parts of this continued compression from a simple H2 to Helium to the higher ct5 transitional states beginning at the second line of the standard periodic table.

The effective result is that the first circle would have room for two electrons, the second 4, the third 4, the fifth 8, etc.: with all the arms built mathematically of the inner arms and using this arrangement along with the underlying $2f(n)^2(n)$ compression to get more effective reactions extends to both chemical and nuclear reactions.

The exact appearance of this extremely active matrix is fixed for any value of x and largely mirrors the appearance of a galaxy with two arms having greater compression as they are followed from the ends to the center and compression can be seen as beginning at the ends of these arms and steadily compressing towards the center 343 of shared information, here between two particles, items 373 and 375. Like spiral galaxies, there is no "perfect" structure except at inflection points of compression exemplified by the moment of collapse of a black hole.

Using fractal observations, if this is used to represent the electrons, and using the larger fractal galactic model, two arms approximately balancing each other in the fashion shown is indicative of the compression theorized.

This provides a better, fractal view of the atomic and molecular models than the stacked orbitals which are an effect and not an actual appearance, at least not theoretically.

The secondary orbitals come off the initial H2 or Helium structure. Again, using the galactic model the base is thicker towards center and this indicates that compression grows out from the arms.

The suggestion of orbitals from the periodic table of the elements is a 1s, 2s, 6p distribution. Under this model, the first two arms would correspond to the Is distribution, arms 11 and 12.

There are many ways to look at the next 8 electrons and these can be resolved without undo experimentation.

These all derive from the fact that the periodic table reflects base 16 compression at the ct5 transitional level. How this is reflected in FIG. 3 may be balancing arms off the main two arms 372 and 376 at the four corners, another is a doubling model based on the greater number of arms possible when the atom is balanced as described.

The base for this is in the neutron area, but the proton and electron outer components are considered, and these are between a base 6 and base 10 arrangement befitting their transitional status between ct3 and ct4.

One can see that from a momentum standpoint, momentum reflecting underlying required balancing of symmetries for the shared information to remain in place over many changes of x, the balance shown in the galactic fractal is balanced by the opposing corresponding features although the type of force reflected varies with the compression scale due to exponential compression and base compression features. Molecular bonds are to provide this type of symmetry with increasing dimensional components.

What begins as two half spirals coming together, evolves into the fractal model shown in AuT by virtue of the varying base. The second and third rows of the periodic table represent the base 16 in the form of paired 8-8 halves in orbital terms. Looking at the hydrogen, one can see this as one arm 372 balanced by another arm 376. This balancing required by the sharing of information and reflected as rotational symmetry gives rise to both dimensional perspective as well as molecular and atomic bonding symmetry.

This will discuss this fractal as an electron, but it applies to all fractals although they must be differentiated based on (1) the base (numerator of pi, for the compression state in question) and (2) the amount of involved compression (2^n).

It is easy to see the lack of stability reflected in higher compression states as an unstable center of gravity at first and second information bundles shown as smaller circles. There is shared information shown as the larger circle which starts as more dispersed information. The stability of the structure can be affected or reduced.

In the same way, lower ct states can be used to open any reactants for combining or to open and close features of catalysts just as the surrounding information matrix structure can be used for the same purpose, whether in solution or part of the reactant or catalyst structure.

How the information absorption and spew change between fractal states it important. Ct4t6 exchange as pre-photons giving rise to charge (electron absorption of t6 negative, proton spew of the same t6 being positive for example and how the opposite creates the oppositely charged positron features) is comparable but very different from the type of shared, non-charge information between the two proton halves of H2.

Photons, like electrons are a collection of particles, probably 5 T6 states plus others due to the transitioning 6 to 10f(x) base architecture.

Heat in the reaction adds and removes photon like elements, t6, to the structure of the reactant expanding it in the manner shown which allows for the reaction to occur.

One method inherent in AuT is using the structures and interactions of higher ct states to understand interactions of lower states. This means that insights are directly applicable, subject to dimensional changes and compression numbers, between large and small ct state observations, e.g. comparing two galaxy collisions to two atom collisions.

Figure 4:
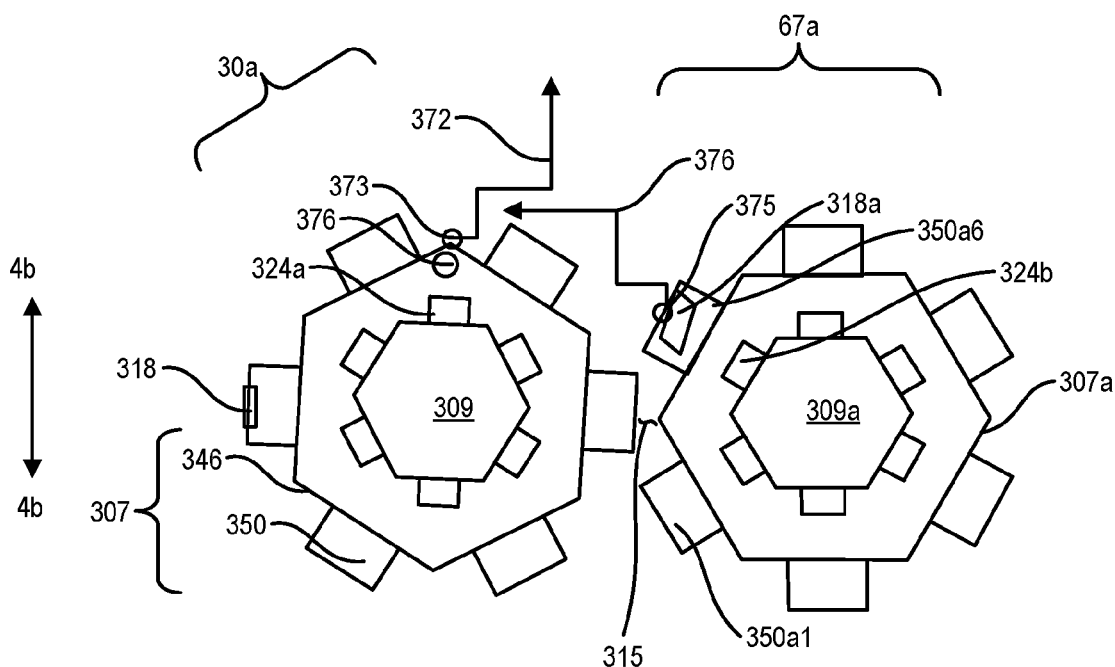
FIG. 4 shows an embodiment of the concentrator means from FIG. 1C.
Figure 4A:
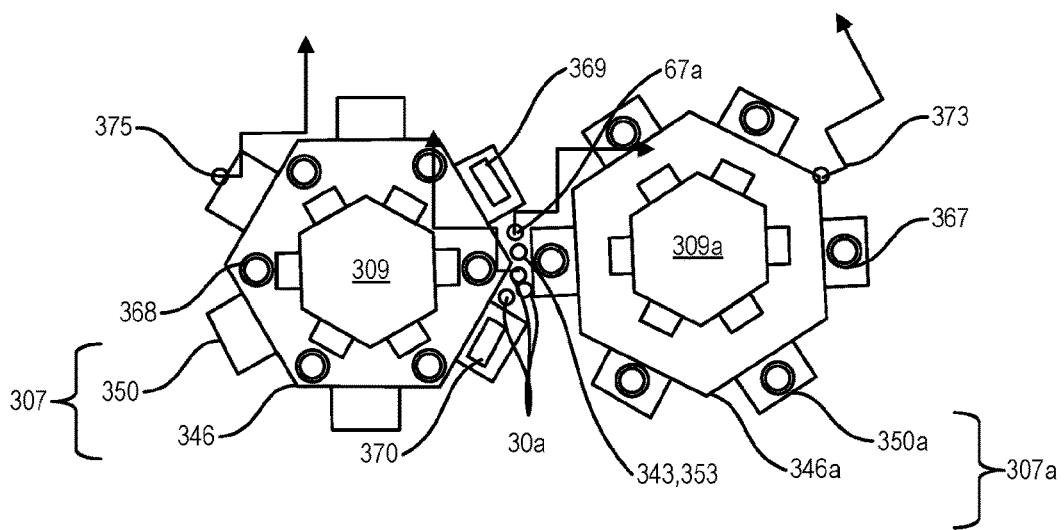
FIG. 4A shows a secondary position of the concentrator of FIG. 4.

FIGS. 4 and 4a show an alternate embodiment for first substrate means 307 and second substrate means 307A. This shows the process rearranged so that first scraper means 309 is moved inside substrate 307 and a matching second scraper means 309a moved inside second substrate 307a.

Energy means 324a and second energy means 324a mounted as shown provide information to energize the exterior of substrate means 307 and 307a when particles neutron 30a and proton 67a are aligned as described in more detail below.

Here interlocking means 318 for bringing reactants together physically together with one reactant, here neutron 30a (showing with operative parts proton core 373 and first offset spiral 372) attached to the surface of item 346 recess of the first substrate means 307 and the other reactant being attached to a knob 350 of the first substrate means 307a, the other reactant here being Proton 67a with operative parts proton core 275 and second offset spiral 376. Between interlocking means 318 and recess 307 and 307a, a reaction chamber means 315 is defined for containing reactants, here shown as neutrons 30a and protons 67a. The exact makeup of the reactants at any stage of the process is determined by the compression desired and controlled by the action of scraper means 309 and 309a.

As shown in FIG. 4A, in this case shared proton-neutron information 343353 is added as by first reactant means 369 and second reactant means 370 which may, for example, be lasers, providing information 343353 to drive the reactants 30a and 67a together within the chamber 315 and to reshape the chamber means 315 (shown in FIG. 4) to some extent. The exact structure can be varied within the teachings of the prior art for each knob 305 shown numbered from 1 to 6 in FIG. 4D.

Since each substrate means 307 and 307a have at least two structures, e.g. knobs 350 and recesses 346 for first substrate means 307, multiple reactants can be carried by either or both interlocking features of the interlocking substrate means 307 and 307a.

Also shown are a first swirler means 367 for mixing the reactants within the chamber means 315 and a second swirler means 368 for the same effect. These may, for example, be magnetic field generators and may also act to hand off the reactants to the next defined chamber as means 307 and 307a rotate.

Figure 4B:
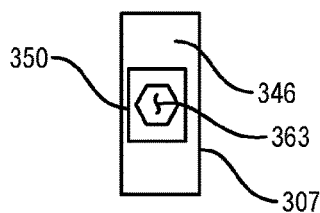
FIG. 4B shows the use of shaped openings and knobs.

In order to encourage reactions, different shapes may be defined for the chamber using different shaped openings 363 on the knob 305 of the substrate 307 as shown in FIG. 4B.

Figure 4C:
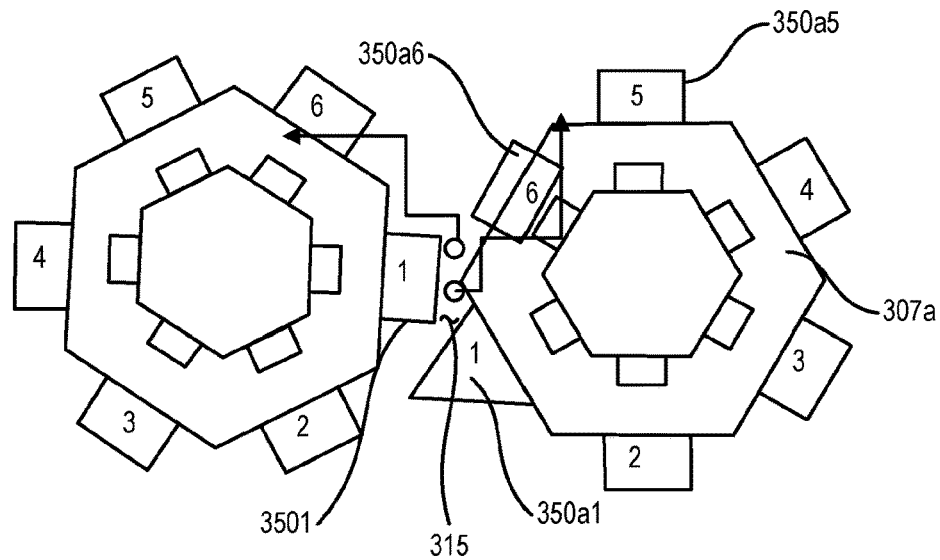
FIG. 4C shows an alternate embodiment of FIG. 4.

Another way to accomplish this is shown in FIG. 4C where the shape of knob 350*al* has been changed so that knob 350*l*, knob 350*a*1 and knob 350*a*6 along with the intervening recess between 350*a*1 and 350*a*2 form a chamber means 315 of a desired shape. The position of knob 350*a*6 can also be changed through rotation or, as shown in FIG. 4*c* by recessing it into the substrate 307*a* to change the shape of the chamber means 315 or to allow rotation of the substrates 307 and 307*a* relative to one another without as great an impact on the reaction chamber means 315.

As with the discussion of other aspects of the invention, the nature of the movement of the various physical parts and the information adding portions can work together to shape the chambers interactions to take advantage of fractals structures and the underlying spiral features to catalyze the reactions involved and achieve the stabilities required to maintain the interactions forced on the reactants.

To keep the reactants moving together, first and second swirling means 367 and 368, here magnetic coils can align as items 307 and 307*a* rotate to mix the reactants in reaction chamber means 315.

Figure 5:
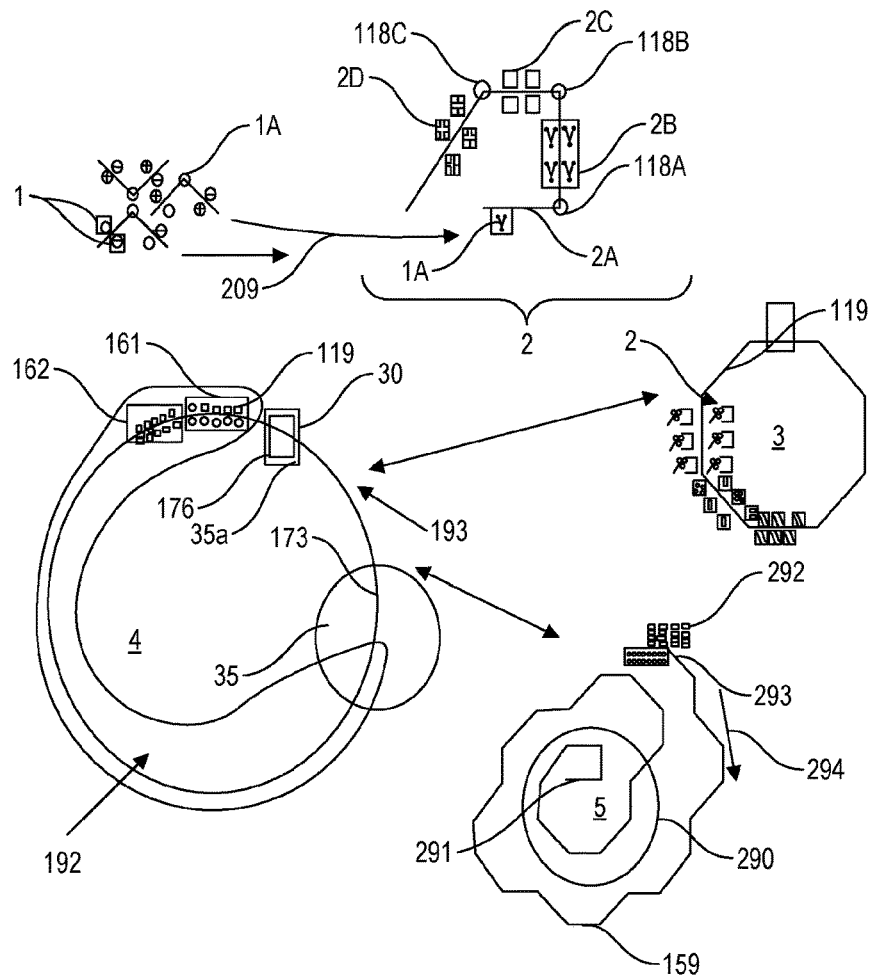
FIG. 5 shows the derivation of dimension from space.

FIG. 5 shows how this arrangement of different compression states can be viewed as shells with structure varying based on the base compression state and the underlying compression states. FIG. 5 includes Electron-Proton Compression to get ct3-4 fusion, shows compression along with the associated force. The first compression is the first fold of space 1 along a fold 1*a* and leads to gravity 209. The decompression would form anti-gravity, commonly referred to as dark energy. While the first folding associates 4 ct1 states 1, the total folding being $2^{\wedge}(2^{\wedge}2)$ results in 256 ct1 states, presumably around 27 hinge states as set out in the math of AuT (the ratio of the sin of pi for −1 to the sin of pi for 1 where 1 refers to the numerator used).

By way of example, math suggests 4 steps, identified as + "arms" of folding for ct1 to ct2, the first arm 2*a* being 4 ct1 states, the second arm 2*b* (change on drawing) being 16, the third arm 2*c* being 64 and the third arm 2*d* being 256. In this case, the hinge mechanisms after the folding at the ct1 level are suggested by the math to be a first ct2 hinge 118*a* (change numbering here too given 1*a*-1*d* above) being a 3 ct1 state hinge, the second ct2 hinge 118*b* of 9 ct1 states, and the third ct2 hinge 118*c* being 27 ct1 state hinge with the math suggesting this arrangement being set out in the various documents supporting the model.

In ct2 to ct3 compression there are 6 ct2 states of 256 ct1 states each that form the first ct3 arm 119 (move on drawing) of ct3 3 with the same exponential compression for the six arms shown, but not individually numbered.

Ct4 4 is the next state of compression and represents the neutron. As can be seen ct4t1 161 is 10 ct3 states, ct4t2 being 100 ct3 states and so on to ct4t16 which is the proton when unfilled, and the neutron when filled. Here that is shown by having the neutron 30 shown encasing a ct4t16 175 surrounded by an electron 35*a* to distinguish it from electron 35 which is the approximate location of compression where the electron forms shown around ct4t13 173. Since this state is so important in the standard model, it is noted additionally that the bundle 99 from the prior figures is largely represented by the arms ct4t1-ct4t12 which is the location of the electromagnetic force 192 where time is largely finalized for observational purposes and the electron is ct4t13 173 destabilized so that an electron 35 can form proximately. The weak force 193 exists between the electron and the neutron compression states along with the electromagnetic effects generated within the framework 192 between ct4t1 161 or ct4t2 162 and ct4t13 173.

The final stage of compression shown here, although not the final stage of compression, is the ct5 state 5. The first arms ct5t1 292 and the second arm ct5t2 293 are where up the 16^4 ct4 states are folded together and form the compression states of the periodic table. This is the area where the strong force 294 can be found. At the final arm is the region of the black hole 291 just as the full final arm of the ct4 state is the neutron 30.

FIG. 5 shows the electron derivation between the ct3 state 3 and the ct4 state 4 shown as electron 35 before the ct13 173 state of compression.

Using the compression system of AuT, ct3 has a base of 6 and ct4 has a base of 10. When 10 ct3 states fold together, you get the first transitional stage of ct4 compression, called T1 or ct4t1 161. When 10 of these ct4t1 states fold together you get ct4t2 162.

ct4T12 172 is a primary component state of the electron, one can think of this fractally as a star in galaxy or a large planet in a solar system. Measurements suggest there are 5 of these ct4t12 172 components form a single electron 35 and they exist within a cloud of lower transitional states which in turn are separated by multiple lower states. The photon is primarily a ct4t6 state 166 just as the electron is primarily a ct4t12 component state in theory although additional testing might show the photon to be different, for example a ct4t10 or even ct4t11 state. Designations like "electron, photon and even proton" are misleading but are used as transitional terms between the new model and the prior art.

Figure 5A:
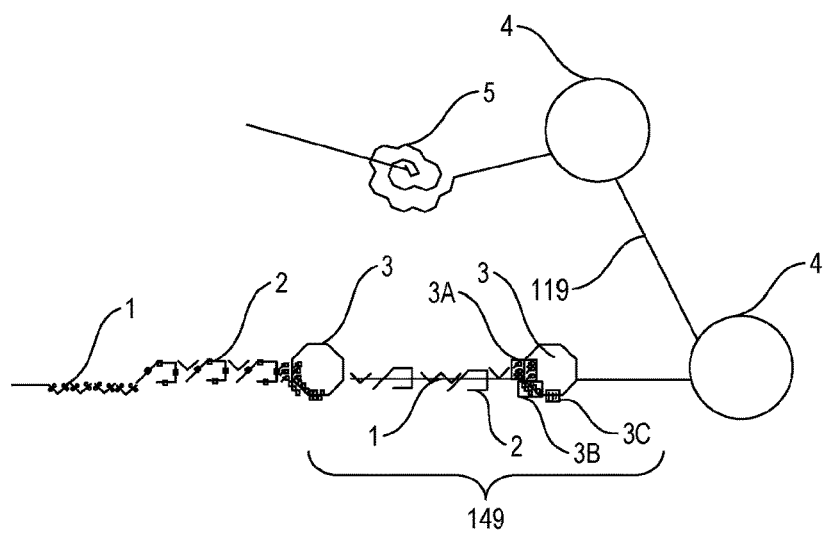
FIG. 5A shows the linear nature of transitions of the type shown in FIG. 5.

FIG. 5A shows how this compression occurs in a linear arrangement showing ct1 1, ct2 2, ct3 3, ct3 as part of ct4 designated at first compression arm ct3 3a, second compression arm ct3 3b and third compression arm ct3 3c. It shows how a 1-2-3 bundle 149 of ct1, ct2 and ct3 exist between two ct3 3 states. A ct4 transitional state bundle 119 is shown between two neutrons. A similar, but fractally denser bundle would exist between neutrons and black holes, ct5 5 states which are not shown, but can be envisioned as the galactic cloud around a black hole.

Figure 5B:
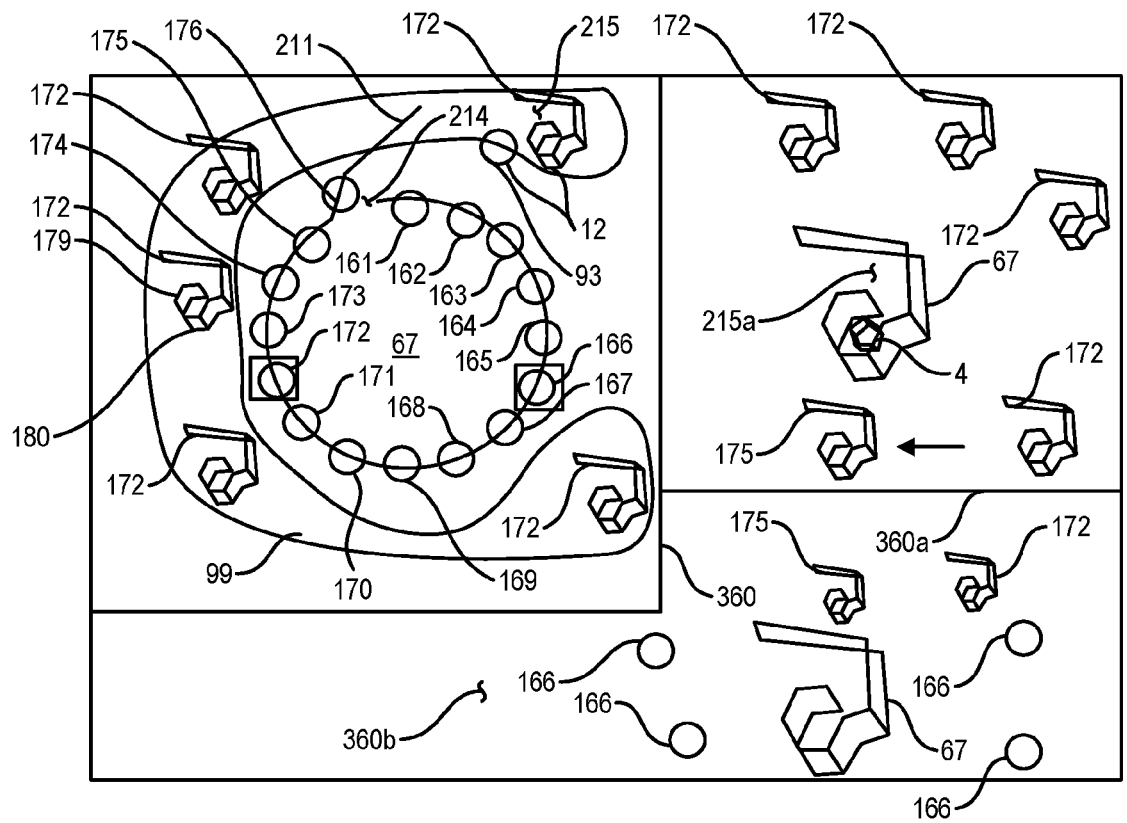
FIG. 5B shows the reaction of compression states.

FIG. 5B shows how this arrangement can result in a reaction. The different ct4 transition arms can be seen numbered from 161 through 176. This shows a view of the electron as t12 172 states with a bundle 99 of regionally relevant ct states surrounded by ct states below the level of ct4T12. Electrons 12 surround the proton 67 just as a group of planets surround a star. The fractal analogy is imperfect because the of the base transitions and dimensional transitions that occur and that keep the system stable. A center of charge (COC) 93 exists at any quantum moment, but the movement of the various parts of the system keeps the location of the COC 93 in constant flux.

Prior art designates the electron according to this center of charge (COC). This figure shows that it is likely that the COC 93 is aligned with the opening 214 in the proton matching the opening 215 in the electron t12 state 172. The electron is shown as two sides 179 and 180 of 6 arms to reflect the ct3 base six from which it is built, although a fractal analysis yields an arrangement more like that shown in FIG. 2B. This proton is existing within a matrix 360 which contains information like t12 and t6 information states most directly affecting the proton 67.

A second matrix 360*a* contains a neutron 4. To get a stable collapse in this arrangement, there must be enough information in the right order to stabilize the resulting reactants.

This 'stabilizing information' is shown in a third matrix 360b which contains a proton 67 as well as other states, t12 172 states and t6 166 states in particular, seen respectively as the building blocks of electrons and protons as the proton 67 within matrix 360 collapses and combines with the neutron 4 in the matrix 360a to form helium, the additional information represented by the proton 67 in matrix 360b becomes part of the Helium stabilizing matrix. Since there were already two electrons worth of information in matrix 360 and 360a, the excess t12 within 360b can be released from the matrix 360b.

This release of information from the time-based proton matrix 360 and 360b and the neutron matrix 360a becomes time independent and is seen as energy. Since there is a enough this information to form an entire electron, positrons and electrons result depending on whether they are net compressing or decompressing and much of the information of this type is light, previously held at t6 166 states.

Figure 5C:
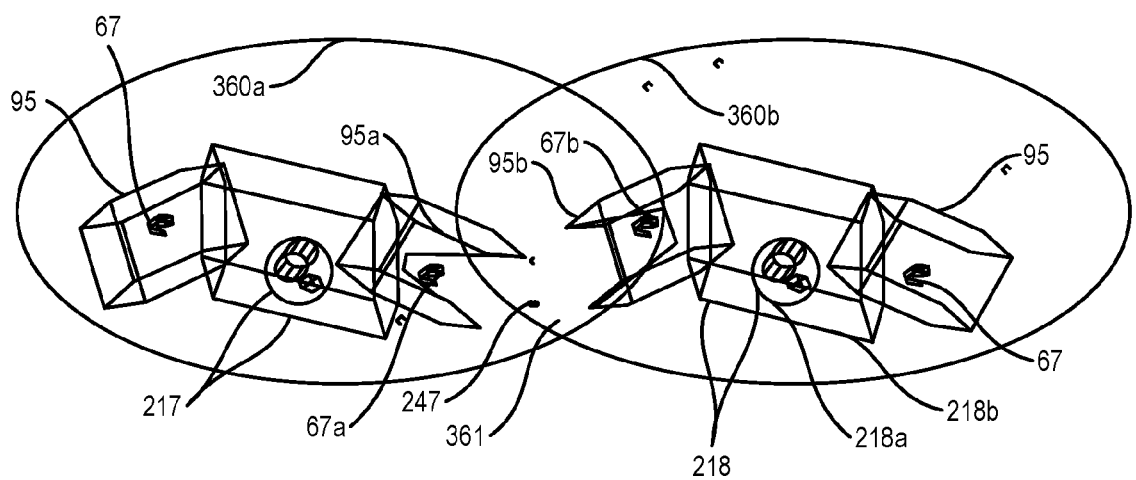
FIG. 5C shows a reaction of two neutrons to form helium.
Figure 5D:
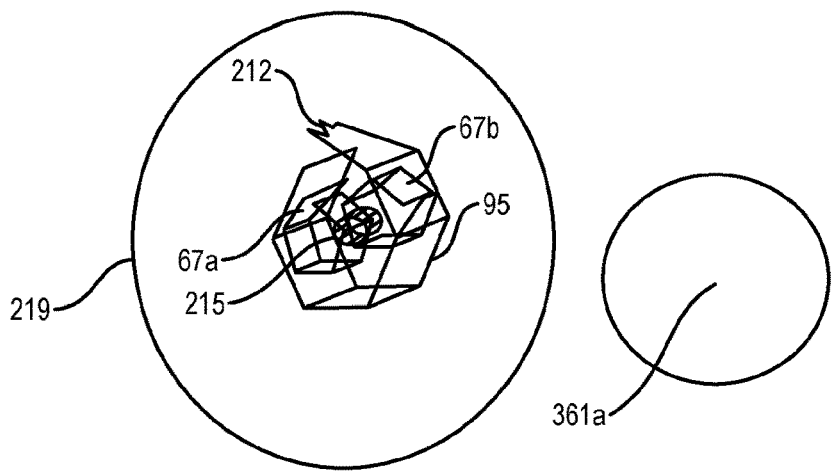
FIG. 5D shows the results of the reaction shown in FIG. 5C.

FIGS. 5C and 5D take the reaction in FIG. 5 one step further showing Deuterium fusion. In this case two water molecules are show in a first matrix 360 and a second matrix 360a overlapping in overlapping shared matrix 361.

Within shared matrix 361 is a neutron, held in a stable matrix formed when the shells 95a and 95b of are opened by the oxygen atoms 217 and 218 being formed, by example, of atom 218 by oxygen electron shell 218b and electron nucleus 218a to allow information sharing between neutron 247 and the protons 67a and 67b within shells 95a and 95b.

FIG. 5D shows the resulting reaction when another neutron is combined with the neutron in the heavy water to yield a neutron comprised of a 8 sided cube neutron 251, balanced by two protons 67a and 67b coming from the water. The matrix 219 within which the neutron exists can be expanded or contracted depending on the examination of information. The neutron includes the electron shell 95 of stabilizing information. Outside of the matrix 219 is excess information 361a from the overlap 361 which represents information which was held as part of the post-time matrix 360a and 360b which is now in a pretime states of t12 and lower states which appear as energy.

The balancing of the reactants in this way allows for more efficient fusion and fission and even molecular reactions and this process of balancing the reactants is one aspect of the invention.

One aspect of the method taught for fusion type compression is allowing escaping information to leave the matrix while allowing the desired fractals to stabilize.

Molecular Reactions

Figure 6:
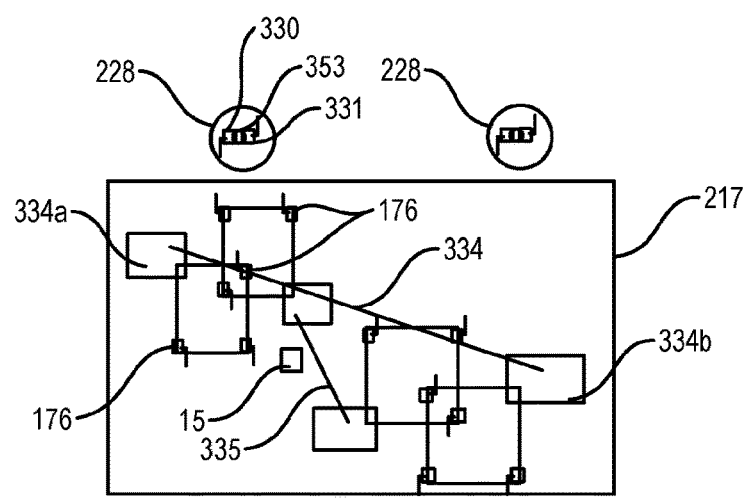
FIG. 6 shows how fractal interactions of the type shown in FIG. 5 can be applied to larger reactants.
Figure 6A:
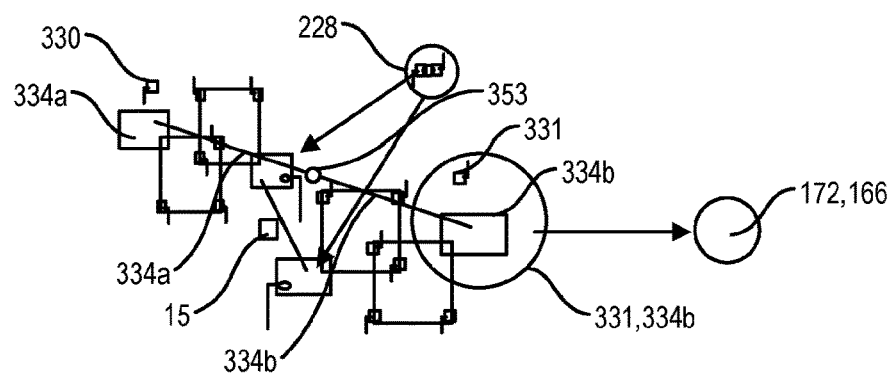
FIG. 6A shows the resulting reaction of the reactants from FIG. 6.

FIGS. 6 and 6A show another view of the reaction between hydrogen and oxygen can be viewed through the prism of balancing the reactants, and how the neutron core 15 plays a limited role other than holding the oxygen structure in place. Here the balanced oxygen ions appear largely the same as 02 217.

The two halves of the 02 217 have shared information corresponding to 353 for the hydrogen shown as first oxygen shared information 334 and second oxygen shared information 335. For clarity information 334 is split between first oxygen ion shared information 334a and second oxygen shared information 334b. Structurally, the same type of arrangement is present in higher compression states and lower compression states although the levels of compression and base numbering affects the arrangement as is otherwise taught by the disclosure in the cited co-pending specifications and herein.

This shared information at this level of compression is largely Ct4t12 electron information shown shared along lines 334 and 335 in a way to balance the structure in the fashion taught herein although the arms are structured around the neutron core 15 which is bending the base 10 structure of the protons t16 176 in the oxygen to the fractal structure of the base 16 ct5T1 form involved. The interaction of the base 10 and base 16 structures is transitional so that only at the black hole is a full base 16 structure observed completed.

The H2 228 is comprised of two t12 protons 330 and 331 having shared information between them 353 corresponding loosely to the shared information 334 and 335 of the Oxygen. The reaction occurs at this shared information, but in a fusion reaction it would be the shared information between two neutrons or the higher compression of this type of shared information depending on whether it is a ct4-5 reaction a ct5t1-ct5t1 reaction or some hybrid between those as taught herein.

At the point of reaction, the shared information has combined so that you have 353 and 334 combined and this provides room for the proton 331 to occupy a common expanded field of shared information 331334b shown in FIG. 5a. The excess information will be ejected as heat, movement, light and space shown as 172166, containing items 172, 166, 1, 2 and 3 which are not shown allowing the shared information 334b to form the shared information between the now separated protons 330 and 331 as part of the overall shared information between the two now more securely and perfectly balanced halves of the oxygen atoms, converting 2H2 and 02 to H20 plus the excess information which has been released.

The reactions occur at the shared information level, the area 353 between 375 and 376 shared between two protons in FIG. 3 where a stable fractal interface is built. To get fusion, you expand the shells, a key AuT step, before the next steps of bringing the neutron cores together followed by ensuring a stabilizing shell so the neutrons do not break down.

Expanding these connective locations allows for information sharing from other information to occur more easily. Especially at the neutron level where the system is closed into another dimension and the need to open the very tight information between neutrons without breaking them up is the reason why a very careful transition must be regulated so that a stable structure result.

If you have protons connected to neutrons, this connection can be opened and if the neutrons can then be brought together, the connection is more likely to occur between the two neutrons especially if the energy level can then be dropped to allow the reaction to continue without the neutrons falling apart.

This model varies significantly from the model for shared orbitals or disrupted orbitals because this model takes into account that information is graduated and that the fractals can be supported by shared t12 states which are imperfectly formed electrons which we know exist because of comparison to larger fractal models which are visible.

If one looks at ionic bonds instead, what one sees is that in place of the shared t12 states balancing the outer spiral arms of the two oxygens in 02 you have two separate stable fractals with a high degree of movement of t12 states between them, this movement being the in form of both absorption and spew balanced with the ejectment of other transitional or non-transitional states to maintain the high degree of stability of ionic compounds. In solution, these absorption and spew arrangements remain, but they are spread out and normalized by the surrounding solution which allows for looser fractals to be maintained and this increase in dispersion means that there are more t12 states for the purposes described in reference to FIG. 1G to draw them into the catalyst arms as current.

Ionic lattice energies typically fall in the range of 600-4000 KJ/mol (some even higher), covalent bond dissociation energies are typically between 150-400 KJ/mol for single bonds.

While a factor of 5-10 (or more) energies are shown, the scales are not that much higher.

Ct4 transitional states are responsible for both. This is the main difference between AuT and the standard model, is the structures are more precise in AuT.

These reactions of ct4 transitional states can be seen as superimposed over ct4-5 transitional states, molecular states.

Ionic and covalent bonds are creatures of atoms, although Hydrogen, the pre-atoms also have covalent bonds. In AuT, the "electron shell filling" is replaced with a core fractal structure in the nucleus (two protons) surrounded by a corresponding stable fractal shell, two 5.4 t12 spirals feeding off of one another and the core protons which, while heavier, are exponentially smaller due to compressive energies. Because the electron components are too small to see, involve absorption and spew to have effect, presumably of t12 states which are largely pre-time, we only see them as net effects, part of the wave particle duality feature of electrons.

Molecules are co-valent in nature, shared electrons which in this case means shared fractal structures of t12 states (mostly) rather than shared orbitals. The main difference between molecules and Hydrogens lies in the core of neutrons which give structure to the protons, but this difference is enough to allow the distinction of Hydrogen Bonds outside of the stronger covalent molecular bonds.

Ionic matrix shares something stronger, but it still is the absorption and spew of t6 associated with charge. In this case the fractal structures affected are not in the electron fractal, but between the electron fractal and the proton fractal. What this means is that even though the absorption and spew is of a lower ct state of enormous magnitude, the compression involved is higher.

To use the galactic example, one can see it in this way:
A spiral galaxy has two arms which serve to balance the core of black holes. Each of these arms represents a higher fractal form of an electron. One can see that the galaxy appears more balanced with two of these arms than one; otherwise the "center" of gravity, the center of ct1-2 interacting would be offset and rotational unwinding would be irregular. If one were to speed up this process, the galaxy could be expected to fall apart, or at least to reorganize in a more balanced fashion, the same being true of the smaller fractal.

The arrangement of the two arms involves an enormous amount of information but is fractally the same as the arrangement of the two electrons around the hydrogen two proton core.

Towards the center of the galaxy, we are looking at ionic features, the highly compressed exchange of information at the interface of arms with the core. In a true ionic exchange, the exchange is between the arms and cores of different galaxies. What this indicates, however, is that the amount of compression between these two is very high and the fractal balance is at least potentially less important in more complex galaxies than in the interaction between the cores and the shells.

We look at the averages instead of the structures and this gives an orbital view which is less accurate, but worth considering.

Figure 7:
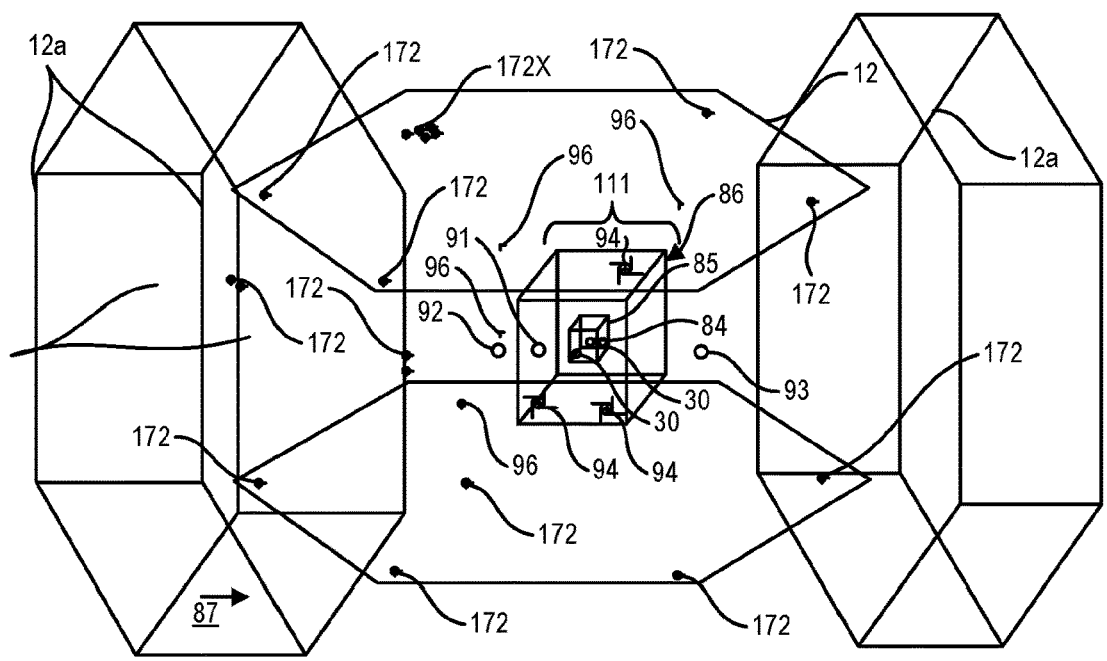
FIG. 7 shows a concept view of the orbitals shown in FIG. 6 for Neon.

FIG. 7 is a concept view of a neon atom as existing within a fractal matrix comprised of all the element drawn. Although this is a very clean atom, the same model works with less clean atoms. This same conceptual framework would apply to a galaxy, except that being a more compressed base 16 system the nature of the fractal would change. The atom is more of a ct3-4 state, the galaxy more of a ct4-5 state.

The closed view in FIG. 7 is too different from the galaxy which is why it must be open, but also the flow of spew and absorption require that there be openings to allow the information states which are lower than the orbitals to come in and out of the core, whether it is a ct4 core or a ct5 core. For this reason, both galactic forms and the molecular form shown in FIG. 3 and FIG. 3a better reflect the organization of orbitals.

This shows an electron core, at 12 fractal 87 made up of individual electrons which are made up of ct4T12 172 having a six sided fractal built around the $5 \times 10^{\wedge}12$ or 5 t-12 172 states theorized to form the bulk of the electron which would encircle the proton core called the t16 fractal 86 inside what is shown as the t12 fractal 87. This appears cubed here as opposed to six sided because under the model absorption of ct1 (theorized) by the neutron core 84 made up of the neutrons 30 pulls the protons into a shape more corresponding to the ct4 base 10 fractal, something less pronounced in hydrogen free of neutrons.

There is the net Center of charge 93 resulting from each electron in the fractal 87 and the particles interact with the net center of charge of the proton fractal, the COCP 91 within the fractal proton core of fractal 86 made up of ten individual protons 94 which are pulled into more of a ct4 base 10 fractal shape by the absorption of space by the neutrons 30 making up the fractal 85, again 10 here although only 2 are shown.

The electron and proton are both clouds of, respectively, pre-electron and pre-proton states like t12 states 172 and t6 states 166 here represented as photons 96.

The protons are more compressed and within the proton core fractal 86 around the neutron core fractal 85 which has a COCN 84 where the maximum absorption of ct1-2 states occurs. Certain neutron shell fragments such as the 2-neutron helium shell may be independent of the remaining 8 neutron shell although together they would form the neutron fractal 85 even though they may be separated by intervening states including individual protons 94.

Modeling supports this structurally and for this reason the electron component t12 states make up what the standard model would consider the inner two electron shell 12 and second inner shell 12a. These appear aligned and circular over long values of x averaging the structure, like watching a galaxy spin over billions of years and averaging the view. The balanced pairing suggested in FIG. 2B using observed fractal mathematics reflects the fixed values and by working with these two and recognizing that the two states, pre-time changes as energy and post time changes as dimensional point structural averages allows for better manipulation and is the focus of the claims.

It is worth noting that a single proton is made up of approximately $10^{\wedge}16$ minus $10^{\wedge}13$ pre-photons folded so as to exclude most of the otherwise intervening lower ct states.

Figure 8:
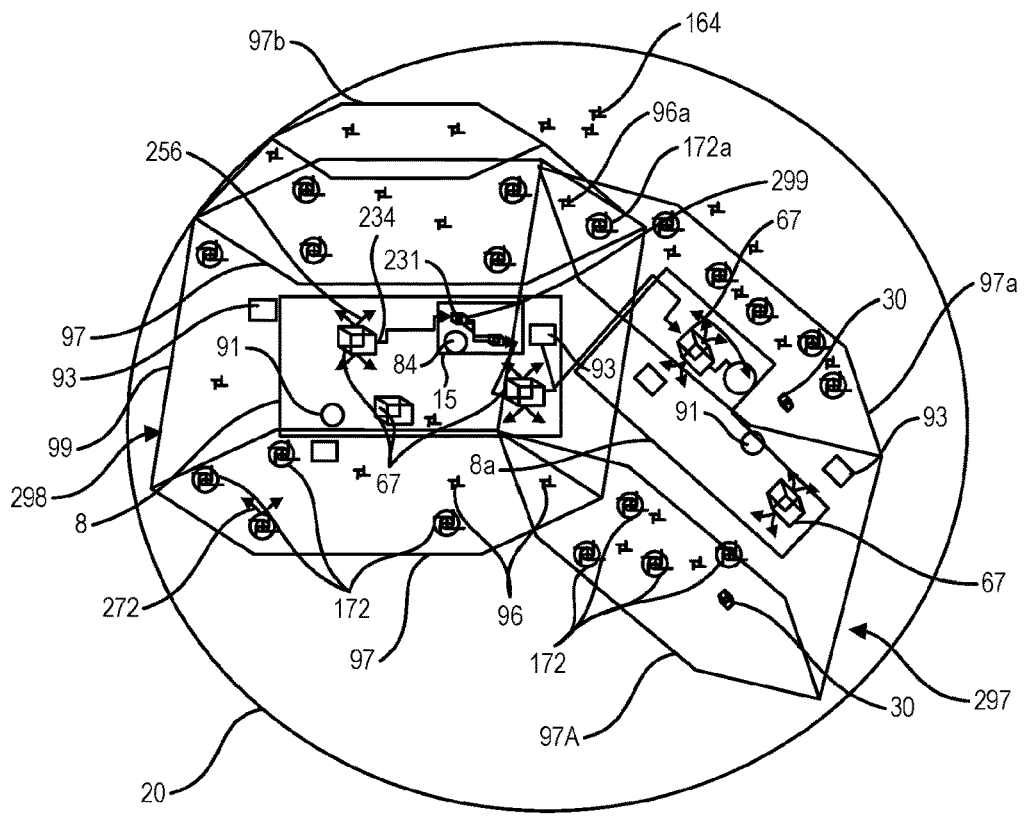
FIG. 8 shows the evolution of the view in FIG. 7 towards the base 6 to base 10 view.

FIG. 8 shows the evolution of the view of FIG. 7 reflecting the base numbering of the states, and the need for shared information, where two atoms are sharing information at the orbital level, co-valent bonding or ionic bonding both being related to this conceptual view of averaged interaction.

FIG. 8 shows a lithium and Hydrogen atom together, in this case the hydrogen is tritium and has two free neutrons 30. The regional matrix 20 is the total information selected as relevant for the molecule.

The lithium has three embedded neutrons 299. There is a Lithium proton shell 8 encasing the neutrons 299, but the tritium proton shell 8a doesn't stabilize the neutrons 30 in the tritium. In each case there is a group of protons 67 as shown for the Lithium proton shell 8.

There is a Tritium electron shell 297 and a lithium electron shell 298 which is the result of the separate bundles arranging in a fractal pattern mandated by the proton shell 8. Both are shown as six sided stacked structures to reflect the folding of base 6 two dimensional ct3 sates.

The electron CoC (electron center of charge) 93 for the ct4t12 states of the two different atoms shown are unique for the atom in question, but also overlap, as shown by the shared ct4T12 172a and shared ct4T6 96a.

There is also proton center of charge 91 and neutron center of charge 84 representing the averaged spew which can be seen as exemplary items neutron to neutron spew 231, proton spew 256 and ct4T12 spew 272.

There are multiple electron coc 93 shown for the lithium and each element would have a type of 'charge' characteristic of this type defined by the transitioning of the element within a system, in this case comprised of lithium 298 and tritium 297.

AuT restructures the 2,8,4 shells conceptually basing them on fractal states, but does not reject the resulting numeric framework; but instead adopts it to the extent it can be explained with the Fractal model.

Using the Lithium and Tritium example you can see that electron shells are three dimensional and of complex pre-time and post-time particle construction.

Figure 8A:
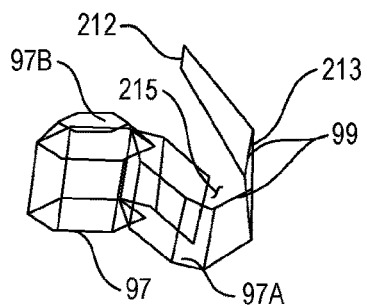
FIG. 8A shows a view the electron shell of FIG. 8.

FIG. 8A shows the electron framework from FIG. 8 alone. In this case the bundle 99 is shown more clearly as coming off as a fractal shells 97 and 97a with a resulting spiral gap 215 much like a galactic opening. FIG. 8A shows the bundle comprised of overlapping electron shells 97 and 97A along with a clear view of one different sized, but dimensionally similar shell 97B. Like larger spirals observed in the universe, the bundle comes off in a longer leg 213 with more information and tapers inward or outward to a dispersed cloud 212 which merges into the surrounding information matrix 219 from which the more compressed matrix states emerge and melt.

Ct states do not follow a curved line because of folding. Therefore, two-dimensional travel of photons appears straight in the middle of the universe. They cannot follow the curves because of the bulk unfolding at higher dimensional states within the middle. Shared T12 172a reflects current to the extent that it moves from one electron shell 97 to another 97a. As a part of this movement, transitional states 164 also move and if these are within a shell (97 or 97a) they are part of the current. If, however, the transitional states are outside of the shell, they form the basis for magnetic effects. Electromagnetism is this movement outside of the compression, giving a dimensionally complex momentum basis to the creation of a magnetic field using a current and a coiling a wire to create over changes of x a moving outer shell of the transitional states 164 which are interpreted as magnetism to the extent their pre-time features interact with post time dimensional features under the AuT definition of pre and post time features.

The exact nature of these magnetic features within the group specified for states 164 is subject to additional experimentation to confirm, but it seems likely that these are t6 states not part of a complete photon for purposes of creating magnetic effects primarily consistent with the limits of light speed on magnetism and photoelectric effects, although one can see that being below the level of photons, they would independently have features which were not governed by the speed of change within photons. Less specific pre-photonic states (ct4t1-5 theorized and ct3 states under AuT) are theorized in the prior art to be the source of electromagnetism and current.

3. FIG. 9 FUSION REACTANTS

Figure 9:
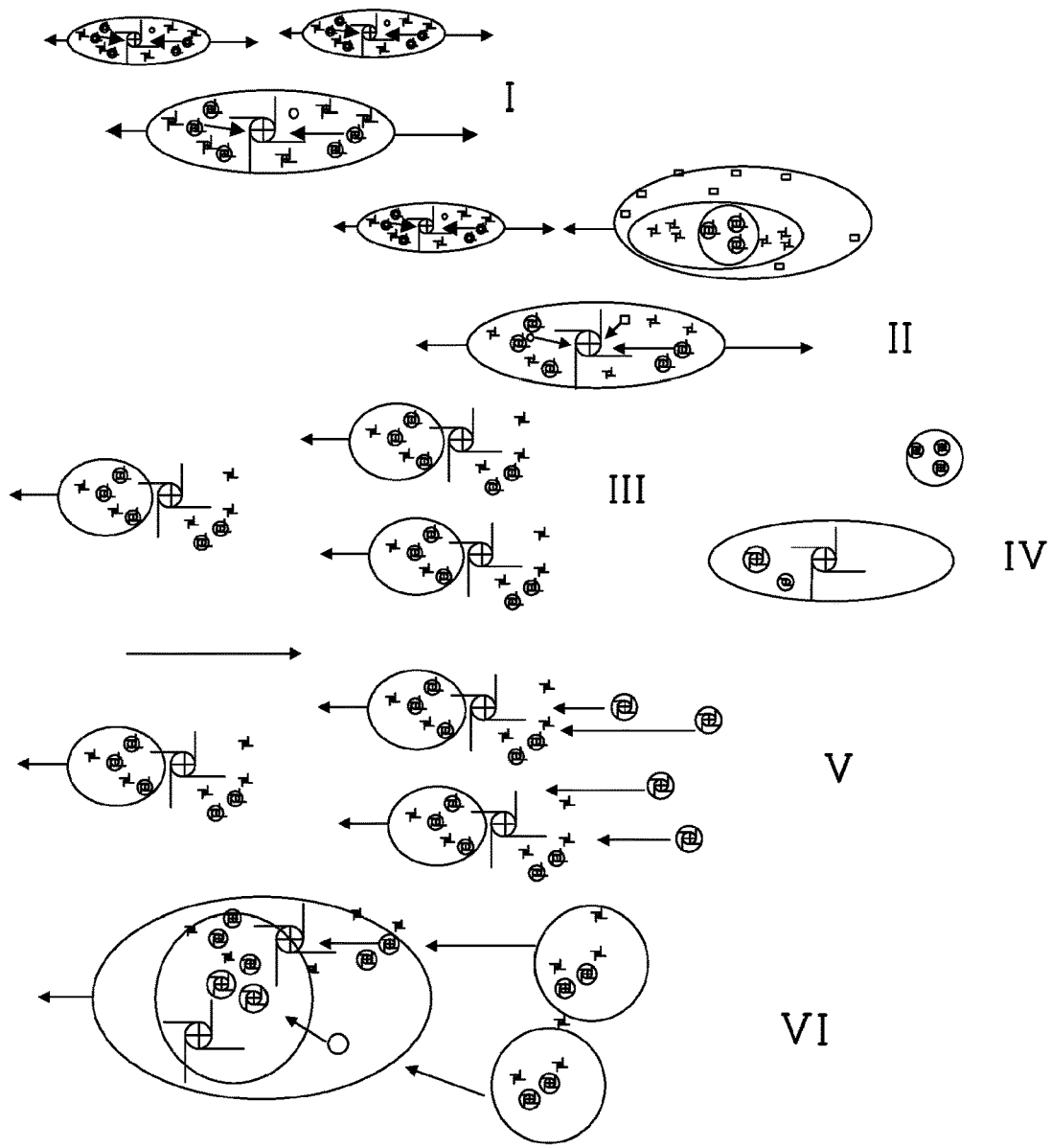
FIG. 9 shows a two-dimensional view of fusion and introduces spew and absorption.

FIG. 9, with details shown in FIGS. 9A-9D, gives the AuT fusion view and introduces spew and absorption.

Positrons, electrons, gamma rays, other radiation (high energy light, heat for example) and muons are examples of pre-AuT approximation for AuT informational states. For example, it is more logical to treat muons as ct4T14 base 6 states and energy as pre-time changes to get a more accurate understanding of the process.

Time and energy have to be converted into summed dimensional changes for a value of x. The speed of movement of the net center of informational flow, the "center of gravity" generates changes at a speed near the speed of light, not because the speed is an actual speed, but because the pre-time changes predominate over the more time sensitive, informationally more dense particle 94.

To accomplish Fusion, the cores around neutrons must be exposed. The process of exposing these cores fractally can come in several forms: (1) increasing the amount of lower selective transitional states around them, removing selective transitional states around them or around one side of them. It is particularly a goal to target the COC 93 for this purpose. The idea is that with reasonable experimentation, given the model and process, you are lifting back the outer shells around the cores, here of protons 94 and Neutrons 30, so that the additional steps can be carried out.

If the goal was to compress the hydrogen into a fused neutron, the process would replace the neutrons 30 in step IV with the appropriate compression states that would fill the last information arms of the proton, effectively eliminating intermediary states that separate information states.

The number of protons and neutrons in the exposing step is one of experimentation.

Having prepared the reactants, the next step is (V) bringing the two exposed neutron cores together and (VI) creating a new proton shell 8 around the exposed neutrons 30 made up of at least one proton, but usually at least two protons 67 around the neutrons. In this case current 110 is used to control the movement of the protons which, being charged, can be directed in this way. In prior art fusion, this process is rather randomized, heat is used to break up the reactant shells 97 and 8 and the hope is that the elements will somehow combine to create fusion. For this reason, even where fission reactions are used to trigger stripping and combination results, only a 6% yield is expected. Spew and absorption should occur in spiral fashion as winding or unwinding even though they are shown with curved or straight lines here to give net directions.

If you have a proton shell that you want to leave mostly intact, you might still want to add lower information states to the proton shell to expand it so that you have room for the neutrons. Different compression states can be used to crowd out lower compression states and then removed to bring the neutrons into proximity allowing the use of high compression states which can be controlled with charge, magnetism and other controlled forces so neutrons can be brought into proximity.

For fission type intentions you might want to separate the neutrons and their proton shells sufficiently so that they can form stable isotopes.

This process recognizing the form of the reactants both in terms of their fractal shells and dimensional components allows for efficient reactions. This is enhanced with the final step of (VII) stabilizing the new nucleus (here two protons 94 and two neutrons 30) with a third COC 93F by adding information bundles 107A and 107B including ct4t12 states 172 with accompanying shells and lower ct states to allow the formation of stable bundles 99A to encourage fusion formation by adding the type and quantity of information necessary for stabilizing the new neutron core 15 according to the fractal model taught herein.

Moving states apart is typically done by increasing the energy levels by shining radiation, adding charge (inserting ct4t6-ct4t12 range compression, for example) at absorbed wavelengths or particulate amounts to increase operationally the amount of ct1-ct2 type states or adding heat as pre-time vibrational features. These can be moderated as to any of the involved states to maximize the results focusing on the boats of information or information arms to be destabilized and expanded, sequentially if necessary. The use of compression (pressure) and vacuum can work with this process since that varies different ct information states within the reaction chamber by crowding out lower states with higher states which can then be removed to bring reactants together.

Fusion can be described as (1) expansion of outer, lower information states. (2) bringing in equivalent information states to create a more stable core. (3) surrounding the core with a stable mix of lower compression states.

Neutron have to be brought close enough, so they share information. They also need a shell of protons (2 neutrons need two protons in helium) to have enough information to remain stable just as the two protons needed the complete shell of electrons to have stability over values of x as lower information states compress and decompress. The key to a fusion reaction of this type (one where you are not making neutrons, but merely building helium from existing neutrons) requires you get everything proximate enough in the right order for it to stabilize.

Fission can also be practiced more efficiently described as expanding of outer, lower information states, (2) bringing out a stable core, (3) surrounding the at least two resulting cores with a stable mix of lower compression states.

Pre-AuT would describe this process in terms of generating heat by concentration of wave states, but under AuT wave states are point structures changing multiple times before slower structural changes more subject to time and their action on the "solid" states in exciting them to action to get replacement results is controlled by reference to the underlying effects and the need to achieve specific transitional states to best effectuate the information loading necessary to destabilize and therefore expand (or stabilize and therefore contract) the underlying states.

This process can be viewed in terms of "beams of neutrons" being added to an expanded ct4 neutron core 15 and then bathing it in the type of ct state which would stabilize by providing the necessary absorption and spew to allow the fusion to take hold. The process if controlled would then slowly remove the fused result. Helium from Hydrogen in the simplest example out and keep the Hydrogen mix sufficiently balanced to continue the process.

Figure 9A:
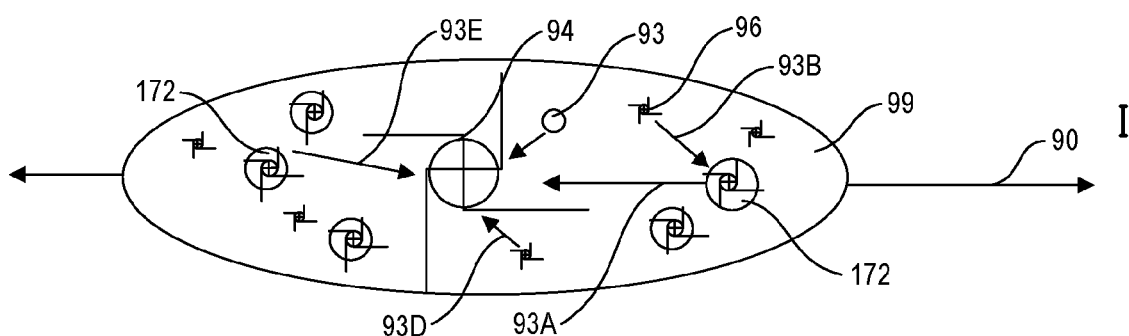
FIG. 9A shows item I from FIG. 9.

FIG. 9A shows the hydrogen atom, item I in FIG. 9. This atom has 5 ct4t12 states 172 along with lower ct states, here ct4t6 states 96, typically called photons, are shown. Everything within the bundle 99 is part of the atom. In the Standard Model (SM) electrons are considered fundamental particles, but this is obviously an approximation (Zeno's Paradox discussion) and the variation for SM is that everything below the electron is part of the hidden variable model, therefore energy, and everything above the electron is matter (see FIG. 8).

There is an electron center of charge (coc) 93 which along with the other information in the bundle 99 around the proton 94 is the SM electron. The mass comes from the total amount of information, excluding the proton, the location is assigned to the center of charge.

COC 93 is the net spew from bundle 99 towards the proton, observed as the negative energy of the electron. COC 93 composed of many sub-spews. Examples shown are 93a, 93b, and 93d.

Ct4T12 Spew 93a is of a single ct4T12 172 state towards the proton 94. The direction of spew can change. Spew 93B is the spew from a photon towards a ct4t12 state 172. Spew 93d is the spew of a photon towards the proton 94. The lines representing the different spews are merely exemplary as fuses and alignment change as x changes for each bit of information resulting in changed centers for spew.

Second CoC 93e is used as an example of where the coc 93 has shifted to a new net spew at second CoC 93e from CoC 93. Second Coc 93e and coc 93 would not exist together.

Ct4T16 or proton 94 represents the center of mass or point charge of the proton, marked by the absorption directly from the electron bundle 99 and corresponding to COC 93.

Figure 9B:
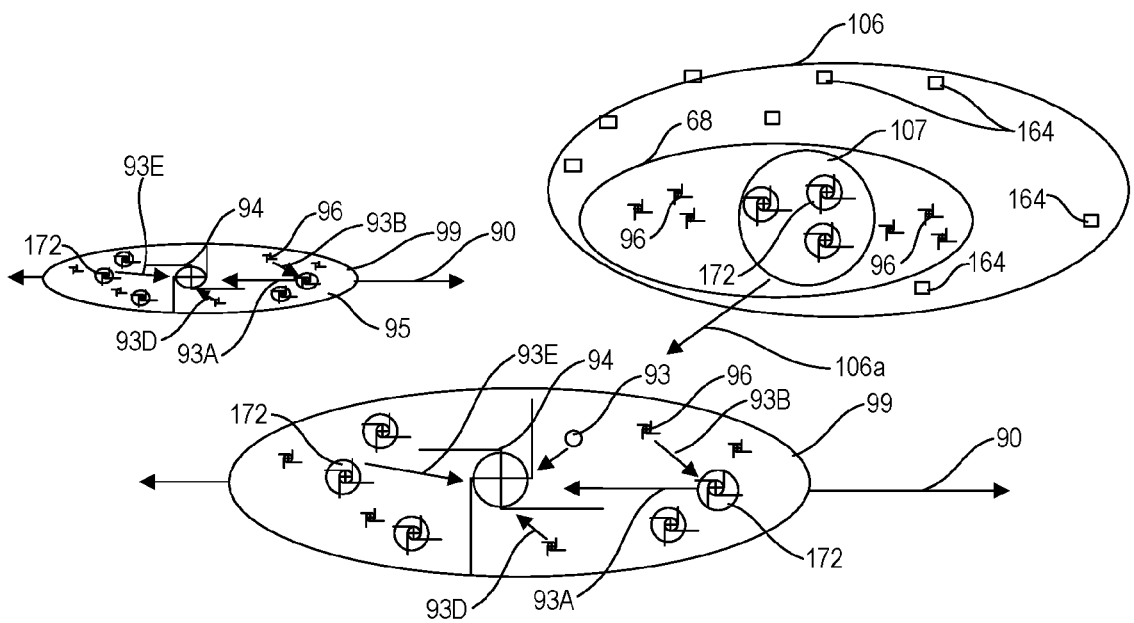
FIG. 9B shows item II from FIG. 9.

FIG. 9B shows item II from FIG. 9. 'Energy.' pre T12 information, is added to the system, lower ct states are energy to higher ct states because of pre-time changes as time is built from dimensional change based on the relative numbers of ct1 which have to change to destabilize or stabilize compression for different ct states.

A ct4T4 bundle 106 around a ct4t12 bundle 107 transfers spew 106a towards bundle 99 from FIG. 9A. The bundle 106 contains ct4t12 states 172 and photonic ct4t6 states 96 in a ct4t6 bundle 68.

The ct4t4 bundle 106 is defined by t4 states 164, necessarily containing lower states and possibly containing higher transitional states. Any higher state is built from lower states so they are implicitly present if not shown, but spew varies for fully compressed states which indicates they have broken free from the spew of much of the surrounding states and are internally stable.

Figure 9C:
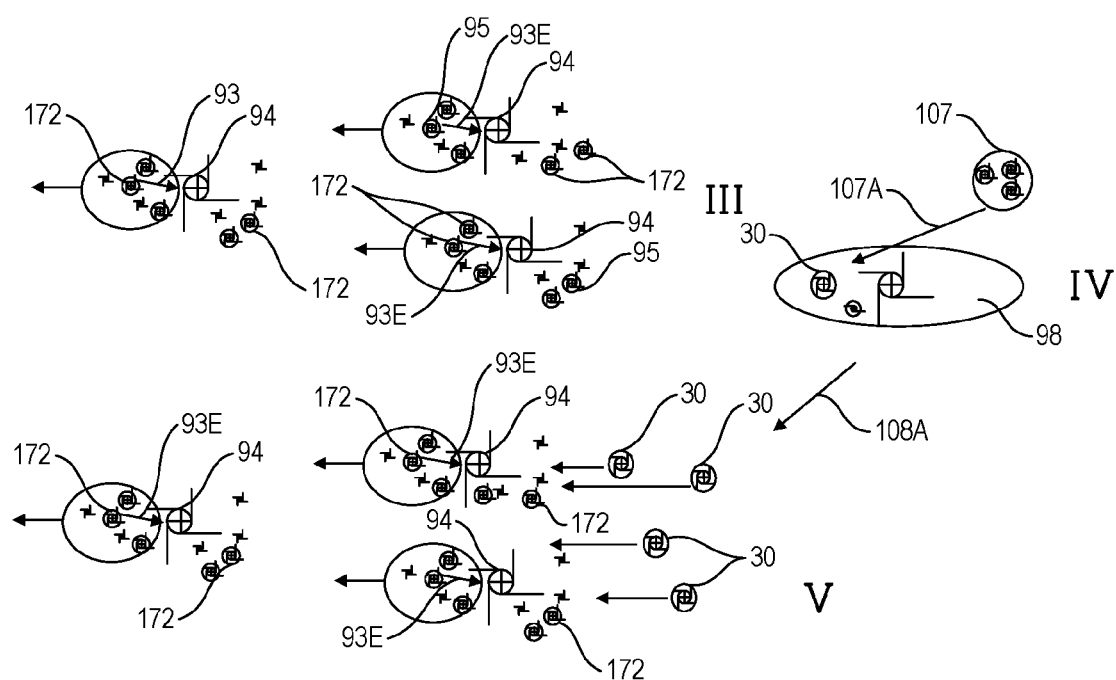
FIG. 9C shows items III, Iv and V from FIG. 9.

The result of the change in information representing the extension of t4 bundle 106 into electron bundle 99 is typically called a plasma when it reaches to form shown in FIG. 9C. Item III from FIG. 9.

The bundle 99 has been broken up by the information added in FIG. 9B so that the protons 94 are no longer in an organized bundle 99. At item IV a similar process is shown where neutrons 30 are broken out of deuterium 98 by adding ct4t12 states in a ct4t12 bundle 107 by way of spew 107a.

At V, there is an enriched plasma having free neutrons 30 along with free protons 94 but there is no stable bundle 99. One can envision the process shown in FIG. 99C as the lesser dimensional fractal of two galaxies colliding. It is easy to see why the chances of a sustained fusion reaction are limited, because there is no incentive for the neutrons to form stable ct4-5 transition states.

Figure 9D:
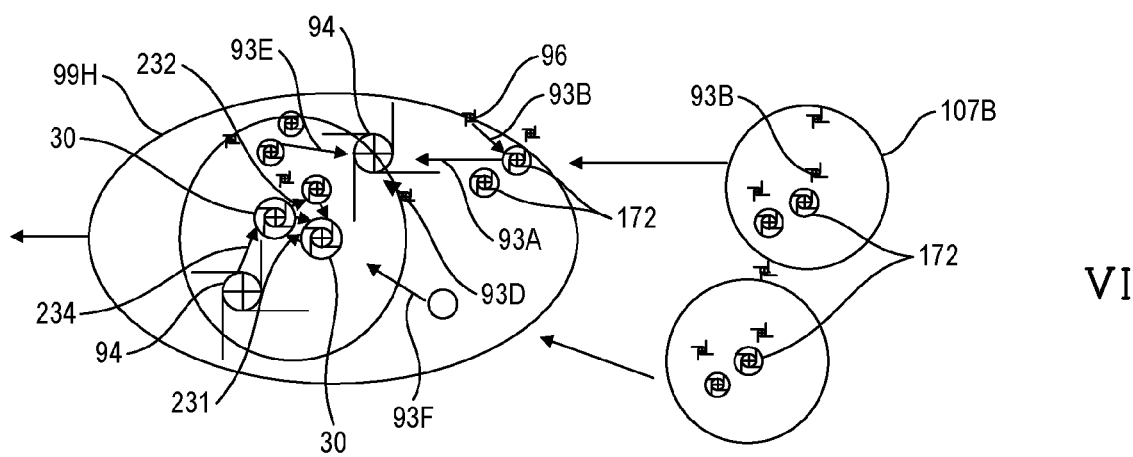
FIG. 9D shows item VI from FIG. 9

The goal of AuT is to get to FIG. 9D where fusion has occurred and there is balanced ct4 to ct4 spew 231 between neutrons, ct4t16-ct4 spew 234 between protons and the neutrons. Ct5 to 99 spew 232 is important spew between neutrons 30 and bundle 99. These are merely exemplary of the constant changes in response to pre-time changes in x.

Spew can extend outside of the primary matrix represented by ct4T12 bundle 107b outside of Helium bundle 99H.

Targeting reactions based on AuT features will improve reactions, energy generation and the like. State changes, typically called chemical reaction, fission and fusion is shown with these general steps: (i) determining the reactants to be used; (ii) changing the ct state structure by adding or removing different ct states or transitional states.

When two hydrogens get together, you don't get a helium which is a Neutron balanced state, although it has two sets of net charge. Hydrogen is not a ct5 transitional state, it is a ct4 transitional state.

Figure 10:
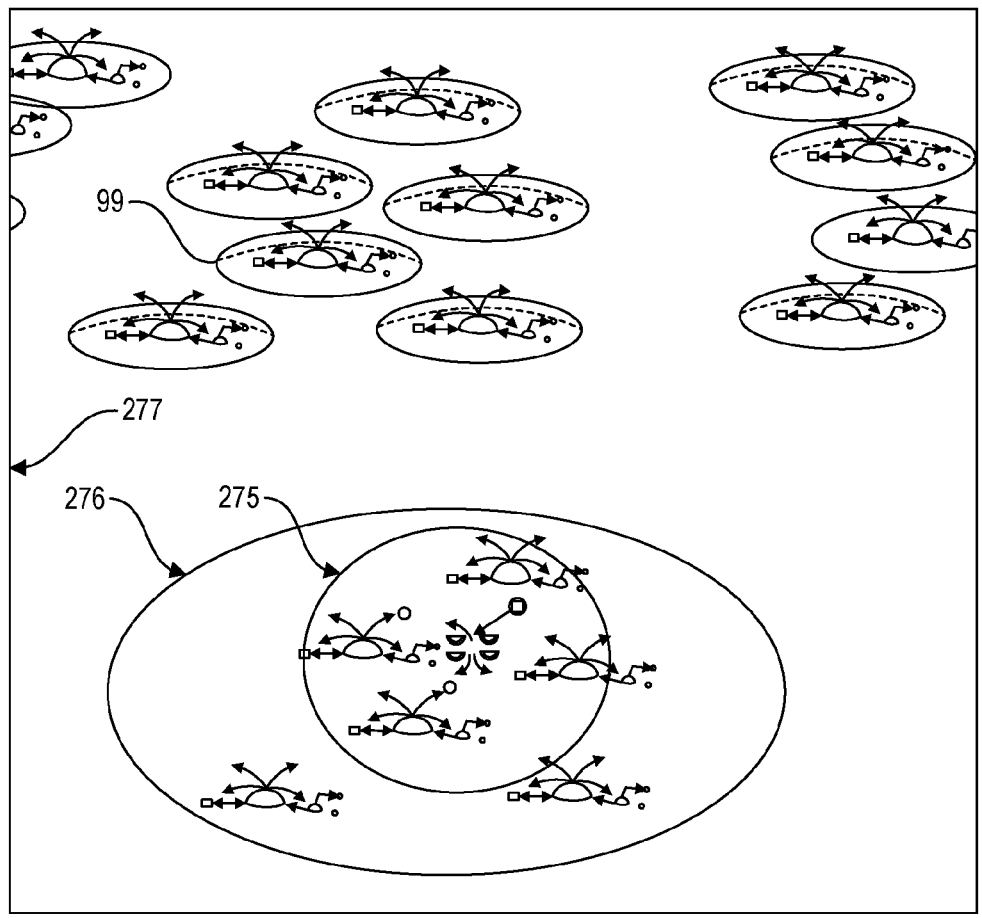
FIG. 10 shows a perspective matrix view of FIG. 9.

A. FIG. 10 Spew and the Molecular State of Water

FIG. 10 a perspective matrix view of FIG. 9 and shows how dimensions increase towards the center of compression, in this case towards the hydrogen nucleus. Collections of ct states are defined by a regional matrix, solution region 277. Within this region 277, a molecular bundle 276 and an atomic bundle 275 are defined with compression and therefore dimension increasing as the center is approached.

Figure 10A:
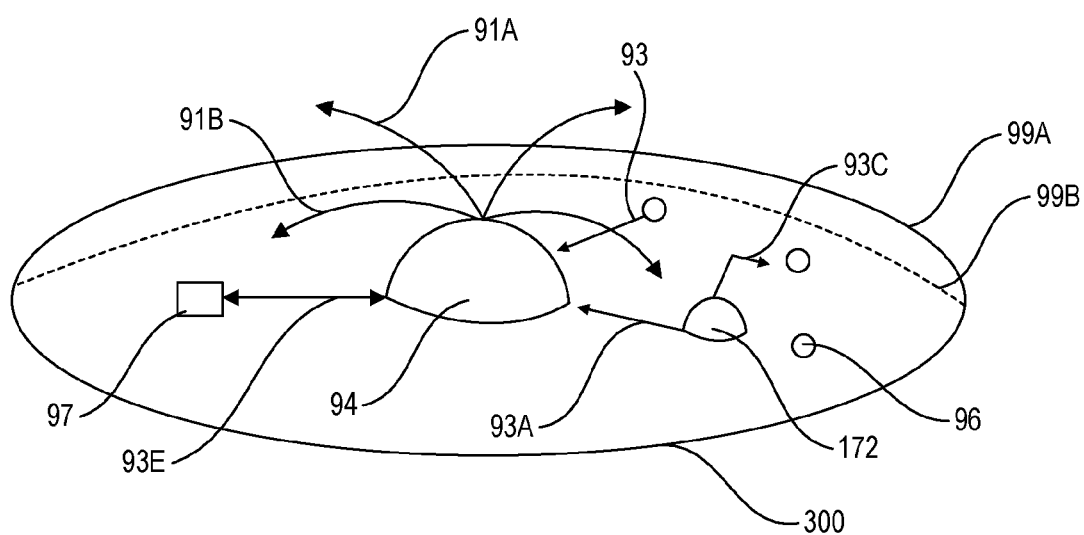
FIG. 10A shows item 99a from FIG. 10

FIG. 10A is compared to the view in FIG. 9A and shows how for a single hydrogen atom bundle 99A there is a dimensional component 99B which tapers towards a lesser dimension towards the edges 300. Spew 232 of FIG. 9a is broken up into exiting spew 91A from the proton 94 going outside of a matrix defined by bundle 99 and dimensional component 99B and internal spew 91B which remains within the matrix.

Figure 10B:
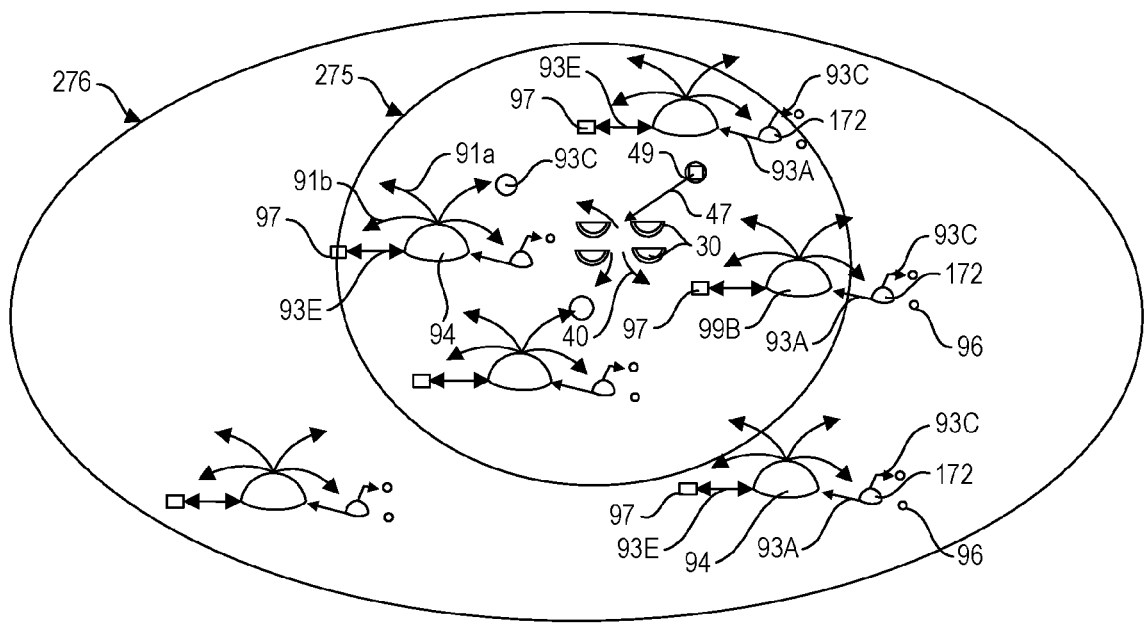
FIG. 10B shows item 276 from FIG. 10.

FIG. 10B shows a region of carbon CH4 defined by area within the atomic shell 275, a loosely defined matrix. A molecular shell 276 holds protons 94 which share information most directly with the atomic shell 275. There is a solution region 277 shown in FIG. 10 containing surrounding states which will proximately interact with the molecular shell for a time frame or a collection of changes in x which is assigned based on how the system is being viewed.

In smaller systems over short periods of time, region 277 might be very small.

In a larger system, such as the planet earth or a sun, region 277 might be very large.

Absorption of a lower ct state and the net expulsion of higher ct states provides a mechanism to control the spew utilizing the features of absorption so that both gravity and the electromagnetic spew of the earth can be manipulated to essentially create a thermostat with sufficient focusing of the spew through manipulation of the absorption and to a large extent the opposite result can be accomplished using what are largely pre-time Newtonian concepts.

B. Charge FIG. 11

Figure 11:
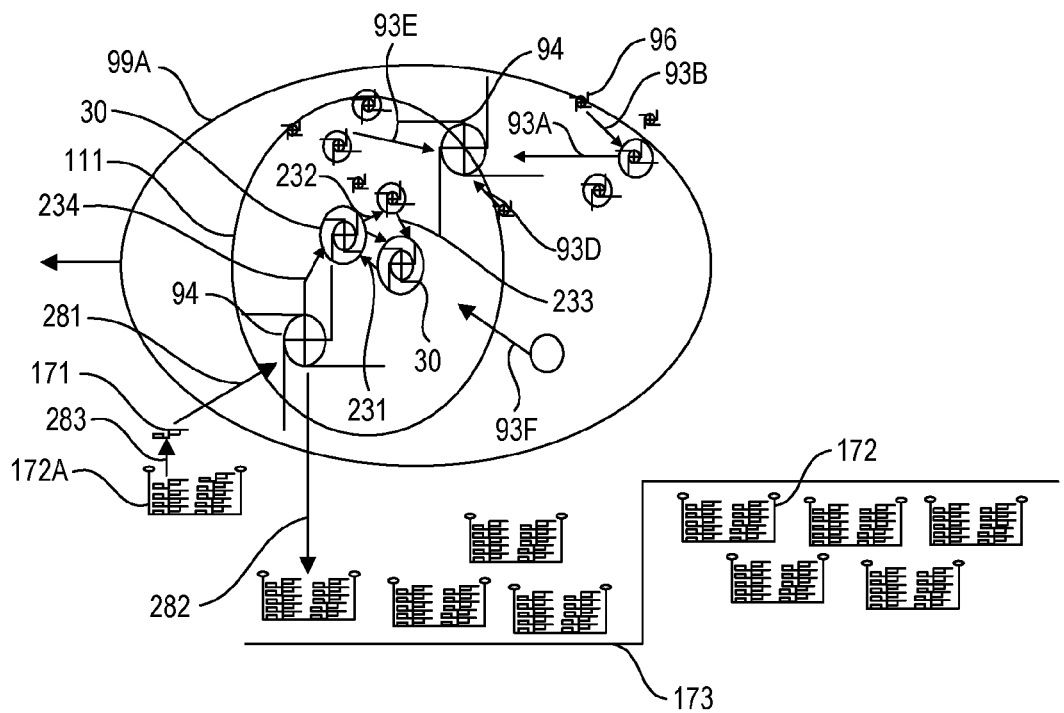
FIG. 11 shows how odd and even fractals interact.

FIG. 11 involves the electron which is made of a disrupted ct4T13 173.

In large systems we see a lower ct state, e.g. ct1, being absorbed and a higher state, e.g. ct3 being spewed. These can also be transitional. For example, if ct4t4 is absorbed, and ct4t5 is spewed: one may be seen as positive and another is the charge.

Note that positrons would be oppositely functioning electrons.

It is possible that absorbing a higher spew would be negative and rejecting a higher spew would be positive, but it is more likely tied to the transitional nature of the absorption and spew.

The example in FIG. 11 shows a ct4T12 state 172a spew components ct4T11 171 which Electron spew line 281 moves towards the proton 94 and is seen as negative charge. The proton takes the ct4T11 171 and compresses it back to ct4T12 which goes along proton spew line 282 back into the electron bundle which is the disrupted ct4T13 and is seen as positive charge.

The neutron to neutron spew 231 can be non-transitional or it can be transitional under the ct3 which might not have charge characteristics. Spew, being the movement of information, occurs between all information states except ct1, the manipulation of which is pre-dimensional. Another example is ct4T12 to neutron spew 233.

It could be a neutral spew only visible within the electron core or even be ct4t12 states, but without the folding to get charge, but these are unlikely. Experimentation will tie this issue down.

Charge 2: The model suggests that charge reflects transitional absorption and spew: while neutral particles (neutrinos and neutrons) function by having non-transitional ct states absorbed and spewed or by having low order absorption and a higher order spew.

The black hole is the largest fractal version and it absorbs space, but that may be ct1-ct3 inclusive. It spews plasma which may be ct4T16. This suggests that the neutron, for example, would absorb ct1, ct2 or ct3 (or a combination thereof) and spew a pre ct4t12 transitional state.

We are looking at ct4t12 states for the electron only because it fits well within the observed mass model and FIG. 11 suggests how this could function with odd and even exponent states.

Figure 12:
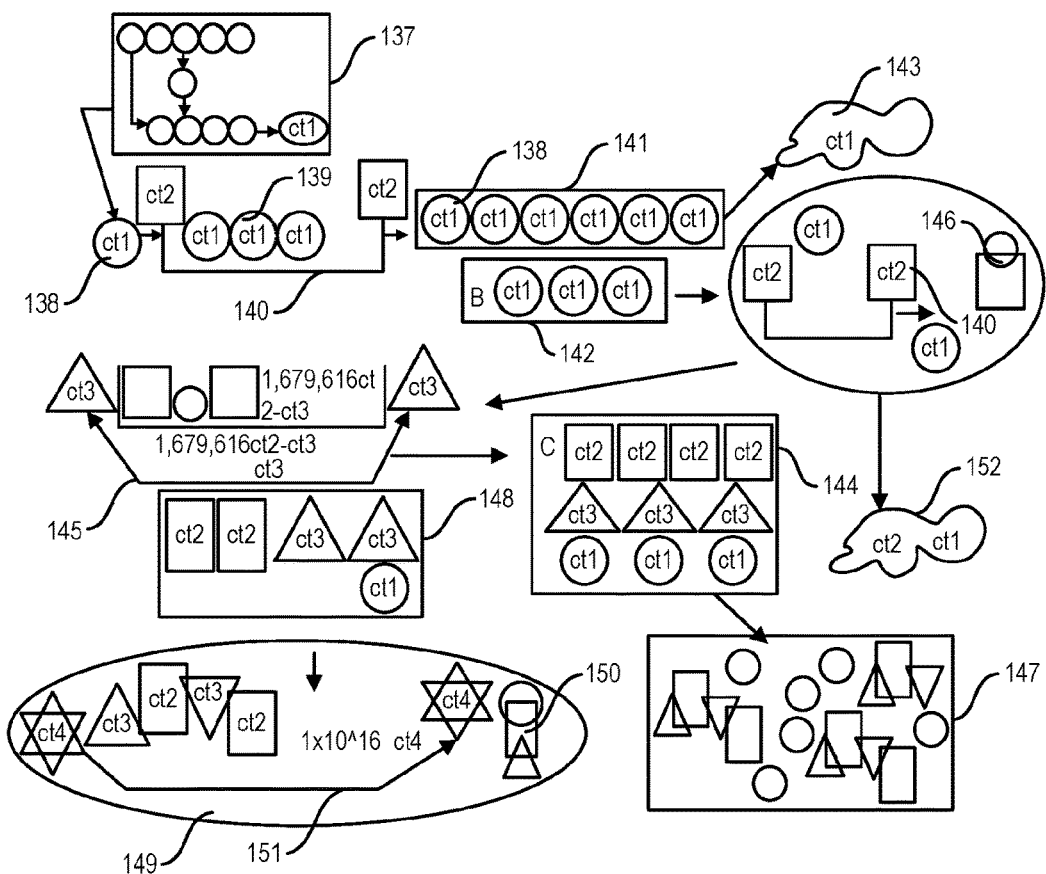
FIG. 12 shows boat diagrams for information compression change.

To continue talking about charge it helps to move to FIG. 12 which shows the fractal nature of molecules. Shared ct4T12 172a reflects current to the extent that it moves from one electron shell 97 to a second electron shell 97a. The two atoms in FIG. 12 are 3 neutron lithium and one neutron deuterium. Lithium is highly reactive as is the deuterium. If it were helium, it would be internally more stable and less reactive although charge could still move through the system less efficiently.

As a part of this movement, transitional states 160 also move and if these are within the shell (97 or 97a) they are part of the current since they play a role in the overall movement of the charge.

If the transitional states are outside of the shell, they form the basis for magnetic effects, although additional pre-time rotational movement of the shell is required to derive the effect of magnetism. Magnetism is a stream of pre-photons classically.

FIG. 12 shows the Boat diagram representing how lower states are loaded onto higher states to create a regional compression state. It will be used to attempt to give a broad frame of reference.

There is a pre-state universe essentially made up of −1 states 137. These reconfigure according to fpix to form quantum space 138. These are separated only by solution order. If aligned they form ct2 "boats" 140. If 256 properly aligned items 138 fill a boat, it becomes a ct2 state.

These boats continue to receive ct1 states and if too many unaligned states 141 come in, the boat falls apart into a cloud of space 143. If the right alignment spaces 142 occurs you end up with stable ct2 state boats 140, space 138 and hybrid ct1-ct2 states which are ct1-2 transition states 146 which can be thought of as partially filled ct2 state boats 140.

The alignment of ct2 states results in ct3 boats 145. These can receive destabilizing amounts of ct2 and ct1 and break down into ct1 and ct1 clouds or they can receive stabilizing amounts and form ct3 boats 145. Up to this level of organization, the results are pre-time results and are not observed directly, although the net results are gravity for the filling of ct2 boats, dark energy for the emptying of ct2 boats, and electromagnetic effects partially caused by the filling and emptying of ct3 boats.

Another effect of the break down and filling of these boats is velocity. The speed of light reflects the rate change of ct1 and ct2 states increase between ct3 boats 145 and ct4 boats 151.

The maximum number of ct1, 2, and 3 states substituting between ct3-4-5 states equating to a complete breakdown of ct4 boats 151 is interpreted as the speed of light. Faster than light transitions occur as the lower ct state changes. This equates conceptually to the Hidden Variable concept in physics, although the fractal model is novel.

Higher order transition states occur with higher order boats, so you have ct3-4 transition states 150 existing in a ct3-4 bundle 149 and you have ct2-3 transition states 146 existing with ct2-3 bundles.

Where a destabilizing collection of changes 144 occur with ct4 bundles, you can have the ct3 bundle 145 break down into component parts 147 comparable to ct1-2 clouds 152 that result from the collapse of transitional ct2-3 states.

The alignment changes according to changes in fpix as described herein and it is constant and dynamic as all fpix solutions change at what is probably the same rate and in response to the same variable.

The use of the word boats is only to conceptualize the increase of aligned information as information arms or compression arms which are mathematical constructs described below and not structures in the traditional sense. This is complicated by the dimensional features which "increase" with the transition between states. Since this vision of dimension is different than the traditional view of dimension, it requires a different perspective. For example, a black hole exists in 4 dimensions, but as the 4th dimension results from folding 3 dimensional features, a four-dimensional space can only exist within a 3-dimensional space. If a boat hits an inflection point it increases to the next higher ct state or drops to the next lower ct state; presumably also as to transitional states.

Figure 13:
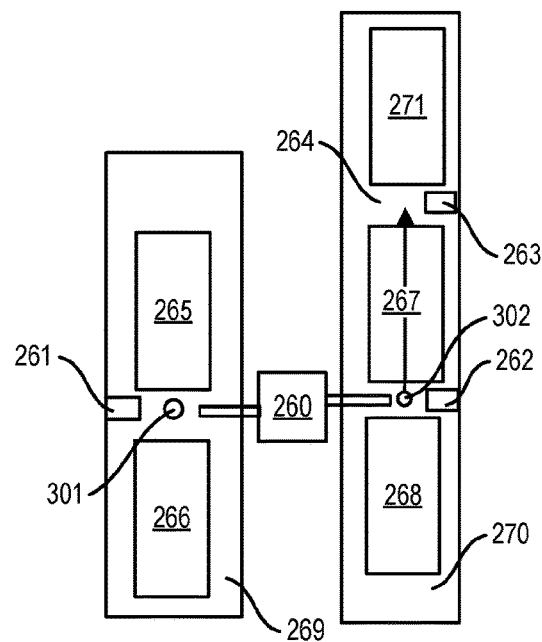
FIG. 13 shows how qubits can be better monitored using the method.

FIG. 13 shows how qubits can be better monitored using the method.

Using AuT principles of transitioning states in place of wave probabilities allows for a better understanding of wave-particle duality and better use of and manipulation of electronic information especially in the realm of quantum computing. Quantum computing can be enhanced by targeting one or more fractal or a plurality of fractals, applying heat and other energies targeting individual fractals to get a long and short view of information change based on the observed tendency of one sample of information compared to another within a relatively closed system.

AuT provides a data model for building a ledger and a complex, unique mathematical model for tying a pre-time protocol for timestamping of transactions. Peer-to-Peer (P2P) networks, cryptography, and shared computational power, along with a new consensus algorithm.

Distributed ledger technology generally consists of three basic components:
A data model that captures the current state of the ledger
A language of transactions that changes the ledger state
A protocol used to build consensus among participants around which transactions will be accepted, and in what order, by the ledger AuT can enhance the security of these by tying them to the pre and post time elements of any time element where the time equation is constructed from the pre-time calculations.

FIG. 13 a method for viewing quantum change in a pre-time environment, replacing probability with pre time and post time estimates and by better defining the quantum elements allows for more precise pre-time computing visualizing and eliminating errors inherent in pure probability analysis. Put simply, if you don't know what particles you are working with and what really happens in the probability analysis of pre-AuT science which is shown to merely be pre-time but not pre-change, you cannot do accurate quantum computing.

With this model, some of the Quantum change is effectively done in a pre-time environment and knowing how this works, the more pre-time elements or reduced time elements are used, the faster the computing and you can target your speed results this way (either with more or less pre-time elements) and you confirmation results to catch pre-time quantum errors can be in a different time frame.

When working with qubits, as shown at 301 and 302, can use temperature extremes. The two temperatures of historically related particles (those folded at the same rate and same time) allow for a better approximation of the number of positive or negative states of those particles which allows for a more precise form of computing in a pre-time environment than the more random method using Schrodinger type solutions.

In this case, a particle generator 260 generates near simultaneous particles 301 and 302) (electrons in this example which have similar ct state profiles) which are held between respective magnets 266 and 265:267 and 268 for observation by sensors, respectively 261 and 262. By having one in a low temperature environment 269 and the other in a higher temperature environment 270 the net shown at higher temperatures can be used as a reference for the changes at the lower temperature particle.

Movement of 302 to sensor 263 creates the same effect as temperature change where an alternate magnet 271 is used to accomplish the move interacting with the magnets 267 and 268.

Observing the decompression of one at a higher temperature and comparing that to the one at the lower temperature in order gives an idea of the pre-time results (states) of the lower temperature particle moving slower vs. the higher temperature one which changes faster.

The idea is to pass comparable information, but accelerated in time, through a sensor to see how much is net positive or negative to estimate how much of colder positive or negative during some time frame.

Averaging pre-time changes helps to estimate what is going on and the average ct states changes for different features can be used in the same fashion that quantum computing uses the probabilities for false Schrodinger dual state, the main difference being that one is based on the more accurate compression and decompression of AuT. Hence, the same way that the universe separates time and change can be used to create a quantum computer result of having multiple results possible in a pre-time math (change) which changes to a 'potential' when applied to a time (dimensional result from the change) based use to create artificial qubits. The amount of ct1 change is necessarily increased at higher compression so that more ct1 chains are straightening out (or compressing) through concentrations of ct4 and higher than with lower states so that the amount of change within ct4-5 is higher than ct4 per square inch, except that the inch is decreasing in length.

The increase in spew required to match the increase in absorption pushes the outer layers of the neutron bundle away from the shell putting them within an orbital matrix along with protons and electrons which have even greater relative movement than the spewed apart neutrons because more of their component parts are changing in a time free environment.

A corollary is that net charge has to do with the absorption/spew net features of the electron bundle and proton bundle of states.

For quantum computing purposes, for the location of each of the electron COC 93 you have 5 primary inputs, the locations of the five ct4t12 states 172 instead of the one used in current quantum computing.

The interaction between all states, for example neutrons and protons, have multiple inputs tied to the component element.

Figure 14:
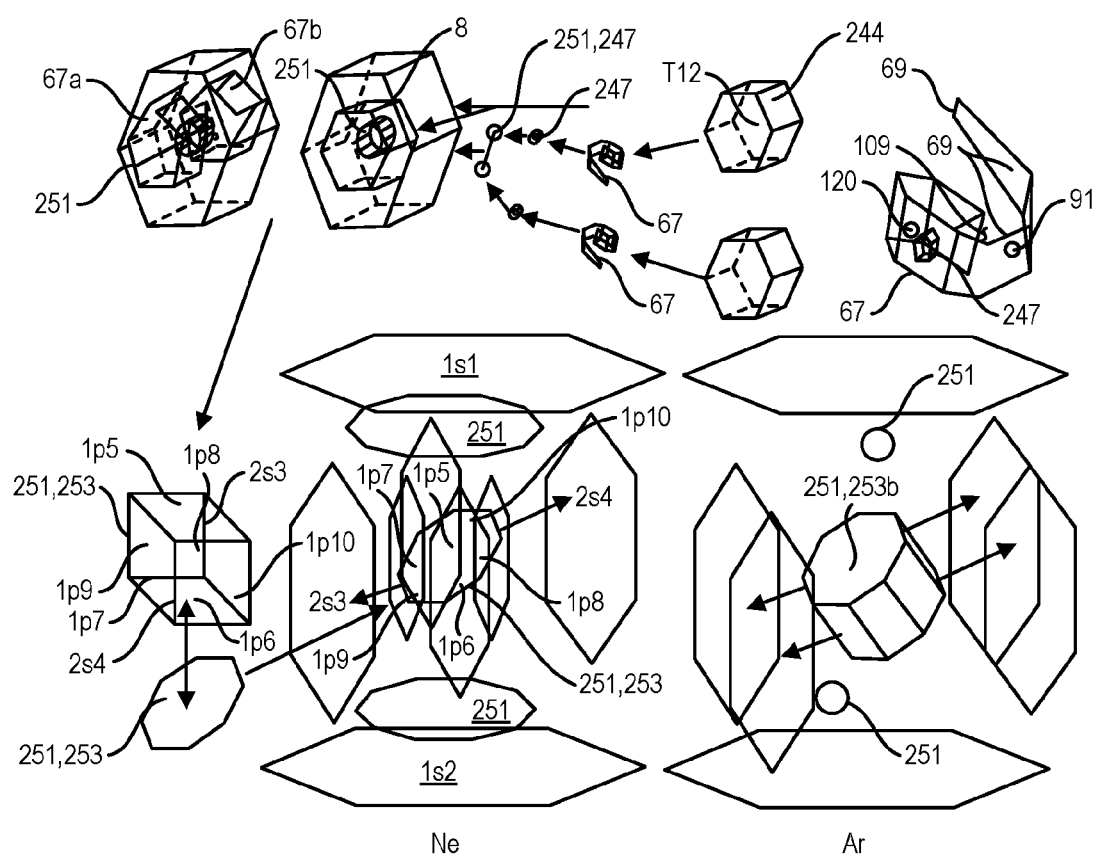
FIG. 14 shows a different fractal model.

FIG. 14 shows a more detailed fractal model

FIG. 14 shows conceptual models of dimensional features that can exist during the fusion process and is exemplary in conjunction with the disclosure above, in this case showing different fractals 251253B for the Neon Fractal and the more complex 251253C fractal for Argon with representative electron shells.

A 5-sided cube 247 conceivably has sufficient stability through ct state sharing to exist independent of any other state. The proton has a first center of charge 91 which interacts with the center of charge of the electron (not shown in this view). A second center of a different charge 120 forms to interact with the neutron. For purposes of fusion, this is a likely target for getting the appropriate interactions to bring neutrons together.

Two different forms of the Helium atom are shown, one with a shell 8 of protons and the other with two separate protons 67 around the 8 sided cube 251 which is formed by the two neutrons. It is worth remembering that each of these neutrons is made up of $10^{16}$ ct3 states gradually folded together as intervening states are eliminated.

While these are just representative models of the mathematics, stability and information sharing increase. The type of charge that is experienced relates to the purity (fully compressed states e.g. ct3 as opposed to ct3t2) of the absorption and spew (theorized) or the less likely balancing of spew which might be related to sharing charged spew between neutrons or between neutrons and the proton.

The proton and electron shells mimic this internal arrangement of neutrons. The precise forms vary and create dimensional characteristics. A five-sided cubed form 247 transitioning into a 8 sided cube arrangement "within" the the 8 sided cube 251253C is suggested by the compression model, although this is counter intuitive. It is likely that there is substantial interaction between these states due to the relative similarity of the different sizes. The view of neon shows how the electron model around this arrangement of neutrons mimicked by the protons. The standard designations from the standard model orbitals are used to show how these may shift from one fractal shape 251253A to another fractal shape 251253B during the compression process.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

The invention claimed is:

1. A method for dimensional manipulation within a fractal matrix, the method comprising:
    accessing a plurality of common qubits including at least two increasingly compressible fractal states in the fractal matrix;
    combining the plurality of common qubits to define a compressed fractal matrix;
    targeting relationships between the qubits to generate categorized states based on fractal compression using key fractal elements comprising iterated equations to define compression states; wherein the key fractal elements are comprised of fpix, $2^n$, the Fibonacci series, n=n+1, 2 times one or more of the other key fractal elements.

2. The method of claim 1 wherein the qubits are solutions to fpix, and the matrix comprises dimensions that increase proportionally as compression of the qubits increases.

3. The method of claim 2 wherein time is defined by the perception of dimensional changes according to quantum change in solutions to fpix and wherein dimensional manipulation further comprises enhancing the precision of dimensional manipulation within the fractal matrix by using qubits to define dimensional changes.

4. The method of claim 3 wherein dimensional manipulation further comprises categorizing the at least two compressions state based on its fpix features from the group comprising compression within the compression states and changes in compression over quantum changes in fpix for the compression states and the interaction of at least one compression state with at least one second compression state.

5. The method of claim 1 wherein the key fractal elements further comprise fractal changes in individual solutions to fpix based on a fuse length defined as the values for fpix counted down to zero using the changes in n=n+1 as quantum change over multiple values of n in quantum change.

6. The method of claim 5 wherein targeting comprises categorizing entities made of matrices comprised of at least two other compression states and solutions to the iterated equations into sub-matrices of net compressed fractals resulting from compression, defined as combinations of compressed fractals, and decompressed fractals.

7. The method of claim 6 wherein forces are defined for categorization according to net compression or decompression of compression states within a matrix of compression states.

8. The method of claim 7 wherein at least one compression and decompression are based on the formula $2f(n)^{\wedge}(2^n)$, where f(n) is derived from at least one of the key fractal elements.

9. The method of claim 8 further comprising classification based on the fractal elements and the resulting fractal compression states and transitions of the fractal states over a plurality of changes in the quantum count.

10. The method of claim 9 further comprising using averaging to approximate changes in compression and decompression based on predictions using the key fractal elements.

11. The method of claim 10 further comprising assigning classifications to compression states based on the properties and characteristics defined by the features of the key fractal elements, establishing a comprehensive categorization system for diverse entities and by changes in the properties of the entities and categories defined by compression or decompression over changes in the quantum count within compression states and combinations of compression states.

12. The method of claim 11 wherein categorization further comprises a computing process from the group comprised of Artificial intelligence, Machine Learning, and Quantum Computing.

13. The method of claim 12 wherein the computing process further comprises using fractal quantum changes or averages in quantum changes in place of time.

14. The method of claim 13 wherein the computing process is improved by forcing a logic test on results based on the key fractal elements for reconciling non-fractal results with those required by fractal mathematics.

15. A method of categorizing and manipulating dimensional features, from the group comprising space, time, force, energy, matter, and their components, comprising:
   defining each dimensional feature as a fractal matrix;
   defining the fractal structures as derived from an iterated equation group, hereinafter referred to as key fractal elements (KFE), comprising quantum change according to the equation n=n+1 and quantum change based on fuse length, where the number of quantum changes equals the fpix value for a given fractal, fpix, $2^n$, and the Fibonacci series; and
   defining more compressed states exemplified by matter as successively compressed fractals comprised of combined less compressed fractals.

16. The method of claim 15 wherein utilizing is further defined as being from the group comprised of categorizing, tracking, predicting, and changing fractal features of the matrix, energy manipulation, material manipulation, energy storage, energy generation, machine learning, chemistry, predictive science, and quantum computing.

17. The method of claim 16 further comprising at least one of the programming steps from the group comprising:
   (1) generating models of compressed fractals by using fractal manipulation techniques for combining less combined fractals;
   (2) generating models of decompressed fractals by disassociating more combined fractals into less combined fractals by using fractal manipulation techniques;
   (3) tracking information in the form of compressible fractal states;
   (4) identifying the compression states within a data set utilizing key fractal elements within the identified compression states;
   (5) tracking the fused compression states for purposes of data management in computing functions;
   (6) computing functions include sorting, organizing and tracking data in search engines according to the key fractal elements within the data.

* * * * *